United States Patent
Yoshitake et al.

(10) Patent No.: US 6,964,815 B2
(45) Date of Patent: Nov. 15, 2005

(54) PROJECTING FILM AND MANUFACTURING METHOD THEREOF

(75) Inventors: Tetsuya Yoshitake, Yokkaichi (JP); Toshifumi Tsujino, Itami (JP); Kazutaka Kamitani, Itami (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/257,735

(22) PCT Filed: Feb. 15, 2002

(86) PCT No.: PCT/JP02/01289

§ 371 (c)(1),
(2), (4) Date: May 9, 2003

(87) PCT Pub. No.: WO02/064524

PCT Pub. Date: Aug. 22, 2002

(65) Prior Publication Data

US 2003/0175528 A1 Sep. 18, 2003

(30) Foreign Application Priority Data

Feb. 16, 2001 (JP) ........................................ 2001-040467
Jun. 6, 2001 (JP) ........................................ 2001-170817

(51) Int. Cl.[7] .......................... B32B 9/04; B32B 15/00; B05D 5/02; B05D 3/02
(52) U.S. Cl. ........................ 428/446; 428/141; 428/220; 428/332; 428/426; 428/428; 428/446; 427/165; 427/256; 427/287; 427/397.7; 427/419.2; 427/419.4
(58) Field of Search .................. 428/141, 143, 428/144, 147, 148, 149, 195, 210, 220, 323, 325, 327, 332, 402, 403, 404, 407, 426, 428, 446, 448, 688, 689, 699, 701, 702; 427/164, 165, 162, 169, 202–205, 256, 279, 283, 372.2, 397.2, 245, 246, 258, 287, 403, 419.1, 419.2, 419.3, 419.4

(56) References Cited

U.S. PATENT DOCUMENTS

| | | | |
|---|---|---|---|
| 5,394,269 A | 2/1995 | Takamatsu et al. | |
| 5,413,865 A | 5/1995 | Nakamura et al. | |
| 5,674,625 A | * 10/1997 | Takahashi et al. | ........... 428/428 |
| 6,559,915 B1 | * 5/2003 | Amimori et al. | ........... 349/112 |

FOREIGN PATENT DOCUMENTS

| | | | |
|---|---|---|---|
| JP | 61-68350 | 4/1986 | |
| JP | 62-3046 | 1/1987 | |
| JP | 05319869 A | * 12/1993 | ........... C03C/17/02 |
| JP | 09063767 | 3/1997 | |
| JP | 2000284705 | 10/2000 | |
| JP | 2000-352710 | 12/2000 | |

* cited by examiner

Primary Examiner—Stephen Stein
(74) Attorney, Agent, or Firm—Cohen, Pontani, Lieberman & Pavane

(57) ABSTRACT

A sol-form application liquid 3 is prepared by mixing together two solvents A and B and two film components C and D. The sol-form application liquid 3 thus prepared is applied onto a glass substrate 200, thus forming a mixed layer 401 on the glass substrate 200. The glass substrate 200 having the mixed layer 401 formed thereon is left at room temperature, whereupon the solvent A evaporates and phase separation of the mixed layer 401 into an upper layer 403 and a lower layer 402 occurs. The mixed layer 401 is then heated, thus evaporating the solvent B in the lower layer 402 and gelating the film component C in the upper layer 403 and the film component D in the lower layer 402, and hence forming an internal scattering layer 404.

63 Claims, 20 Drawing Sheets

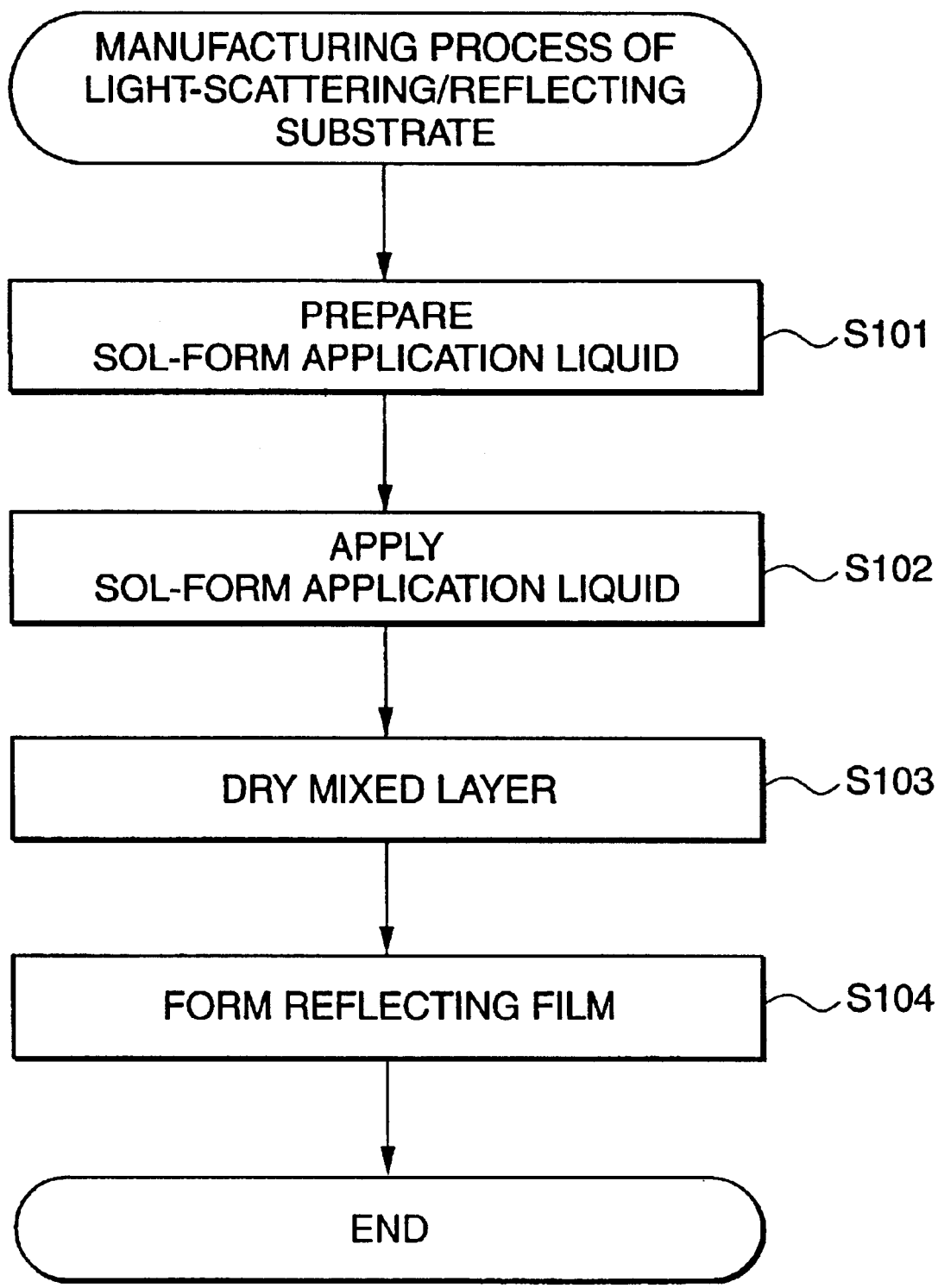

PROJECTING FILM AND MANUFACTURING METHOD THEREOF

This is a U.S. National Phase Application under 35 USC 371 of International Application PCT/IP02/01289, filed on Feb. 15, 2002.

TECHNICAL FIELD

The present invention relates to a projecting film and a manufacturing method thereof, and more particularly to a projecting film for a light-scattering/reflecting substrate suitable for use in a reflection type liquid crystal display apparatus, a semi-transmission type liquid crystal display apparatus, a projection type display transmitting screen or the like, and a manufacturing method thereof.

BACKGROUND ART

In recent years, as display means for mobile display apparatuses and the like, reflection type liquid crystal display apparatuses (hereinafter referred to as "reflection type LCDs") that use reflected natural light or room light (hereinafter referred to collectively as "external light") and joint reflection/transmission type LCDs (hereinafter referred to as "semi-transmission type LCDs") that use reflected external light when the amount of external light is high and light from a backlight when the amount of external light is low have come to be used from the viewpoint of reducing the electrical power consumption of the display means and thus making the battery smaller in size.

Out of mobile display apparatuses, display is required to be at high resolution and in full color for mobile telephones and portable computers in particular. For example, reflection type LCDs used in such mobile display apparatuses are required to have a high opening ratio to increase brightness and to display images with no parallax. The internal scattering/reflecting plate form reflection type LCD described in "FPD Intelligence, February 2000 edition (pages 66 to 69)", for example, is known as a reflection type LCD that satisfies these requirements.

FIG. 16 is a schematic sectional view showing the constitution of this conventional internal scattering/reflecting plate form reflection type LCD.

In FIG. 16, the internal scattering/reflecting plate form reflection type LCD 10 is comprised of a pair of glass substrates 11 and 12 that transmit light, a reflecting film 15, described below, that is formed on an inner surface of the glass substrate 12 and scatters incident light 13 and reflects this light as reflected light 14, color filters 16 that are formed on an inner surface of the glass substrate 11 and transmit light of only a certain wavelength (color), and a liquid crystal layer 17 that is packed between the reflecting film 15 and the color filters 16 and controls the transmission of light.

Of the component parts of the internal scattering/reflecting plate form reflection type LCD 10, the glass substrate 12 and the reflecting film 15 together constitute a light-scattering/reflecting substrate 18.

FIG. 17 is a schematic sectional view showing the constitution of the light-scattering/reflecting substrate 18 appearing in FIG. 16;

In FIG. 17, the light-scattering/reflecting substrate 18 is comprised of the glass substrate 12, an internal scattering layer 20 that is formed on top of the glass substrate 12 and has a projecting shape, and a reflecting film 21 that is formed on top of the internal scattering layer 20 and has a shape that follows the projecting shape of the internal scattering layer 20. The reflecting film 21 reflects incident light, scattering the light due to the projecting shape. The internal scattering layer 20 and the reflecting film 21 together constitute the reflecting film 15 described above.

Methods for manufacturing such a light-scattering/reflecting substrate are disclosed, for example, in Japanese Patent No. 2698218, Japanese Laid-open Patent Publication (Kokai) No. 11-326615, and Japanese Laid-open Patent Publication (Kokai) No. 2000-267086, as described below.

First, a light-scattering/reflecting substrate manufactured using the manufacturing method disclosed in Patent No. 2698218, hereinafter referred to as "the first prior art", is comprised of a glass substrate 30, an internal scattering layer 31 that is dotted over the glass substrate 30, and a reflecting film 32 that is formed on top of the glass substrate 30 and the internal scattering layer 31, as shown in FIG. 18. In this first prior art, the manufacturing method comprises a step in which a photosensitive resin, which is an organic substance, is applied onto one surface of the glass substrate 30, a step in which a large number of minute projecting parts are formed by patterning the applied photosensitive resin in a predetermined shape, masking, exposing to light and developing, a step in which the glass substrate 30 on which the projecting parts have been formed is subjected to heat treatment to round off angular portions of the projecting parts and thus form the internal scattering layer 31, and a step in which the reflecting film 32 made of an inorganic material such as a metallic material or a dielectric substance is formed on top of the glass substrate 30 and the internal scattering layer 31 by vapor deposition or sputtering.

Moreover, a light-scattering/reflecting substrate manufactured using the manufacturing method disclosed in Japanese Laid-open Patent Publication (Kokai) No. 11-326615, hereinafter referred to as "the second prior art", comprises a glass substrate 700, a first internal scattering layer 701 that is dotted over the glass substrate 700, a second internal scattering layer 702 that is formed on top of the glass substrate 700 and the first internal scattering layer 701, and a reflecting film 703 that is formed on top of the second internal scattering layer 702, as shown in FIG. 19. In this second prior art, in addition to manufacturing steps equivalent to those of the first prior art, also carried out are a step in which the second internal scattering layer 702 is formed by applying the same kind of photosensitive resin as that used in the first internal scattering layer 701 on top of the first internal scattering layer 701, which has been formed by rounding angular portions of projecting parts formed on the glass substrate 700, and a step in which the second internal scattering layer 702 is subjected to heat treatment.

On the other hand, a light-scattering/reflecting substrate manufactured using the manufacturing method disclosed in Japanese Laid-open Patent Publication (Kokai) No. 2000-267086, hereinafter referred to as "the third prior art", comprises a glass substrate 40, an internal scattering layer 41 formed on top of the glass substrate 40, and a reflecting film 42 formed on top of the internal scattering layer 41, as shown in FIG. 20. The internal scattering layer 41 comprises a layer 43 of a first resin, and a plurality of spherical parts 44 that are made of a second resin and are distributed through the upper part of the first resin layer 43. Because the spherical parts 44 are distributed through the upper part of the first resin layer 43, a large number of minute projecting parts are formed on the surface of the internal scattering layer 41. In this third prior art, the manufacturing method comprises a step in which a mixed resin liquid, in which are mixed the first resin and the second resin, which are organic substances that tend to separate out into separate phases to one another, is applied onto the glass substrate 40, a step in which the resulting mixed resin layer is made to undergo phase separation so that the internal scattering layer 41 having the large number of minute projecting parts formed on the surface thereof is formed, and a step in which the reflecting film 42 made of a metallic material is formed on top of the internal scattering layer 41 by vapor deposition or sputtering.

However, the light-scattering/reflecting substrate manufacturing methods of the first and second prior art described above are both based on a photolithography technique using a photosensitive resin. These manufacturing methods thus include steps of applying the photosensitive resin, masking, exposing to light, developing, carrying out heat treatment and so on, and hence there is a problem that the manufacturing process is complicated and thus the manufacturing cost is high.

The third prior art, on the other hand, is based on a resin phase separation technique, not on a photolithography technique, and hence the problem described above does not occur. Nevertheless, in the first to third prior art described above, the internal scattering layer has an organic material as a principal skeleton thereof, and hence there is a problem that adhesion to the reflecting film, which is made of an inorganic material such as a metallic material or a dielectric substance, is poor, and thus the reflecting film easily peels off. Moreover, when the reflecting film is formed by a vacuum film formation method such as vapor deposition or sputtering, there is a problem that components adsorbed on the surface of the internal scattering layer and unreacted components inside the internal scattering layer are discharged from the internal scattering layer as a gas, thus altering the optical properties (reflectance, refractive index, transmitted color tone etc.) of the reflecting film.

A method for manufacturing a thin film having as a principal skeleton thereof an inorganic material such as a metallic material or a dielectric substance that has good adhesion to such a reflecting film made of an inorganic material is disclosed, for example, in Japanese Patent No. 2901833.

The thin film manufactured by this manufacturing method is made from first and second sol solutions comprised of metal alkoxide compounds (or metal acetylacetonate compounds); a solution in which are mixed the first and second sol solutions is applied onto a glass substrate, thus forming a micropitted surface layer.

However, the projecting shape of the thin film formed through this method is controlled by the functional groups and molecular weights of the compounds in the two selected sol solutions. As a result, projecting parts having a diameter greater than about 200 nm cannot be formed, and hence it is not possible to use the thin film as an internal scattering layer that scatters visible light (wavelength 400 to 800 nm).

It is thus an object of the present invention to provide a projecting film and a manufacturing method thereof, which enable adhesion to a reflecting film made of an inorganic material to be improved, and alteration of the optical properties of the reflecting film to be prevented, and also enable the diameter of projecting parts to be controlled freely through few manufacturing steps.

DISCLOSURE OF THE INVENTION

To attain the above object, the present invention provides a projecting film that is formed on a substrate and exhibits a projecting shape, the projecting film having an inorganic material as a principal skeleton thereof.

Preferably, the projecting film contains not less than 50 mass % of a component comprising the inorganic material.

Also preferably, the projecting film has side chains modified with an organic material.

Also preferably, the projecting film has an average surface roughness Ra in a range of 30 to 1000 nm.

Also preferably, the projecting film has a maximum surface roughness Rmax of not more than 10 µm.

Also preferably, the projecting shape is mountain-like.

Also preferably, the projecting film has projection parts having a diameter larger than the wavelength of visible light.

Also preferably, the projecting film has a haze ratio of not less than 1%.

Also preferably, the projecting film has a transmitted color tone value as represented by $|a^2+b^2|$ which is the square of the vector sum of Hunter color coordinates (a,b), of not more than 10.

Also preferably, scattered transmitted light in response to visible light being perpendicularly incident on the projecting film has an angle distribution within a range of ±20° in terms of solid angle.

Also preferably, reflected light in response to visible light being perpendicularly incident on the projecting film has a scattering angle distribution within a range of ±40° in terms of solid angle from the angle of specular reflection.

Also preferably, the projecting film is used as an internal scattering layer disposed in a reflection type or semi-transmission type liquid crystal display apparatus.

Alternatively, the projecting film is used as an anti-glare film.

Alternatively, the projecting film is formed onto a surface of one of an original-placing window of a copying machine and a side window of an automobile.

Alternatively, the projecting film is used in an electroluminescence light-emitting apparatus used in a liquid crystal display apparatus.

Also preferably, the projecting film comprises a first phase that is formed on top of the substrate, and a second phase that is formed on top of the first phase and exhibits the projecting shape.

More preferably, the first phase comprises an inorganic material.

Also more preferably, the first phase is a foundation layer formed in advance on the substrate.

Alternatively, the second phase is formed simultaneously with the first phase.

Preferably, the interface between the first phase and the second phase exhibits a rugged shape.

Also preferably, the first phase contains a component in which at least one first metal compound has been solidified by a gelation reaction, and the second phase contains a component in which at least one second metal compound having a gelation reaction rate slower than the first metal compound(s) has been solidified by a gelation reaction.

More preferably, the second metal compound(s) has/have a lower wettability than the first metal compound(s).

Also more preferably, the projecting film is formed by a sol-gel method using a sol-form application liquid in which are mixed at least the first metal compound(s) and the second metal compound(s).

Yet more preferably, the sol-form application liquid contains an organically modified metal compound.

Also yet more preferably, the sol-form application liquid has mixed therein at least one solvent, and at least one solvent out of this/these solvent(s) has a surface tension of not less than 30 dyn/cm.

Still more preferably, the sol-form application liquid contains not less than 5 mass % of the solvent(s) having a surface tension of not less than 30 dyn/cm.

Also preferably, each of the first metal compound(s) and the second metal compound(s) is a metal compound capable of undergoing one of hydrolysis and condensation polymerization.

More preferably, each of the first metal compound(s) and the second metal compound(s) is an alkoxide of a metal selected from the group consisting of silicon, aluminum, titanium, zirconium and tantalum.

Yet more preferably, at least one metal compound out of the first metal compound(s) and the second metal compound(s) is a silicon alkoxide.

Moreover, to attain the above object, the present invention also provides a method of manufacturing a projecting film, comprising a projecting film formation step of forming a projecting film having a structure with an inorganic material as a principal skeleton thereof on a substrate by a sol-gel method.

Preferably, the projecting film contains not less than 50% of a component comprising the inorganic material.

Also preferably, the projecting film formation step comprises applying a sol-form application liquid in which are mixed at least one first metal compound and at least one second metal compound onto the substrate, and solidifying the applied sol-form application liquid by a gelation reaction.

More preferably, in the projecting film formation step, the applied sol-form application liquid is solidified by a gelation reaction, and phase separation is carried out into a first phase that is formed on top of the substrate and a second phase that is formed on top of the first phase and has a projecting shape.

Yet more preferably, the second metal compound(s) has/have a gelation reaction rate slower than the first metal compound(s).

Still more preferably, the second metal compound(s) has/have a lower wettability than the first metal compound(s).

Also preferably, the sol-form application liquid contains an organically modified metal compound.

Also preferably, the sol-form application liquid has mixed therein at least one solvent, and at least one solvent out of this/these solvent(s) has a surface tension of not less than 30 dyn/cm.

More preferably, the sol-form application liquid contains not less than 5 mass % of the solvent(s) having a surface tension of not less than 30 dyn/cm.

Also preferably, each of the first metal compound(s) and the second metal compound(s) is a metal compound capable of undergoing one of hydrolysis and condensation polymerization.

More preferably, each of the first metal compound(s) and the second metal compound(s) is an alkoxide of a metal selected from the group consisting of silicon, aluminum, titanium, zirconium and tantalum.

Yet more preferably, at least one metal compound out of the first metal compound(s) and the second metal compound(s) is a silicon alkoxide.

Moreover, to attain the above object, the present invention also provides a method of manufacturing a projecting film, comprising a mixed layer formation step of applying a sol-form application liquid comprising a first film component and a mixed liquid of a first solvent and a second solvent onto a substrate to form a mixed layer, a phase separation step of selectively removing the first solvent from the mixed layer, and carrying out phase separation of the first solvent and the first film component into an upper layer and the second solvent into a lower layer, and a gelation step of removing the second solvent from the mixed layer, and gelating the first film component.

Preferably, the first solvent is a solvent in which the second solvent and the first film component dissolve uniformly.

More preferably, the first solvent has a lower boiling point than the second solvent. Also more preferably, the first solvent has a faster evaporation rate than the second solvent.

Yet more preferably, the second solvent is a poor solvent of the first film component.

Also preferably, the first solvent has a lower surface tension than the second solvent.

Also preferably, the first film component is a sol solution in which an alkoxide of a metal selected from the group consisting of silicon, aluminum, titanium, zirconium and tantalum has been subjected to one of hydrolysis and condensation polymerization.

Also preferably, the first solvent comprises at least one solvent selected from the group consisting of alcohols including methanol, ethanol, propanol and butanol, ketones including acetone and acetylacetone, esters including methyl acetate, ethyl acetate and propyl acetate, cellosolves including ethyl cellosolve and butyl cellosolve, and glycols including hexylene glycol and 1,2-propanediol.

Also preferably, the second solvent comprises at least one solvent selected from the group consisting of straight-chain glycols having a hydroxyl group at each end thereof represented by the general formula $HO-(CH_2)_n-OH$ wherein n is an integer from 2 to 10 inclusive, and polyhydric alcohols represented by the general formula $$HO-(CH_2)_n(CHOH)_m-OH \ (n \geq 2, m \geq 1).$$

Also preferably, a foundation layer is formed on the substrate in advance.

More preferably, the foundation layer is formed by mixing together a third solvent and a second film component to make an other sol-form application liquid, applying the other sol-form application liquid onto the substrate to form an other mixed layer, and removing the third solvent from the other mixed layer and gelating the second film component.

Yet more preferably, the third solvent is a solvent in which the second film component dissolves.

Also yet more preferably, the second film component has a larger polarity than the first film component.

Also yet more preferably, the second film component is an inorganic material.

Moreover, to attain the above object, the present invention also provides a method of manufacturing a projecting film, comprising a mixed layer formation step of applying a sol-form application liquid comprising a first film component, a second film component and a mixed liquid of a first solvent and a second solvent onto a substrate to form a mixed layer, a phase separation step of selectively removing the first solvent from the mixed layer, and carrying out phase separation of the first solvent and the first film component into an upper layer and the second solvent and the second film component into a lower layer, and a gelation step of removing the second solvent from the mixed layer, and gelating the first film component and the second film component.

Preferably, the first solvent is a solvent in which the second solvent, the first film component and the second film component dissolve uniformly.

More preferably, the first solvent has a lower boiling point than the second solvent.

Also more preferably, the first solvent has a faster evaporation rate than the second solvent.

Yet more preferably, the second solvent is a poor solvent of the first film component.

Also preferably, the first solvent has a lower surface tension than the second solvent.

Also preferably, the second film component has a larger polarity than the first film component.

Also preferably, the first film component is a sol solution in which an alkoxide of a metal selected from the group consisting of silicon, aluminum, titanium, zirconium and tantalum has been subjected to one of hydrolysis and condensation polymerization.

Also preferably, the second film component is an inorganic material.

Also preferably, the first solvent comprises at least one solvent selected from the group consisting of alcohols including methanol, ethanol, propanol and butanol, ketones including acetone and acetylacetone, esters including methyl acetate, ethyl acetate and propyl acetate, and cellosolves including butyl cellosolve.

Also preferably, the second solvent comprises at least one solvent selected from the group consisting of straight-chain glycols having a hydroxyl group at each end thereof represented by the general formula $HO-(CH_2)_n-OH$ wherein n is an integer from 2 to 10 inclusive, and polyhydric alcohols represented by the general formula $HO-(CH_2)_n(CHOH)_m-OH$ ($n \geq 2$, $m \geq 1$).

BRIEF DESCRIPTION OF THE DRAWINGS

FIG. 1 is a flowchart of a manufacturing process of a light-scattering/reflecting substrate having a projecting film according to a first embodiment of the present invention;

FIG. 7A shows a case in which visible light is perpendicularly incident, after a reflecting film 204 has been formed on the internal scattering layer 206;

FIG. 7B shows a case in which a backlight is perpendicularly incident, before the reflective film 204 has been formed on the internal scattering layer 206;

FIG. 10A shows a case in which an interface between an upper layer 403 and a lower layer 402 has a rugged shape;

FIG. 10B shows a case in which the interface between the upper layer 403 and the lower layer 402 is flat;

FIG. 11A shows a case in which the internal scattering layer 206 was formed with no foundation layer (Example 4);

FIG. 11B shows a case in which the internal scattering layer 206 was formed on top of a titania foundation layer (Example 5A);

FIG. 11C shows a case in which the internal scattering layer 206 was formed on top of a silica foundation layer (Example 5B);

FIG. 12A shows the case in which the internal scattering layer 206 was formed with no foundation layer (Example 4);

FIG. 12B shows the case in which the internal scattering layer 206 was formed on top of a titania foundation layer (Example 5A);

FIG. 12C shows a case in which the internal scattering layer 206 was formed on top of a silica foundation layer (Example 5B);

FIG. 13A shows the scattered transmitted light angle distribution;

FIG. 13B shows the reflected light scattering angle distribution;

FIG. 14A shows the scattered transmitted light angle distribution;

FIG. 14B shows the reflected light scattering angle distribution;

FIG. 15A shows the scattered transmitted light angle distribution;

FIG. 15B shows the reflected light scattering angle distribution;

BEST MODE FOR CARRYING OUT THE INVENTION

Figure 2A:
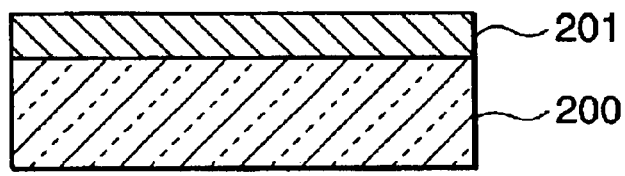
FIGS. 2A to 2D are views useful in explaining the manufacturing process of the light-scattering/reflecting substrate according to the first embodiment of the present invention.

The present inventors carried out assiduous studies to attain the above object. As a result, the present inventors discovered that if a projecting film formed on a substrate has an inorganic material as a principal skeleton thereof, preferably with side chains thereof being modified with an organic material, then adhesion to a reflecting film made of an inorganic material such as a metal or a dielectric substance can be improved, and alteration of the optical properties of the reflecting film can be prevented; moreover, when forming the projecting film on the substrate, by forming another film either beforehand or simultaneously, good adhesion between the projecting film and the substrate can be achieved. The present inventors also discovered that if the other film is formed simultaneously with the projecting film, then in the case that the interface between the projecting film and the other film exhibits a rugged shape, adhesion between the two films can be improved by an anchor effect.

Moreover, the present inventors discovered that if the average surface roughness Ra of the projecting film is at least 30 nm, then the diameter of the projecting parts of the projecting film can be made larger than the wavelength of visible light, and hence the projecting film can be used as an internal scattering layer that scatters visible light.

Moreover, the present inventors discovered that if the average surface roughness Ra of the projecting film is not more than 1000 nm, preferably in a range of 45 to 300 nm, more preferably in a range of 60 to 200 nm, then the adhesion of the projecting film to the reflecting film can be improved and alteration of the optical properties of the reflecting film can be prevented, and moreover a projecting shape suitable for scattering light can be produced.

Moreover, in the case that the projecting film is used in a light-scattering/reflecting substrate of a liquid crystal display apparatus, the reflecting film coated onto the projecting film must be flattened using an overcoat; the present inventors discovered that if the maximum surface roughness Rmax of the projecting film is not more than 10 $\mu$m, preferably not more than 3 $\mu$m, more preferably not more than 1.5 $\mu$m, then this overcoat need not have a large film thickness, and moreover a rugged shape suitable for scattering light can be produced.

Furthermore, the present inventors discovered that if the haze ratio of the projecting film is at least 1%, preferably at least 5%, more preferably at least 10%, then the projecting film exhibits a projecting shape suitable for scattering light, and that if the transmitted color tone value as represented by $|a^2+b^2|$, the square of the vector sum of Hunter color coordinates (a,b), is not more than 10, preferably not more than 5, then transmitted light is not colored, and hence a projecting film ideal for use in transmission mode can be formed.

Moreover, the present inventors discovered that, when forming the projecting film, if the first phase contains a component in which at least one first metal compound has been solidified by a gelation reaction as described below, and the second phase contains a component in which at least one second metal compound having a slower gelation reaction rate than the first metal compound(s) has been solidified by a gelation reaction, and moreover preferably the second metal compound(s) has/have a lower wettability than the first metal compound(s), then phase separation can be carried out such that the second phase is formed on top of the first phase, and moreover the second metal compound(s) can penetrate into the top of the first phase in droplet shapes and can solidify while still in droplet shapes, and hence the shape of the second phase can be made to be a projecting shape suitable for scattering light.

Furthermore, the present inventors discovered that if the internal scattering layer is formed by a sol-gel method using a sol-form application liquid in which are mixed at least the first metal compound(s) and the second metal compound(s) and at least one solvent, and moreover preferably the internal scattering layer contains at least 50 mass % of components made of inorganic materials, then the shape of the internal scattering layer can easily be controlled by selecting the types and mixing proportions of the first metal compound(s) and the second metal compound(s), the type of the solvent(s), and the thickness of application of the sol-form application liquid; moreover, the structure of the internal scattering layer can easily be made to be such that the principal skeleton thereof is an inorganic material, and some of the side chains thereof are modified with an organic material, and hence the adhesion of the internal scattering layer to a reflecting film made of an inorganic material such as a metal or a dielectric substance can be improved.

Furthermore, the present inventors discovered that if each of the first metal compound(s) and the second metal compound(s) is a metal compound capable of undergoing hydrolysis or condensation polymerization, and preferably each of the first metal compound(s) and the second metal compound(s) is an alkoxide of a metal selected from the group consisting of silicon, aluminum, titanium, zirconium and tantalum, and more preferably at least one metal compound out of the first metal compound(s) and the second metal compound(s) is a silicon alkoxide, then solidification of the applied sol-form application liquid by the gelation reaction can be promoted, and the manufacturing process of the internal scattering layer can be simplified and thus the manufacturing cost can be reduced; moreover, the internal scattering layer formed does not absorb light in the visible region, and a light-scattering/reflecting substrate having such an internal scattering layer is suitable for use in a semi-transmission type LCD or a projection type display; furthermore, the first metal compound(s) and the second metal compound(s) in the internal scattering layer can be made to undergo phase separation reliably.

Furthermore, the present inventors discovered that if the composition ratio x:1–x of the component in the internal scattering layer in which the first metal compound(s) has/have been solidified by the gelation reaction to the component in the internal scattering layer in which the second metal compound(s) has/have been solidified by the gelation reaction is such that x is in a range of 0.1 to 0.9, preferably 0.2 to 0.8, more preferably 0.3 to 0.7, then the shape of the second phase in the internal scattering layer can be made to be a projecting shape suitable for scattering light.

Moreover, each of the first metal compound(s) and the second first metal compound(s) may be comprised of one or a plurality of types of metal compounds.

Furthermore, the present inventors discovered that if a sol-form application liquid comprised of a first film component and a mixed liquid of a first solvent and a second solvent is applied onto a substrate to form a mixed layer, then by controlling the weight of the first film component per unit area in the sol-form application liquid, the surface roughness of the projecting film manufactured can be controlled freely. Moreover, by subsequently selectively removing the first solvent from the mixed layer and carrying out phase separation of the first solvent and the first film component into an upper layer and the second solvent into a lower layer, phase separation can be carried out efficiently. Furthermore, by subsequently removing the second solvent from the mixed layer and gelating the first film component, the projecting film can be manufactured without requiring a large number of manufacturing steps.

Furthermore, the present inventors discovered that if a foundation layer made of an inorganic material is formed on the substrate in advance, then a projecting film having good adhesion to the substrate can be formed reliably.

Furthermore, the present inventors discovered that if a sol-form application liquid comprised of a first film component, a second film component and a mixed liquid of a first solvent and a second solvent is applied onto a substrate to form a mixed layer, then by controlling the weight of the first film component per unit area in the sol-form application liquid, the surface roughness of the projecting film manufactured can be controlled freely. Moreover, by subsequently selectively removing the first solvent from the mixed layer and carrying out phase separation of the first solvent and the first film component into an upper layer and the second solvent and the second film component into a lower layer, phase separation can be carried out efficiently. Furthermore, by subsequently removing the second solvent from the mixed layer and gelating the first film component and the second film component, the projecting film can be manufactured without requiring a large number of manufacturing steps.

A detailed description will now be given of embodiments of the projecting film and the manufacturing method thereof according to the present invention, with reference to the drawings.

FIG. 1 is a flowchart of a manufacturing process of a light-scattering/reflecting substrate having a projecting film according to a first embodiment of the present invention.

In general, the sol-gel method is a method in which a sol-form solution is prepared from one or a plurality of compounds each between a metal and an organic or inorganic material, hydrolysis or condensation polymerization of the compound(s) in the sol-form solution is made to occur so that the sol-form solution is solidified by a gelation reaction, and then the solidified sol-form solution is heated to produce one or a plurality of solid metal oxides.

In the gelation reaction, the metal compound(s) undergo a condensation polymerization reaction with removal of water, and thus polymerization occurs in which a metal-oxygen-metal network is formed.

In FIG. 1, a sol-form application liquid 1 in which are mixed a plurality of metal compounds and a solvent is first prepared (step S101).

Alkoxides, carboxylates, nitrates, chlorides, oxychlorides and the like of metals such as silicon, aluminum, titanium, zirconium and tantalum can be used as the metal compounds mixed into the sol-form application liquid 1, but in particular, in the case that the light-scattering/reflecting substrate of the present invention is used in a semi-transmission type LCD or a projection type display transmitting screen, it is preferable to use metal compounds that do not absorb light in the visible region, so that images will be displayed properly with the original color tone.

Moreover, to increase the action of the solvent which has a large surface tension as described below, and thus carry out the phase separation of the plurality of metal compounds reliably, as each of the metal compounds mixed into the sol-form application liquid 1 it is preferable to use a metal compound that produces a solvent having a faster evaporation rate than the solvent having a large surface tension during the drying of the sol-form application liquid 1.

Alcohols including methanol, ethanol, propanol and butanol, ketones including acetone and acetylacetone, esters including methyl acetate, ethyl acetate and propyl acetate, dihydric alcohols (glycols) including ethylene glycol, propylene glycol and hexylene glycol, trihydric alcohols including glycerol, polyhydric alcohols having 4 or more hydroxyl groups in the molecule thereof, cellosolves including ethyl cellosolve and butyl cellosolve, water, and the like can be used as the solvent mixed into the sol-form application liquid 1. However, from experience, it is known that if the sol-form application liquid 1 is made to contain at least 5 mass %, preferably at least 10 mass % of a solvent having a large surface tension, then there is an effect that the phase separation of the plurality of metal compounds during the drying of the sol-form application liquid 1 can be promoted. It is thus particularly preferable to use a dihydric alcohol such as ethylene glycol, a trihydric alcohol such as glycerol, another polyhydric alcohol, or water, which have a surface tension of 30 dyn/cm or more.

Furthermore, a chelating agent, for example a β-diketone such as acetylacetone or a β-ketoester such as ethyl acetoacetate, is preferably mixed into the sol-form application liquid 1. Such a chelating agent has an effect of chelating metal compounds such as metal alkoxides and thus suppressing the reactivity of the metal compounds, and hence is useful as a regulator when preparing the sol-form application liquid 1, allowing the phase separation of the plurality of metal compounds to be controlled precisely.

Next, in step S102, the sol-form application liquid 1 prepared in step S101 is applied onto a glass substrate 200, thus forming a mixed layer 201 on the glass substrate 200 (FIG. 2A).

Next, in step S103, the mixed layer 201 formed on the glass substrate 200 is dried (the solvent contained in the sol-form application liquid 1 is evaporated off), thus forming an internal scattering layer 206 exhibiting a projecting shape.

There are no particular limitations on the method of drying the mixed layer 201, provided the solvent in the sol-form application liquid 1 can be evaporated off. For example, air dying or a method in which the mixed layer 201 is heated to 100° C. or above may be used, or in the case that the solvent has a high boiling point and a slow evaporation rate, a method in which the mixed layer 201 is heated to 200° C. or above may be used.

When the mixed layer 201 is dried by any of the drying methods described above, phase separation of the plurality of metal compounds occurs by the projecting shape formation mechanism described below, and hence an internal scattering layer 206 having a light scattering function is formed.

It is difficult to give a definite explanation of the projecting shape formation mechanism, but having observed the process of formation of the projecting shape, the present inventors have postulated two theories as follows.

Figure 2B:
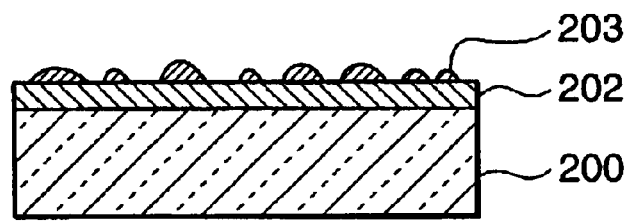

(1) Theory Based on Differences in Rates of Hydrolysis or Condensation Polymerization Reaction Between the Plurality of Metal Compounds If the rate of hydrolysis or condensation polymerization (hereinafter referred to as the "gelation reaction rate") is different for each of the plurality of metal compounds in the mixed layer 201, then solidification through the gelation reaction will start selectively for the group of one or more metal compounds for which the gelation reaction rate is fastest (hereinafter referred to as "group A"), and the group A metal compound(s) will solidify in a flat shape, thus forming a lower layer 202 on the surface of the glass substrate 200 (FIG. 2B).

Moreover, when the lower layer 202 solidifies, the other metal compound(s) for which the gelation reaction rate is slower than for group A (hereinafter referred to as "group B") will penetrate as droplets into the surface of the lower layer 202. At this time, if the wettability is lower for group B than group A, then the group B metal compound(s) that have penetrated into the surface of the lower layer 202 will then start to solidify through the gelation reaction while still maintaining their droplet shape, and hence the group B metal compound(s) will solidify as an upper layer 203 having a projecting shape (FIG. 2B).

(2) Theory Based on Differences in Solubility Between the Plurality of Metal Compounds If the solubility in the solvent is different for each of the plurality of metal compounds in the mixed layer 201, then first group A for which the solubility is low will precipitate out and solidify in a flat shape, thus forming a lower layer 202 on the surface of the glass substrate 200 (FIG. 2B).

Afterwards, group B for which the solubility is greater than group A will precipitate out on top of the lower layer 202. At this time, if the wettability is lower for group B than group A, then the group B metal compound(s) will precipitate out in droplet shapes, and will thus solidify as an upper layer 203 having a projecting shape (FIG. 2B).

According to either theory, through a process in which phase separation of the group A metal compound(s) and the group B metal compound(s) proceeds, an internal scattering layer 206 that is comprised of a lower layer 202 and an upper layer 203 and exhibits a projecting shape is formed.

The projecting shape of the internal scattering layer 206 formed is not necessarily such that recessed parts thereof are formed from the lower layer 202 and projecting parts thereof are formed from the upper layer 203 as shown in FIG. 2B, but may also be such that the surface of the lower layer 202 is completely covered by the upper layer 203. In either case, the projecting parts are formed with a diameter and height in ranges of 1 to 1000 μm and 0.1 to 100 μm respectively, and a sloping shape is produced in which the slope is gentle where the projecting parts and the recessed parts join and the angle of slope here is not more than about 25°.

To make the light-scattering/reflecting substrate manufactured through the process shown in FIG. 1 capable of being used in an LCD, it is necessary for the light-scattering/reflecting substrate to have certain desired light-scattering properties stipulated in accordance with the size of the pixels of the LCD and the like. It is thus preferable for the diameter and height of the projecting parts of the internal scattering layer 206 to be in ranges of 5 to 100 μm and 0.3 to 2 μm respectively, and for the angle of slope where the projecting parts and the recessed parts join to be not more than 15°.

Moreover, to form the desired projecting shape of the internal scattering layer 206, the gelation reaction rate may be controlled by using an acid catalyst or the like in the hydrolysis or condensation polymerization of the metal alkoxides; the gelation reaction rate may be controlled by controlling the concentration of the acid catalyst, the reaction time and so on.

Moreover, the component formed by solidification through the gelation reaction of the metal compound(s) having a fast gelation reaction rate (group A) is rich in the lower layer 202, and the component formed by solidification through the gelation reaction of the metal compound(s) having a slow gelation reaction rate (group B) is rich in the upper layer 203. However, it is not necessary to carry out strict phase separation of the group A metal compound(s) into the lower layer 202 and the group B metal compound(s) into the upper layer 203, but rather the lower layer 202 may contain the group B metal compound(s) to some extent and the upper layer 203 may contain the group A metal compound(s) to some extent.

Figure 3A:
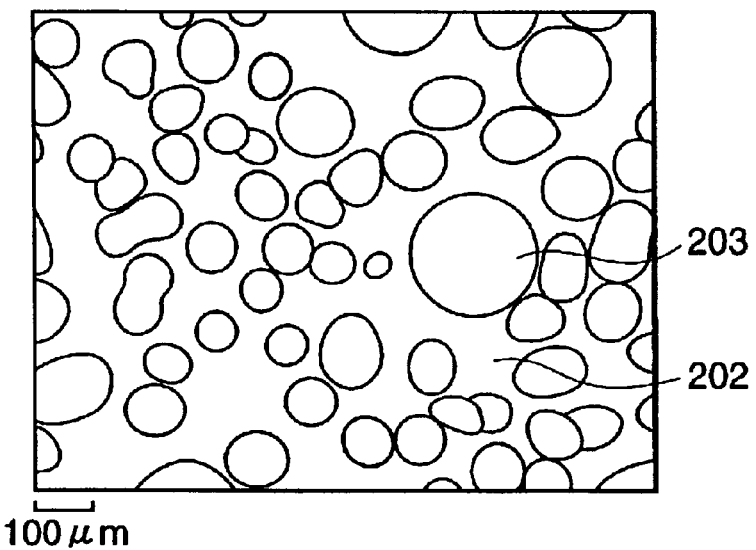
FIGS. 3A to 3C are views useful in explaining the projecting shape of an internal scattering layer 206 formed through step S103 appearing in FIG. 1.
Figure 3B:
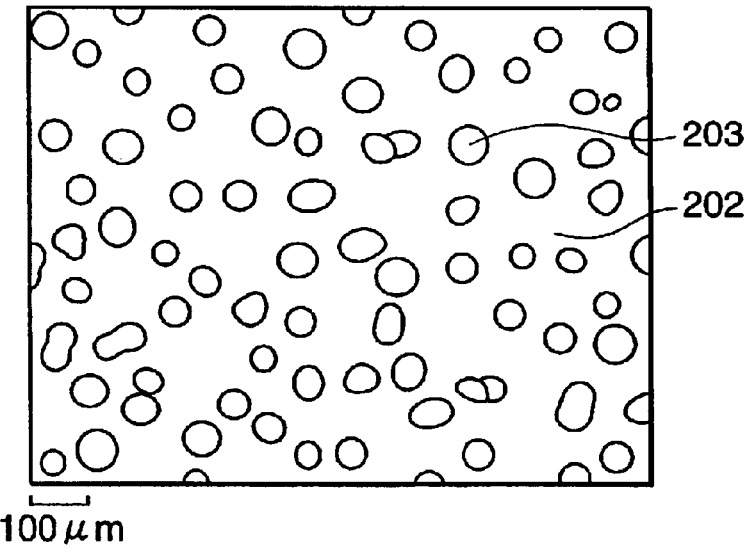
Figure 3C:
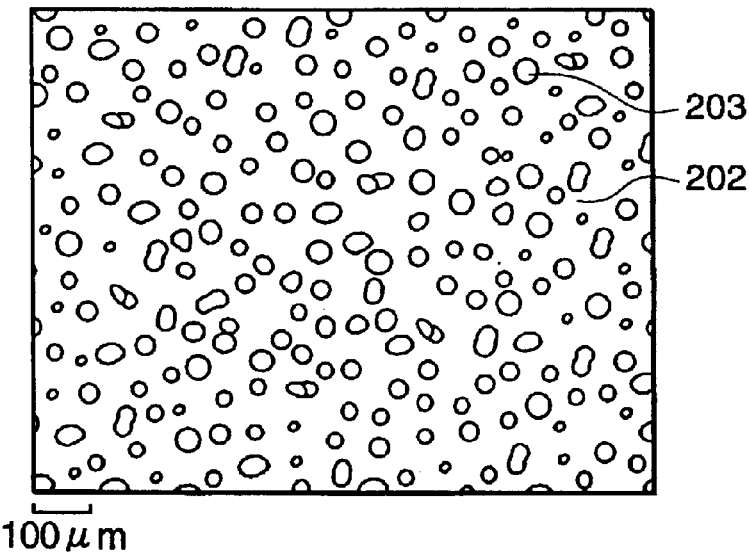

FIGS. 3A to 3C are views useful in explaining the projecting shape of the internal scattering layer 206 formed through step S103 appearing in FIG. 1. FIG. 3A shows a case in which the composition ratio of group A, which is comprised of a titanium alkoxide, to group B, which is comprised of a silicon alkoxide, is 0.3:0.7, FIG. 3B shows a case in which this composition ratio is 0.5:0.5, and FIG. 3C shows a case in which this composition ratio is 0.7:0.3. In FIG. 3B, the diameter and height of the projecting parts are in ranges of about 50 to 100 μm and 1 to 2 μm respectively.

Returning to FIG. 1, in step S104, a reflecting film 204 is formed on top of the internal scattering layer 206 (FIG. 2C), thus completing the manufacturing process of the light-scattering/reflecting substrate.

The reflecting film 204 is formed to a uniform thickness on the projecting shape of the internal scattering layer 206, and hence the reflecting film 204 also exhibits a projecting shape.

A thin metal film having a reflectance of at least 50% can be used as the reflecting film 204.

The material of the thin metal film is selected from aluminum, silver and alloys having these metals as a principal component thereof. The thin metal film may be comprised of either a single layer or a plurality of layers made of different metallic materials. Moreover, to increase the reflectance of the thin metal film, a reflection-increasing layer made of a dielectric substance may be added to the thin metal film.

Figure 2C:
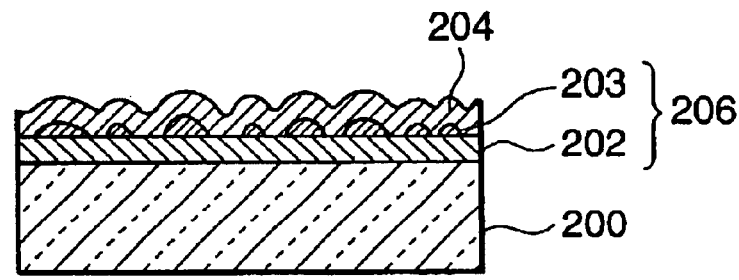

FIG. 2C is a schematic sectional view showing the constitution of the completed light-scattering/reflecting substrate manufactured through the light-scattering/reflecting substrate manufacturing process shown in FIG. 1.

In FIG. 2C, the light-scattering/reflecting substrate is comprised of the glass substrate 200, the internal scattering layer 206 comprised of the lower layer 202 having the group A metal compound(s) as the principal component thereof formed on a surface of the glass substrate 200, and the projecting-shaped upper layer 203 having the group B metal compound(s) as the principal component thereof dotted over the lower layer 202, and the reflecting film 204 comprised of the thin metal film formed on top of the internal scattering layer 206.

Figure 2D:
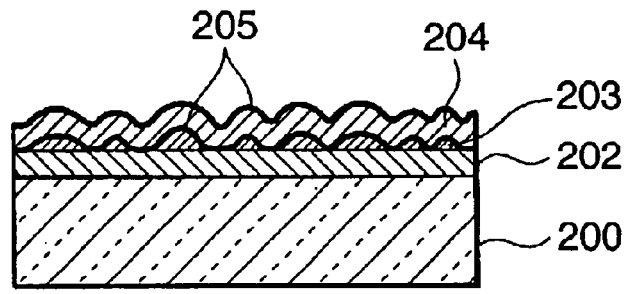

In the reflecting film 204, to prevent oxidation of and increase the chemical durability of the thin metal film, stable metal oxide films 205 may be formed above and below the thin metal film, thus forming a sandwich structure (FIG. 2D).

The thicknesses of the thin metal film and the metal oxide films 205 are determined such that coloration due to reflected light interference does not occur; the reflectance can be varied freely by changing these film thicknesses.

According to the manufacturing process shown in FIG. 1, a sol-form application liquid 1 in which are mixed a plurality of metal compounds and a solvent is prepared (step S101), the prepared sol-form application liquid 1 is applied onto a glass substrate 200 (step S102), and the sol-form application liquid 1 applied onto the glass substrate 200 is dried, thus forming the internal scattering layer 206 (step S103 ). As a result, the internal scattering layer 206 can be formed without requiring a large number of manufacturing steps. Moreover, because the plurality of metal compounds are metal alkoxides such as titanium alkoxides and silicon alkoxides, the adhesion of the internal scattering layer 206 to the reflecting film 204 comprised of a thin metal film can be improved, and in addition there is no discharge as a gas of components adsorbed on the surface of the internal scattering layer 206 or unreacted components inside the internal scattering layer 206. As a result of all of the above, the cost of manufacturing the light-scattering/reflecting substrate can be reduced, and peeling off of the reflecting film 204 and alteration of the optical properties of the reflecting film 204 can be prevented.

Moreover, in step S104, a semi-transmitting film may be formed on the internal scattering layer 206; a thin dielectric film can be used as this semi-transmitting film.

The thin dielectric film is formed as a multi-layer film in which are formed a plurality of pairs each comprised of a low-refractive-index layer and a high-refractive-index layer. Silicon oxide or magnesium fluoride can be used as the material of the low-refractive-index layers, and titanium oxide or tantalum oxide can be used as the material of the high-refractive-index layers. Such a thin dielectric film is suitable as the semi-transmitting film since there is no optical absorption.

It should be noted that the light-scattering/reflecting substrate manufactured through the process shown in FIG. 1 (FIG. 2C) can not only be used in an internal scattering/reflecting plate form reflection type LCD, semi-transmission type LCD or projection type display transmitting screen as described above, but may also be used in an external scattering/reflecting plate form, front diffusing plate form or liquid crystal scattering form reflection type LCD, semi-transmission type LCD or projection type display transmitting screen as described in "FPD Intelligence, February 2000 edition (pages 66 to 69)".

Moreover, the light-scattering properties of the light-scattering/reflecting substrate described above are such that the reflectance is uniform in a range of at least ±15° from the direction of specular reflection of incident light, and hence the light-scattering properties required of light-scattering/reflecting substrates used in reflection type LCDs of the above forms are largely satisfied. Furthermore, the reflectance and transmittance of the light-scattering/reflecting substrate described above are both at least 50%, and hence the reflectance and transmittance required of light-scattering/reflecting substrates used in semi-transmission type LCDs or projection type display transmitting screens of the above forms are largely satisfied.

In step S103, as the condensation polymerization of the group A metal compound(s) and the group B metal compound(s) proceeds, the structures of the lower layer 202 and the upper layer 203 become dense, and hence the lower layer 202 and the upper layer 203 each becomes a firm phase. However, volumetric shrinkage of the group A and the group B proceeds, and hence film stress is generated inside the lower layer 202 and the upper layer 203.

This film stress becomes bigger in proportion to the thicknesses of the lower layer 202 and the upper layer 203, and in particular if these thicknesses exceed 1 $\mu$m, then problems may arise such as cracks occurring in the lower layer 202 and the upper layer 203 and adhesive strength to the glass substrate 200 dropping. It is thus necessary to relax the film stress.

So that the film stress will be relaxed, it is preferable to use metal compounds in which a metal and an organic functional group are bonded together directly.

Organic functional groups that are known to be effective in relaxing the film stress include allyl groups, alkyl groups, vinyl groups, glycidyl groups, phenyl groups, methacryloxy groups, mercapto groups and amino groups. Many metal compounds akin to silane compounds are known as metal compounds in which a metal and such an organic functional group are bonded together directly. In particular, there are many metal compounds akin to silane compounds that are inexpensive and readily obtainable, and thus are suitable for use as the metal compounds in step S101.

Figure 4:
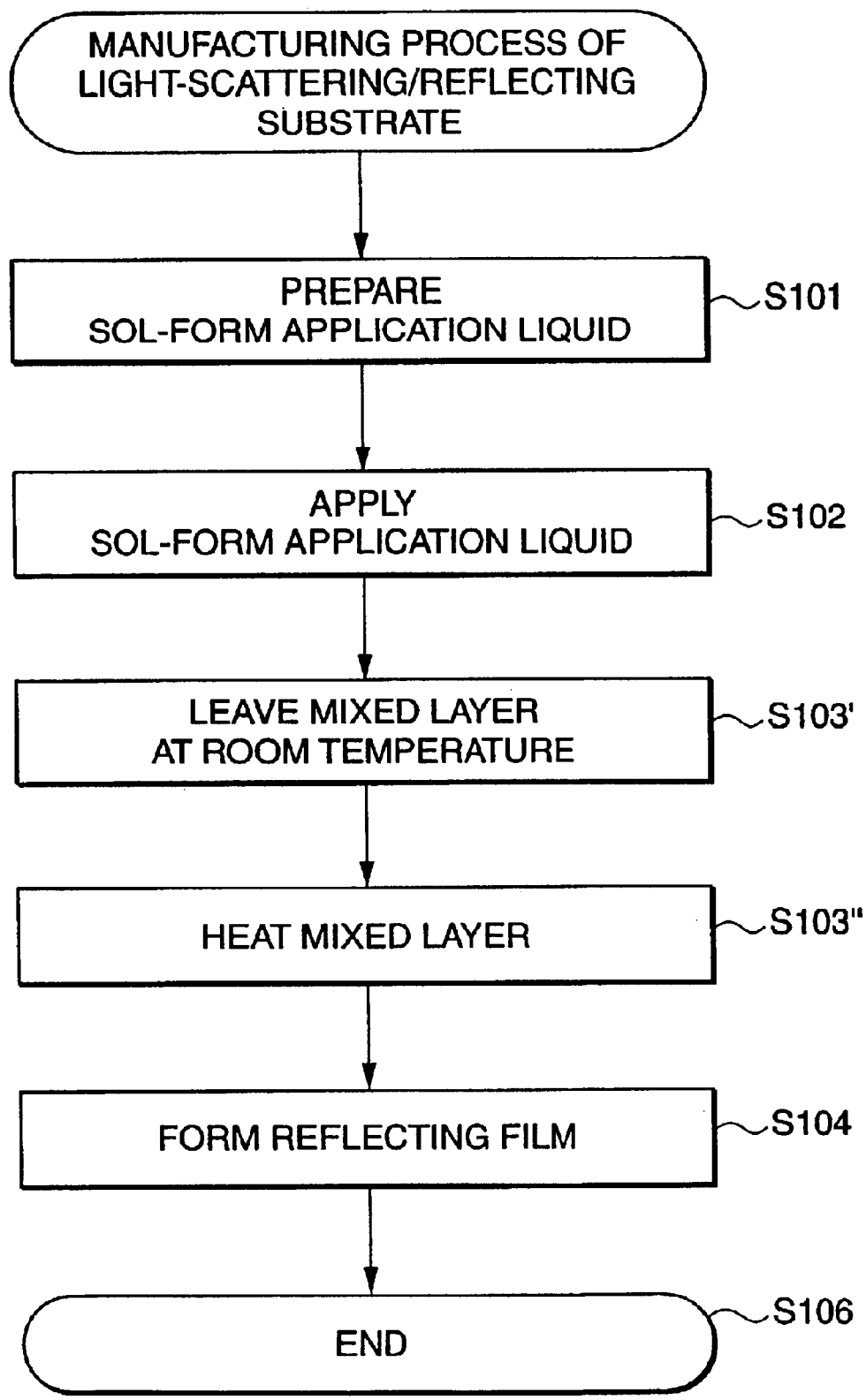
FIG. 4 is a flowchart of a manufacturing process of a light-scattering/reflecting substrate having a projecting film according to a second embodiment of the present invention.
Figure 5:
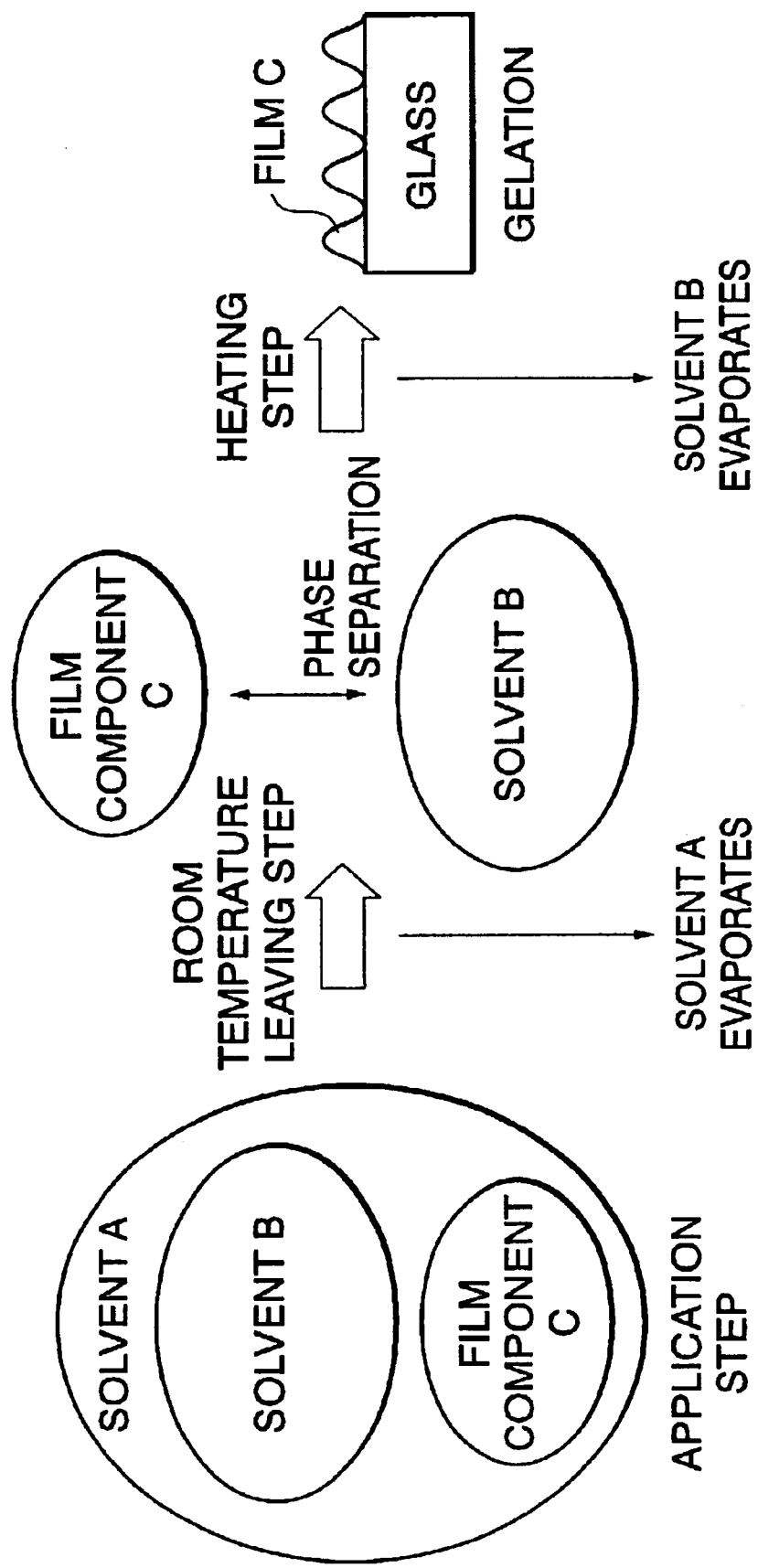
FIG. 5 is a conceptual diagram of the manufacturing method of the light-scattering/reflecting substrate according to the second embodiment of the present invention.

FIG. 4 is a flowchart of a manufacturing process of a light-scattering/reflecting substrate having a projecting film according to a second embodiment of the present invention. In the following description of the manufacturing process of FIG. 4, reference is made as required to FIG. 5, which is a conceptual diagram of the manufacturing method of the light-scattering/reflecting substrate according to the second embodiment, and FIGS. 6A to 6E, which are views useful in explaining the manufacturing process of the light-scattering/ reflecting substrate according to the second embodiment.

The second embodiment of the present invention is fundamentally similar to the first embodiment in that the projecting film is formed using the sol-gel method, and hence equivalent constituent elements are designated by the same reference numeral in both embodiments.

In FIG. 4, a sol-form application liquid 2 in which are mixed the solvent A, the solvent B and the film component C is first prepared (step S101).

The solvent A is a solvent in which the solvent B and the film component C dissolve uniformly. Specifically, a single solvent selected from the group consisting of alcohols including methanol, ethanol, propanol and butanol, ketones including acetone and acetylacetone, esters including methyl acetate, ethyl acetate and propyl acetate, cellosolves including ethyl cellosolve and butyl cellosolve, and glycols including hexylene glycol and 1,2-propanediol, or a mixed solvent thereof, can be used as the solvent A.

The solvent B is a solvent that has a higher boiling point and a slower evaporation rate than the solvent A, and is a poor solvent of the film component C. As a result, the solvent A evaporates preferentially and thus the relative concentration of the solvent B in the sol-form application liquid 2 rises, and hence phase separation of the solvent B and the film component C which are not compatible with one another is promoted. Specifically, it is effective to use either a single solvent selected from the group consisting of straight-chain glycols having a hydroxyl group at each end thereof represented by the general formula HO—$(CH_2)_n$— OH, and polyhydric alcohols represented by the general formula HO—$(CH_2)_n(CHOH)_m$—OH, or a mixed solvent thereof, as the solvent B. If n is greater than 10, then the melting point will become too high and hence it will be hard to form the application liquid. It is thus preferable to use a glycol as above wherein n is between 2 and 10 inclusive. Moreover, even amongst glycols, it is known from experience that if a glycol having a low surface tension (for example less than 30 dyn/cm) such as 1,2-propanediol ($HOCHOHCH_3$, common name propylene glycol) or 2-methyl-2,4-pentanediol ($CH_3COH(CH_3)CH_2CH(OH)$ CH$_3$, common name hexylene glycol) is used as the solvent B, then phase separation does not occur, and hence it is not desirable to use such a glycol.

Specific examples of the solvent B include ethylene glycol, 1,3-propanediol, 1,4-butanediol, 1,5-pentanediol, 1,6-hexanediol, glycerol and 1,2,4-butanetriol.

It should be noted that the "evaporation rate" here is defined as the relative evaporation rate at 25° C. where the evaporation time for n-butyl acetate (CH$_3$COO(CH$_2$)$_3$CH$_3$) is taken to be 100, and can be obtained from the following equation.

Relative evaporation rate for solvent=(evaporation time for n-butyl acetate)/(evaporation time for solvent)×100

The film component C is a sol solution in which a compound in which the principal skeleton is formed from an inorganic material, specifically an alkoxide of a metal selected from the group consisting of silicon, aluminum, titanium, zirconium and tantalum, has been subjected to hydrolysis or condensation polymerization. These metal alkoxides are readily obtainable, are stable at normal temperatures and pressures, and are non-toxic, and thus enable the light-scattering/reflecting substrate manufacturing process to be made simple and hence the manufacturing cost to be reduced. In addition, these metal alkoxides do not cause light absorption in the visible region, and hence transmitted light is not colored, and thus it is possible to form a projecting film ideal for use in transmission mode.

Figure 6A:
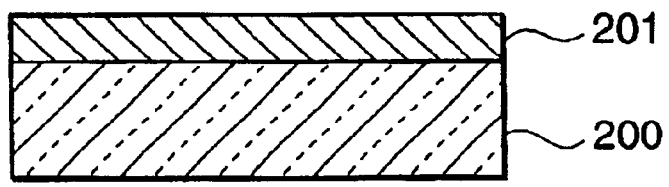
FIGS. 6A to 6E are views useful in explaining the manufacturing process of the light-scattering/reflecting substrate according to the second embodiment of the present invention.
Figure 6B:
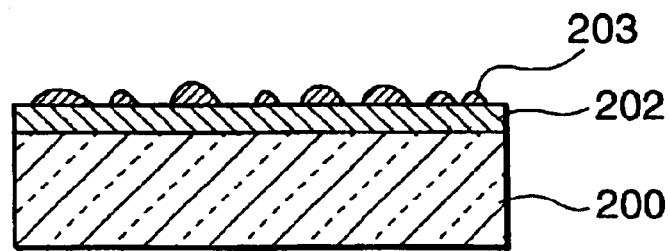

Next, in step S102, the sol-form application liquid 2 is applied onto a glass substrate 200 (the application step in FIG. 5), thus forming a mixed layer 201 on the glass substrate 200 (FIG. 6A). Then, in step S103', the glass substrate 200 on which the mixed layer 201 has been formed is left at room temperature (the room temperature leaving step in FIG. 5), whereupon the solvent A evaporates from the mixed layer 201, and hence the mixed layer 201 undergoes phase separation into a lower layer 202 comprised predominantly of the solvent B and an upper layer 203 comprised predominantly of the film component C (FIG. 6B).

The phase separation of the mixed layer 201 is promoted by the solvent A in the sol-form application liquid 2 evaporating preferentially. Moreover, this phase separation also utilizes the difference in polarity (surface tension) and specific gravity between the upper layer 203 and the lower layer 202. Specifically, in the case that the substrate is made of a glass having a high surface energy as in the present embodiment, it is energetically more favorable for the surface of the glass substrate 200 to be covered by the lower layer 202 comprised predominantly of the solvent B, which has a high polarity, than to be covered by the upper layer 203 comprised predominantly of the film component C, this being due to the wettabilities of the film component C and the solvent B. This, and the larger specific gravity of the solvent B relative to the film component C, results in phase separation occurring as shown in FIG. 6B.

Because the film component C has a poorer wettability than the solvent B, the upper layer 203 comprised predominantly of the film component C becomes dotted over the surface of the lower layer 202, i.e. the upper layer 203 has a shape comprised of projecting parts dotted over the lower layer 202. It should be noted, however, that the upper layer 203 need not be dotted over the surface of the lower layer 202, but rather may alternatively have a rugged shape in which the whole surface of the lower layer 202 is covered by the upper layer 203.

The shape of the projecting parts is controlled by controlling the surface roughness of the upper layer 203, i.e. the maximum surface roughness (Rmax) and the average surface roughness (Ra) of the surface of the upper layer 203. The surface roughness is controlled by adjusting the polarities of the film component C and the solvent B, and the weight of the film component C in the sol-form application liquid 2 per unit area. Specifically, the lower the polarity of the film component C, the higher the polarity of the solvent B, and the higher the weight of the film component C in the sol-form application liquid 2 per unit area, then the poorer the wettability of the film component C and hence the higher the surface roughness.

It is known from experience that, of these parameters, the weight of the film component C in the sol-form application liquid 2 per unit area has the strongest influence.

It is preferable to control the surface roughness of the upper layer 203 such that Rmax is not more than 10 μm and Ra is in a range of 30 to 1000 nm; this can be done by making the weight of the film component C in the sol-form application liquid 2 per unit area be in a range of 0.1 ng/cm$^2$ to 10 μg/cm$^2$, preferably 1 ng/cm$^2$ to 1 μg/cm$^2$. If Ra of the upper layer 203 is less than 30 nm, then the internal scattering layer 206 will hardly scatter light. Moreover, if Rmax exceeds 10 μm and Ra exceeds 1000 nm, then there will be a drop in the adhesion between the internal scattering layer 206 and the glass substrate 200 and a yellowing of the internal scattering layer 206.

It is more preferable to control the surface roughness of the upper layer 203 such that Rmax is not more than 3 μm and Ra is in a range of 45 to 300 nm. As a result, the diameter of the projecting parts becomes larger than the wavelength of visible light, and hence visible light can be scattered. Moreover, to carry out the scattering of visible light reliably, it is yet more preferable to control the surface roughness such that Rmax is not more than 1.5 μm and Ra is in a range of 60 to 200 nm.

Next, in step S103", the upper layer 203 and the lower layer 202 that have been created through the phase separation in step S103' are heated (the heating step in FIG. 5), thus forming the internal scattering layer 206 having a light-scattering function.

Figure 6C:
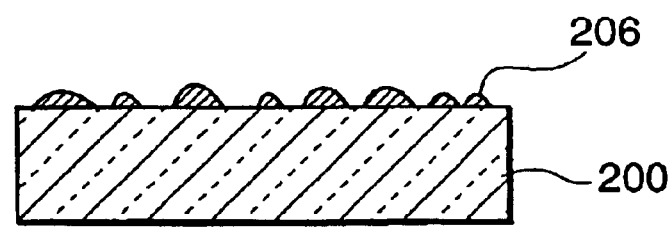
Figure 6D:
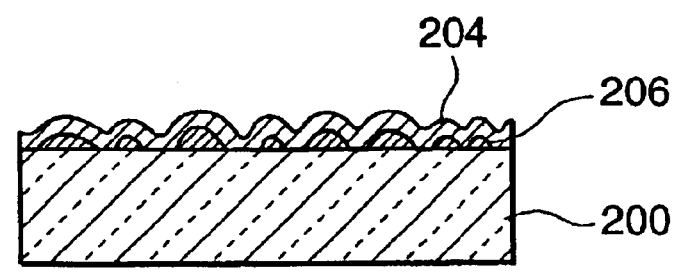

In the heat treatment, the lower layer 202 comprised of the solvent B is evaporated off, and in the upper layer 203 having the projecting shape, the film component C is gelated and thus solidified (FIG. 6C). The desired projecting shape of the internal scattering layer 206 can thus be formed not only by controlling the surface roughness as described above, but also by controlling the gelation reaction rate of the film component C. The gelation reaction rate can be controlled, for example, by the concentration of an acid catalyst and/or the reaction time.

As the gelation reaction proceeds, the structure of the internal scattering layer 206 comprised of the film component C becomes dense and hence this layer becomes a firm phase. However, volumetric shrinkage of the film component C proceeds, and hence film stress is generated inside the internal scattering layer 206. This film stress arises due to the internal scattering layer 206 forming the projecting shape, and increases in proportion to the film thickness.

If film stress is generated in the internal scattering layer 206 as described above, then problems may arise such as cracks occurring in the internal scattering layer 206 and adhesion to the glass substrate 200 dropping. It is thus preferable to use an organically modified metal alkoxide as the film component C, so that the film stress will be relaxed.

In general, organic functional groups that are known to be effective in relaxing the film stress include allyl groups, alkyl groups, vinyl groups, glycidyl groups, phenyl groups, methacryloxy groups, mercapto groups and amino groups. Many metal compounds akin to silane compounds are known as metal compounds in which a metal and such an organic functional group are bonded together directly. In particular, there are many metal compounds akin to silane compounds that are inexpensive and readily obtainable, and thus are suitable for use as the film component C.

Moreover, it is preferable for the film component C to have an inorganic material as the principal skeleton thereof, and for side chains thereof to be organically modified with an organic functional group having excellent heat resistance. An organic functional group that has poor heat resistance will be prone to yellowing or detachment through thermal decomposition, and hence if the film component C is organically modified with such an organic functional group then cracks may occur inside the film component C when the film component C is gelated.

In general, organic functional groups having the best heat resistance (resistant, for example, to 300° C. or above) are alkyl groups and phenyl groups, but depending on the thickness of application, it may be suitable to use another functional group such as an allyl group, a vinyl groups, a glycidyl group, a methacryloxy group, a mercapto group or an amino group, or a mixture of a plurality thereof.

The internal scattering layer 206 formed as described above is manufactured such that the haze ratio, which is a light scattering index measured by the cloudiness value measurement method described in JIS-K7105-1981, is at least 1%, preferable at least 5%, more preferably at least 10%, and such that the transmitted color tone value as represented by $|a^2+b^2|$, the square of the vector sum of the Hunter color coordinates (a,b), which are transmitted color tone indices as described in JISR3106 is not more than 10, preferably not more than 5.

Next, in step S104, a reflecting film 204 is formed on top of the internal scattering layer 206 formed through step S103" (FIG. 6D), thus completing the manufacturing process.

The reflecting film 204 is formed to a uniform thickness on top of the internal scattering layer 206 which has a projecting shape or a rugged shape, and hence the reflecting film 204 also exhibits a rugged shape.

A thin metal film, or a thin dielectric film having a reflectance of at least 50%, can be used as the reflecting film 204.

In the case that a thin metal film is used as the reflecting film 204, the material of the thin metal film is selected from aluminum, silver and alloys having these metals as a principal component thereof, and the thin metal film may be comprised of either a single layer or a plurality of layers made of different metallic materials. Moreover, to increase the reflectance of the thin metal film, a reflection-increasing layer made of a dielectric substance may be added to the thin metal film.

In the case that a thin dielectric film is used as the reflecting film 204, on the other hand, the reflecting film 204 is formed as a multi-layer film in which are formed a plurality of pairs each comprised of a low-refractive-index layer and a high-refractive-index layer. Silicon oxide or magnesium fluoride can be used as the material of the low-refractive-index layers, and titanium oxide or tantalum oxide can be used as the material of the high-refractive-index layers. Such a thin dielectric film is suitable for use as a semi-transmitting film since there is no optical absorption.

Figure 6E:
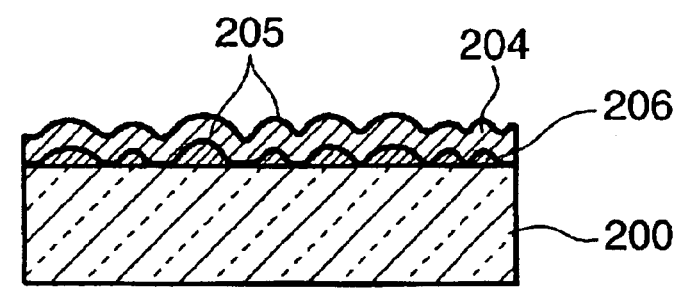

Furthermore, to prevent oxidation and increase chemical durability, stable metal oxide films 205 may be disposed at the interface between the internal scattering layer 206 and the reflecting film 204 and on the outer surface of the reflecting film 204 (FIG. 6E). The thicknesses of the reflecting film 204 and the metal oxide films 205 are determined such that coloration due to reflected light interference does not occur; the reflectance can be varied freely varied by changing these film thicknesses.

Moreover, in the case of realizing a semi-transmission type LCD that has a bright display screen due to external light being concentrated in the viewing direction, it is preferable for the reflected light scattering angle distribution of the light-scattering/reflecting substrate to be within a range of ±40° in terms of solid angle from the angle of specular reflection, and for the scattered transmitted light angle distribution to be within a range of ±20° in terms of solid angle.

A description will now be given of a method of controlling the reflected light scattering angle distribution and the scattered transmitted light angle distribution of the light-scattering/reflecting substrate with reference to FIGS. 7A and 7B.

Figure 7A:
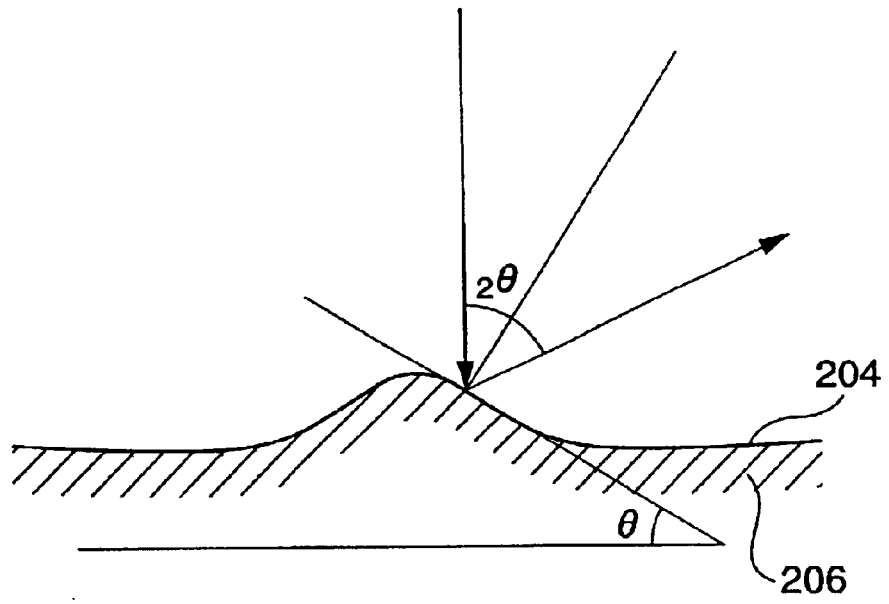
FIGS. 7A and 7B are views useful in explaining a method of controlling the reflected light scattering angle distribution and the scattered transmitted light angle distribution; specifically.
Figure 7B:
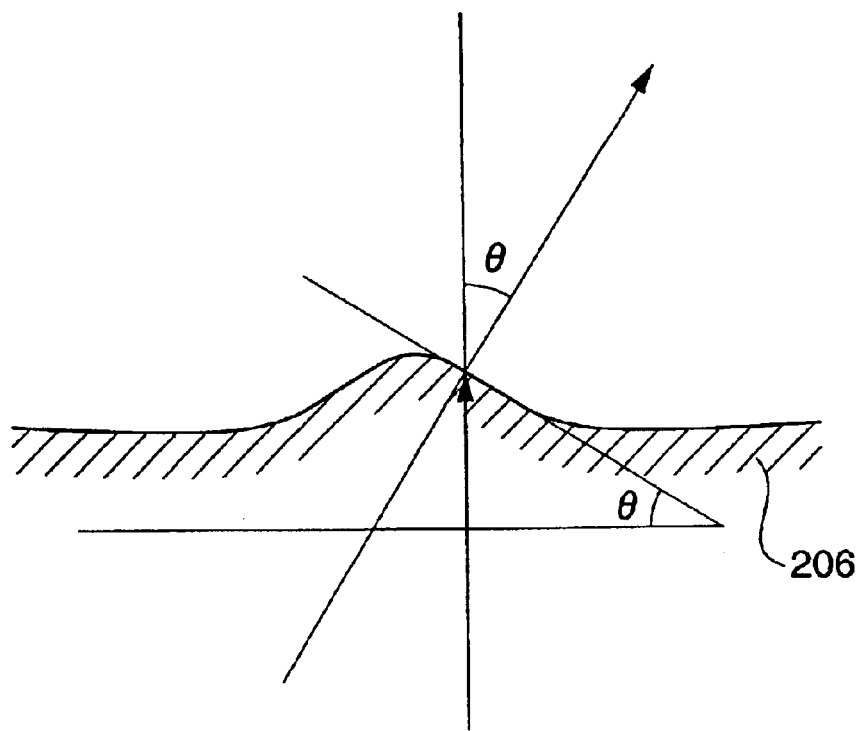

FIGS. 7A and 7B are views useful in explaining the method of controlling the reflected light scattering angle distribution and the scattered transmitted light angle distribution. Specifically, FIG. 7A shows a case in which visible light is perpendicularly incident after the reflecting film 204 has been formed on the internal scattering layer 206, and FIG. 7B shows a case in which a backlight is perpendicularly incident before the reflective film 204 has been formed on the internal scattering layer 206.

In FIGS. 7A and 7B, the projecting shape formed on the surface of the internal scattering layer 206 is gently sloping, and hence the surface of the reflecting film 204, which is formed to a uniform thickness on the surface of the internal scattering layer 206, also has a gently sloping shape (FIG. 7A).

When visible light is perpendicularly incident on such a reflecting film 204, if the influence of the refractive index and the reflectance of the internal scattering layer 206 and the reflecting film 204 are not considered, then the maximum value of the scattering angle of the reflected light is 2θ, where θ is the maximum value of the angle of slope (FIG. 7A). Moreover, when a backlight is perpendicularly incident on the internal scattering layer 206 before such a reflecting film 204 has been formed on the surface of the internal scattering layer 206, the maximum value of the angle of scattered transmitted light is θ, the maximum value of the angle of slope (FIG. 7B).

The reflected light scattering angle distribution and the scattered transmitted light angle distribution can thus be controlled by controlling θ, the maximum value of the angle of slope of the internal scattering layer 206.

According to the manufacturing process of the second embodiment described above (FIG. 4), a sol-form application liquid 2 is prepared by mixing together two solvents A and B and a film component C (step S101), the prepared sol-form application liquid 2 is applied onto a glass substrate 200 to form a mixed layer 201 on the glass substrate 200 (step S102), the glass substrate 200 with the mixed layer 201 formed thereon is left at room temperature, thus evaporating off the solvent A and hence carrying out phase separation into an upper layer 203 and a lower layer 202 (step S103'), and then the mixed layer 201 is heated, thus evaporating off the solvent B in the lower layer 202 and gelating the film component C in the upper layer 203 to form an internal scattering layer 206 (step S103"). As a result, the size of projecting parts formed on the surface of the internal scattering layer 206 can be controlled freely with few manufacturing steps. Moreover, the internal scattering layer 206 is formed from the film component C which is comprised of a compound having the principal skeleton thereof formed from an inorganic material. As a result, the adhesion of the internal scattering layer 206 to a reflecting film 204, which is made of an inorganic material and is formed on the internal scattering layer 206 (step S104), can be improved. Furthermore, because the principal skeleton of the internal scattering layer 206 is not an organic material, discharge as a gas of components adsorbed on the surface of the internal scattering layer 206 or unreacted components inside the internal scattering layer 206 can be prevented, and hence alteration of the optical properties of the reflecting film 204 can be prevented.

Moreover, in the second embodiment, a foundation layer may be formed on the surface of the glass substrate 200 in advance to improve the adhesion between the glass substrate 200 and the internal scattering layer 206.

The manufacturing process of this foundation layer is comprised of an application step in which a sol-form application liquid 2' in which are mixed a solvent X and a film component Y is applied uniformly onto the glass substrate 200, and a heating step in which heating is carried out to evaporate off the solvent X and gelate the film component Y.

The solvent X should be a solvent in which the film component Y dissolves; specifically, a single solvent selected from the group consisting of alcohols including methanol, ethanol, propanol and butanol, ketones including acetone and acetylacetone, esters including methyl acetate, ethyl acetate and propyl acetate, dihydric alcohols (glycols) including ethylene glycol, propylene glycol and hexylene glycol, trihydric alcohols including glycerol, polyhydric alcohols having 4 or more hydroxyl groups in the molecule thereof, cellosolves including ethyl cellosolve and butyl cellosolve, water, and the like, or a mixed solvent thereof, can be used.

The film component Y is an inorganic material. By using the gelated film component Y as a foundation layer, a foundation layer having a polarity reliably larger than that of the internal scattering layer 206, which has the gelated film component C as the principal component thereof, can be formed, and hence adhesion of the internal scattering layer 206 to the glass substrate 200 can be reliably improved.

A detailed description will now be given of a method of manufacturing a light-scattering/reflecting substrate having a projecting film according to a third embodiment of the present invention, with reference to the drawings.

Figure 8:
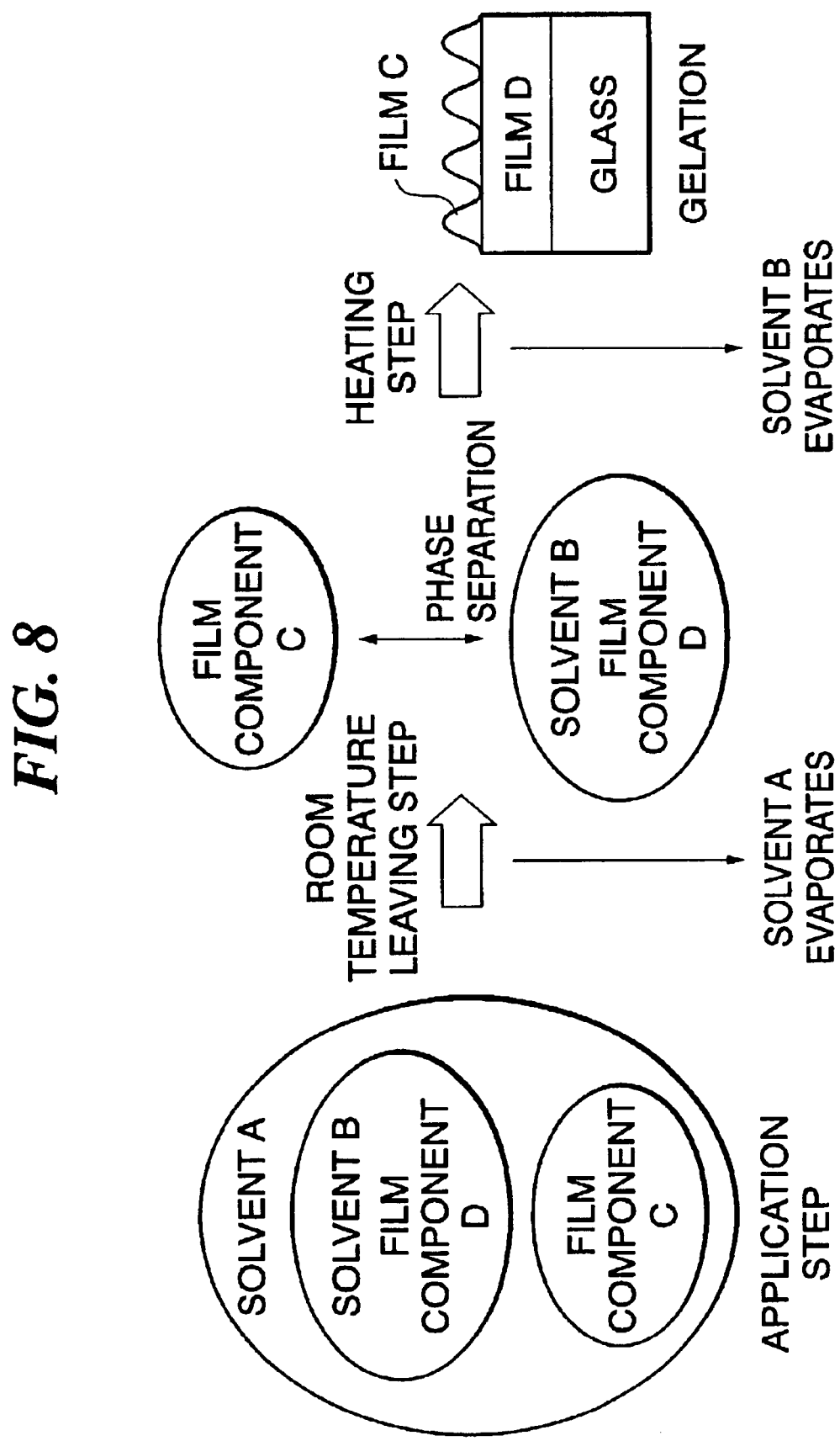
FIG. 8 is a conceptual diagram of the manufacturing method of a light-scattering/reflecting substrate according to a third embodiment of the present invention.

The method of manufacturing a light-scattering/reflecting substrate according to the third embodiment is carried out following the flowchart of FIG. 4. In the following explanation, reference is made as appropriate to FIG. 8, which is a conceptual diagram of the manufacturing method of the light-scattering/reflecting substrate according to the third embodiment, and FIGS. 9A to 9C, which are views useful in explaining the manufacturing process of the light-scattering/reflecting substrate according to the third embodiment.

In FIG. 4, a sol-form application liquid 3 in which are mixed two solvents A and B and two film components C and D is first prepared (step S101).

The film component D is an inorganic material that is compatible with the solvent A and the solvent B, and hence the polarity of the film component D can reliably be made bigger than that of the film component C, and thus the phase separation described below can be promoted. Moreover, through this phase separation, a layer comprised of the gelated film component D is formed between the glass substrate 200 and an upper layer 403 having the gelated film component C as the principal component thereof, and hence the adhesion of the internal scattering layer 206 to the glass substrate 200 can be improved.

Moreover, in the case that a highly reactive metal alkoxide is used as the film component C, it is preferable to carry out stabilization using a chelating agent, for example a β-diketone such as acetylacetone or a β-ketoester such as ethyl acetoacetate. If such stabilization using a chelating agent is carried out, then handling becomes easier, and moreover by changing the chelating agent, the polarity of the stabilized material can be changed, and hence the phase separation can be controlled.

Figure 9A:
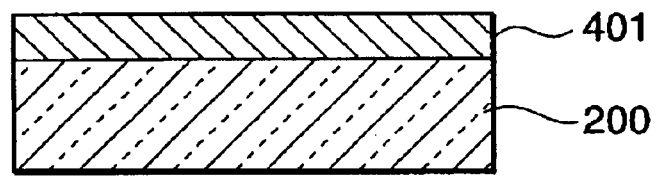
FIGS. 9A to 9C are views useful in explaining the manufacturing process of the light-scattering/reflecting substrate according to the third embodiment of the present invention.
Figure 9B:
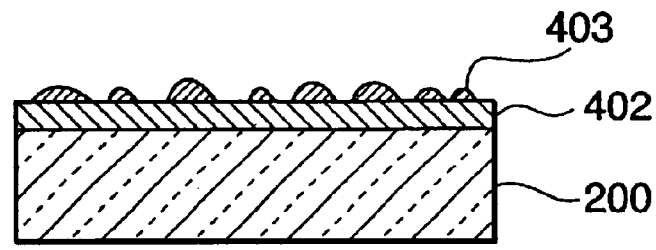

Next, in step S102, the sol-form application liquid 3 is applied onto a glass substrate 200 (the application step in FIG. 8), thus forming a mixed layer 401 on the glass substrate 200 (FIG. 9A). Then, in step S103', the glass substrate 200 on which the mixed layer 401 has been formed is left at room temperature (the room temperature leaving step in FIG. 8), thus evaporating the solvent A from the mixed layer 401, and bringing about phase separation of the mixed layer 401 into a lower layer 402 comprised predominantly of the solvent B and the film component D and an upper layer 403 comprised predominantly of the solvent A and the film component C (FIG. 9B).

The phase separation of the mixed layer 401 is promoted by the solvent A in the sol-form application liquid 3 evaporating preferentially.

As in the second embodiment, this phase separation utilizes the difference in polarity and specific gravity between the upper layer 403 and the lower layer 402. Moreover, as a result of the phase separation, the lower layer 402 becomes rich in the film component D, but the upper layer 403 may also contain the film component D to some extent.

Moreover, the surface shape of the upper layer 403 obtained through the phase separation and the control thereof are as described above for the second embodiment. As in the second embodiment, the surface roughness of the upper layer 403 is thus preferably controlled by controlling the weight of the film component C in the sol-form application liquid 3 per unit area, such that Rmax is not more than 10 μm, preferably not more than 3 μm, more preferably not more than 1.5 μm, and Ra is in a range of 30 to 1000 nm, preferably 45 to 300 nm, more preferably 60 to 200 nm.

Figure 9C:
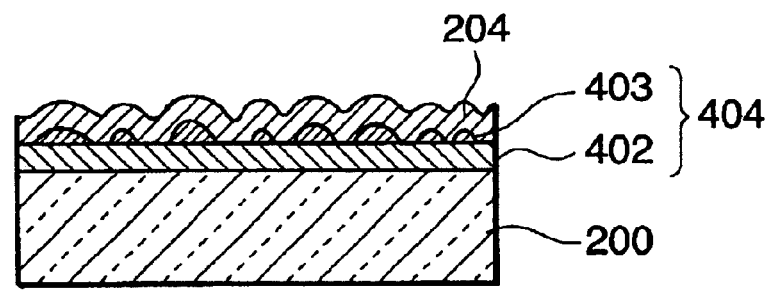

Next, in step S103", the upper layer 403 and the lower layer 402 that have been created through the phase separation in step S103' are heated (the heating step in FIG. 8), thus forming the internal scattering layer 404 having a light-scattering function (FIG. 9C).

In this heating step, the solvent B is evaporated off from the lower layer 402, and the film component D is gelated and hence the lower layer 402 is solidified.

Moreover, depending on the components mixed into the sol-form application liquid 3, it may be possible to omit the room temperature leaving step described above, and to carry out the phase separation described above, and the evaporation of the solvent B from the lower layer 402 and the gelation of the film component D, simultaneously in the heating step.

Moreover, the upper layer 403 having the projecting shape is solidified through the gelation of the film component C. At this time, if film component D is contained in the upper layer 403, then solidification will take place through the gelation of a copolymer of the film components C and D. The desired projecting shape of the internal scattering layer 404 can thus be formed not only by controlling the surface roughness as described above, but also by controlling the gelation reaction rate of the film components C and D and the copolymer thereof. The gelation reaction rate can be controlled, for example, by the concentration of an acid catalyst and/or the reaction time.

It should be noted that the lower layer 402 having the gelated film component D as the principal component thereof is different to the upper layer 403 having the gelated film component C as the principal component thereof in that the lower layer 402 basically does not form a projecting shape. As a result, a large film stress is not generated in the lower layer 402, and hence cracks do not appear. Moreover, to carry out the phase separation of the film component C and the film component D reliably, it is preferable for organic components that greatly influence the surface tension not to be contained in the film component D. Unlike the film component C, it is thus not necessarily necessary to use an organically modified compound in the film component D.

Figure 10A:
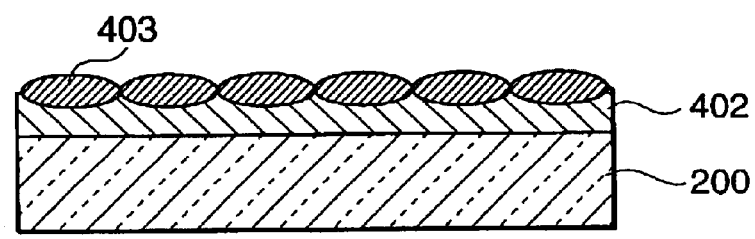
FIGS. 10A and 10B are sectional views showing examples of different forms of the internal scattering layer 404 appearing in FIG. 9C; specifically.
Figure 10B:
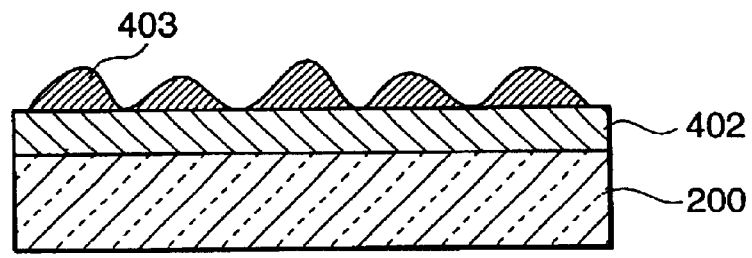

The interface between the upper layer 403 and the lower layer 402 may become a rugged shape (FIG. 10A) or may become planar (FIG. 10B).

The shape of the interface between the upper layer 403 and the lower layer 402 changes according to the polarity (surface tension) and specific gravity of the solvent B and the film components C and D, and the amounts contained of the solvent B and the film components C and D in the sol-form application liquid 3.

Specifically, if the film component C has a low polarity compared with the solvent B and the film component D, then the upper layer 403 comprised of the film component C will agglomerate and become dotted over the surface of the lower layer 402 comprised of the solvent B and the film component D. Furthermore, if the film component C has a high specific gravity compared with the solvent B and the film component D and is contained in the sol-form application liquid 3 in a large amount compared with the solvent B and the film component D, then the upper layer 403 that is agglomerated and dotted over the lower layer 402 will form a rugged shape on the surface of the lower layer 402. Conversely, if the film component C has a high polarity and a low specific gravity compared with the solvent B and the film component D and is contained in the sol-form application liquid 3 in a low amount compared with the solvent B and the film component D, then the surface tension of the lower layer 402 will be dominant, and hence the shape of the interface between the upper layer 403 and the lower layer 402 will become flatter.

The interface between the upper layer 403 and the lower layer 402 preferably exhibits a rugged shape, since in this case the area of adhesion between the layers will be larger, and hence due to an anchor effect, the strength of adhesion between the layers can be improved reliably.

Regarding the haze ratio and transmitted color tone of the internal scattering layer 404 formed as described above, the same applies as for the second embodiment. The internal scattering layer 404 is thus manufactured such that the haze ratio is at least 1%, preferably at least 5%, more preferably at least 10%, and such that the transmitted color tone value is not more than 10, preferably not more than 5.

Next, in step S104, a reflecting film 204 is formed on top of the internal scattering layer 404 that has been formed (FIG. 9C), thus completing the manufacturing process.

According to the manufacturing process of the third embodiment described above (FIG. 4), a sol-form application liquid 3 is prepared by mixing together two solvents A and B and two film components C and D (step S101), the prepared sol-form application liquid 3 is applied onto a glass substrate 200 to form a mixed layer 401 on the glass substrate 200 (step S102), the glass substrate 200 with the mixed layer 401 thereon is left at room temperature, thus evaporating off the solvent A and hence carrying out phase separation into an upper layer 403 and a lower layer 402 (step S103'), and then the mixed layer 401 is heated, thus evaporating off the solvent B in the lower layer 402 and gelating the film components C and D and a copolymer thereof in the upper layer 403 and the lower layer 402 to form an internal scattering layer 404 (step S103"). As a result, the size of projecting parts formed on the surface of the internal scattering layer 404 can be controlled freely with few manufacturing steps. Moreover, the internal scattering layer 404 is formed from the film components C and D, which are compounds having the principal skeleton thereof formed from an inorganic material, and a copolymer of the film components C and D. As a result, the adhesion of the internal scattering layer 404 to a reflecting film 204, which is made of an inorganic material and is formed on the internal scattering layer 404 (step S104), can be improved. Furthermore, because the internal scattering layer 404 is formed with inorganic materials as the principal skeleton thereof, the structure is stable, and hence the occurrence of bubble-shaped defects due to discharge as a gas of components adsorbed on the surface of the internal scattering layer 404 or unreacted components inside the internal scattering layer 404 can be prevented. Moreover, because the structure is stable, structural changes are minimized, and hence alteration of the reflection properties can be kept to a minimum.

A known method can be used for applying the sol-form application liquids 1, 2, 2' and 3 described above, for example a method using an apparatus such as a spin coater, a roll coater, a spray coater or a curtain coater, a dip coating method, a floating method, or a printing method such as flexographic printing, screen printing or gravure printing.

Moreover, the projecting film according to the first, second, or third embodiment described above is suitable for use on a light-scattering/reflecting substrate provided in a reflection type LCD or a semi-transmission type LCD, but since back-scattering is not prone to occur, may also be used on a transmitting/diffusing plate provided in a rear projection type TV display or the like. Moreover, because the reflectance of light can be controlled, the projecting film may also be used as an anti-glare film, or may be used on a low-friction plate by being formed on the surface of an original-placing window of a copying machine, a side window of an automobile or the like.

Furthermore, in an electroluminescence light-emitting apparatus, for example an organic EL light-emitting apparatus, the emission efficiency η of the generated light depends on the refractive index n as $\eta = \frac{1}{2} n^2$, and is approximately 20%, resulting in the efficiency of utilization of light being poor. This is because the emitted light undergoes total reflection at a surface adjoining a medium having a relatively low refractive index, and hence cannot be drawn out. It is known that this total reflection can be avoided by forming a projecting shape on the light-emitting surface side or the non-light-emitting surface side, and the projecting film of the present invention is also suitable for use in such an application.

A description will now be given of specific examples of the first embodiment of the present invention.

EXAMPLE 1

24.84 g of the silicon alkoxide γ-methacryloxypropyltrimethoxysilane as a metal compound, 5.4 g of 1 mol/l (1N) hydrochloric acid as a catalyst to promote hydrolysis of the silicon alkoxide, and 9.76 g of ethanol as a solvent were mixed together, and the mixture was agitated for 24 hours at room temperature, thus preparing a silicon compound stock solution (1).

Moreover, 17.6 g of the titanium alkoxide tetraisopropyl orthotitanate as a metal compound, and 12.4 g of acetylacetonate as a chelating agent were mixed together, and the mixture was agitated for 24 hours at room temperature, thus preparing an acetylacetonate-chelated titanium compound stock solution (1).

1.67 g of the silicon compound stock solution (1), 1.52 g of the titanium compound stock solution (1), and 3.00 g of ethylene glycol and 3.81 g of ethanol as solvents were then mixed together, and the mixture was agitated, thus preparing an application liquid (1).

The application liquid (1) was spin coated at a rotational speed of 1000 rpm onto one surface of a 100 mm×100 mm×0.5 mm thick glass substrate 200 made of soda lime silicate glass.

The glass substrate 200 on which the application liquid (1) had been applied was then subjected to drying treatment at 250° C. for 3 minutes, thus causing the application liquid (1) to undergo a gelation reaction, and hence obtaining a solidified thin film (internal scattering layer 206) on the glass substrate 200.

Of the components making up this internal scattering layer 206, the proportion of inorganic components was 50.8 mass %.

A cross-section of the internal scattering layer 206 obtained was observed using a scanning electron microscope (SEM) from the cross-sectional direction of the internal scattering layer 206.

It was found that a lower layer 202 solidified into a flat shape had been formed on the glass substrate 200, and a projecting shape comprised of an upper layer 203 solidified into droplet shapes had been formed on the lower layer 202.

The compositions of the lower layer 202 and the upper layer 203 were investigated using an auger electron spectroscopy analyzer, whereupon it was found that the flat lower layer 202 (recessed parts) had a composition rich in titanium oxide, and the droplet-shaped upper layer 203 (projecting parts) had a composition rich in silicon oxide. It was thus verified that the titanium compound and the silicon compound in the application liquid (1) had undergone phase separation during the drying treatment, with the titanium compound forming predominantly the lower layer 202 and the silicon compound forming predominantly the upper layer 203.

The angle of slope where the projecting parts and the recessed parts join was measured from the SEM observation of the cross section of the internal scattering layer 206. The measured angle of slope was in a range of 0 to 8°.

The transmittance of the glass substrate 200 having the internal scattering layer 206 formed thereon was measured using a spectrophotometer, and it was found that there was no absorption in the visible region from 400 to 800 nm.

Next, a reflecting film 204 made of metallic silver (Ag) was deposited by vapor deposition to a thickness of 100 nm onto the surface of the internal scattering layer 206 formed on the glass substrate 200, thus obtaining a light-scattering/reflecting substrate.

It was verified by visual observation that reflected light from the light-scattering/reflecting substrate was not colored. Moreover, the reflectance of the light-scattering/reflecting substrate was 95%.

The reflected light scattering angle distribution was measured using a variable angle glossimeter (made by Suga Test Instruments Co., Ltd.: Model UGV-6P). Specifically, the angular dependence of the reflected light when incident light was made to strike the surface of the light-scattering/reflecting substrate at an angle of −30° from the direction of the normal to the surface of the light-scattering/reflecting substrate was measured. The scattering angle distribution, which is the angular range within which the reflected light is uniformly distributed, was measured centered on the direction of specular reflection (+30° from the direction of the normal to the surface of the light-scattering/reflecting substrate); the measured scattering angle distribution is thus shown in Table 1 below in the form "±X°", where 0° indicates the direction of specular reflection.

The scattering angle range for the light-scattering/reflecting substrate obtained in Example 1 was ±15°, indicating light-scattering properties sufficient for practical use.

Moreover, the adhesion at the interface between the internal scattering layer 206 and the reflecting film 204 formed thereupon, and the adhesion at the interface between the internal scattering layer 206 and the glass substrate 200, were evaluated using a cross-cut tape peeling evaluation method (JIS K5400 3.5). The evaluation results are shown in Table 1 below as the number of portions for which peeling did not occur out of 100 portions formed by segmenting with cross cuts into an array of 1 mm×1 mm squares.

No peeling was found at either the interface between the internal scattering layer 206 and the reflecting film 204, or at the interface between the internal scattering layer 206 and the glass substrate 200.

EXAMPLE 2

19.03 g of the silicon alkoxide vinyltriethoxysilane as a metal compound, 5.4 g of 1 mol/l (1N) hydrochloric acid as a catalyst to promote hydrolysis of the silicon alkoxide, and 15.57 g of ethanol as a solvent were mixed together, and the mixture was agitated for 24 hours at room temperature, thus preparing a silicon compound stock solution (2).

1.67 g of the silicon compound stock solution (2), 1.52 g of the titanium compound stock solution (1) used in Example 1, and 3.00 g of ethylene glycol and 3.81 g of ethanol as solvents were then mixed together, and the mixture was agitated, thus preparing an application liquid (2).

The application liquid (2) was spin coated at a rotational speed of 1000 rpm onto one surface of a 100 mm×100 mm×0.5 mm thick soda lime silicate glass substrate 200.

The glass substrate 200 on which the application liquid (2) had been applied was then subjected to drying treatment at 200° C. for 3 minutes, thus causing the application liquid (2) to undergo a gelation reaction, and hence obtaining a solidified internal scattering layer 206 on the glass substrate 200.

Of the components making up this internal scattering layer 206, the proportion of inorganic components was 83.0 mass %.

As in Example 1, a cross-section of the internal scattering layer 206 obtained was observed using an SEM from the cross-sectional direction of the internal scattering layer 206.

It was found that a lower layer 202 solidified into a flat shape had been formed on the glass substrate 200, and a projecting shape comprised of an upper layer 203 solidified into droplet shapes had been formed on the lower layer 202.

The compositions of the lower layer 202 and the upper layer 203 were investigated using an auger electron spectroscopy analyzer, whereupon it was found that the flat lower layer 202 (recessed parts) had a composition rich in titanium oxide, and the droplet-shaped upper layer 203 (projecting parts) had a composition rich in silicon oxide. It was thus verified that the titanium compound and the silicon compound in the application liquid (2) had undergone phase separation during the drying treatment, with the titanium compound forming predominantly the lower layer 202 and the silicon compound forming predominantly the upper layer 203.

The angle of slope where the projecting parts and the recessed parts join was measured from the SEM observation of the cross section of the internal scattering layer 206. The measured angle of slope was in a range of 0 to 8°.

The transmittance of the glass substrate 200 having the internal scattering layer 206 formed thereon was measured using a spectrophotometer, and it was found that there was no absorption in the visible region from 400 to 800 nm.

Next, a reflecting film 204 having a 3-layer structure, in which a silicon oxide film (film 205) of thickness 10 nm, a metallic aluminum film of thickness 12 nm and a silicon oxide film (film 205) of thickness 20 nm were built up in this order from the internal scattering layer 206 side by sputtering, was deposited onto the surface of the internal scattering layer 206 formed on the glass substrate 200, thus obtaining a light-scattering/reflecting substrate.

It was verified by visual observation that reflected light from the light-scattering/reflecting substrate was not colored.

The transmittance of the glass substrate 200 having the internal scattering layer 206 formed thereon was measured using a spectrophotometer. It was found that the transmittance in the visible region from 400 to 800 nm was about 30%, and there was almost no variation in the transmittance. Moreover, the reflectance of the light-scattering/reflecting substrate was 60%.

The reflected light scattering angle distribution was measured using the same method as in Example 1.

The scattering angle range for the light-scattering/reflecting substrate obtained in Example 2 was ±15°, indicating light-scattering properties sufficient for practical use.

These optical properties showed that the light-scattering/reflecting substrate obtained in Example 2 is suitable for use in a semi-transmission type LCD or a projection type display screen.

Moreover, the adhesion at the interface between the internal scattering layer 206 and the reflecting film 204, and the adhesion at the interface between the internal scattering layer 206 and the glass substrate 200, were evaluated using the same method as in Example 1.

No peeling was found at either the interface between the internal scattering layer 206 and the reflecting film 204, or at the interface between the internal scattering layer 206 and the glass substrate 200.

EXAMPLE 3

2.00 g of the silicon compound stock solution (2) used in Example 2, 1.21 g of the titanium compound stock solution (1) used in Example 1, and 3.00 g of ethylene glycol and 3.79 g of ethanol as solvents were mixed together, and the mixture was agitated, thus preparing an application liquid (3).

The application liquid (3) was spin coated at a rotational speed of 1000 rpm onto one surface of a 100 mm×100 mm×0.5 mm thick soda lime silicate glass substrate 200.

The glass substrate 200 on which the application liquid (3) had been applied was then subjected to drying treatment at 200° C. for 3 minutes, thus causing the application liquid (3) to undergo a gelation reaction, and hence obtaining a solidified internal scattering layer 206 on the glass substrate 200.

Of the components making up this internal scattering layer 206, the proportion of inorganic components was 79.6 mass %.

As in Example 1, a cross-section of the internal scattering layer 206 obtained was observed using an SEM from the cross-sectional direction of the internal scattering layer 206.

It was found that a lower layer 202 solidified into a flat shape had been formed on the glass substrate 200, and a projecting shape comprised of an upper layer 203 solidified into droplet shapes had been formed on the lower layer 202.

The compositions of the lower layer 202 and the upper layer 203 were investigated using an auger electron spectroscopy analyzer, whereupon it was found that the flat lower layer 202 (recessed parts) had a composition rich in titanium oxide, and the droplet-shaped upper layer 203 (projecting parts) had a composition rich in silicon oxide. It was thus verified that the titanium compound and the silicon compound in the application liquid (3) had undergone phase separation during the drying treatment, with the titanium compound forming predominantly the lower layer 202 and the silicon compound forming predominantly the upper layer 203.

Moreover, the angle of slope where the projecting parts and the recessed parts join was measured from the SEM observation of the cross section of the internal scattering layer 206. The measured angle of slope was in a range of 0 to 10°.

The transmittance of the glass substrate 200 having the internal scattering layer 206 formed thereon was measured using a spectrophotometer, and it was found that there was no absorption in the visible region from 400 to 800 nm.

Next, a reflecting film 204 having a 3-layer structure as in Example 2 was deposited onto the surface of the internal scattering layer 206 formed on the glass substrate 200, thus obtaining a light-scattering/reflecting substrate.

It was verified by visual observation that reflected light from the light-scattering/reflecting substrate was not colored. Moreover, the reflectance of the light-scattering/reflecting substrate was 90%.

The reflected light scattering angle distribution was measured using the same method as in Example 1.

The scattering angle range for the light-scattering/reflecting substrate obtained in Example 3 was ±20°, indicating light-scattering properties sufficient for practical use.

Moreover, the adhesion at the interface between the internal scattering layer 206 and the reflecting film 204, and the adhesion at the interface between the internal scattering layer 206 and the glass substrate 200, were evaluated using the same method as in Example 1.

No peeling was found at either the interface between the internal scattering layer 206 and the reflecting film 204, or at the interface between the internal scattering layer 206 and the glass substrate 200.

COMPARATIVE EXAMPLE 1

1.67 g of the silicon compound stock solution (1) used in Example 1, and 3.00 g of hexylene glycol and 5.33 g of ethanol as solvents were mixed together, and the mixture was agitated, thus preparing an application liquid (4).

The application liquid (4) was spin coated at a rotational speed of 1000 rpm onto one surface of a 100 mm×100 mm×0.5 mm thick soda lime silicate glass substrate 200.

The glass substrate 200 on which the application liquid (4) had been applied was then subjected to drying treatment at 250° C. for 3 minutes, thus causing the application liquid (4) to undergo a gelation reaction, and hence obtaining a solidified internal scattering layer 206 on the glass substrate 200.

Of the components making up this internal scattering layer 206, the proportion of inorganic components was 28.9 mass %.

As in Example 1, a cross-section of the internal scattering layer 206 obtained was observed using an SEM from the cross-sectional direction of the internal scattering layer 206.

It was found that only a lower layer 202 solidified into a flat shape had been formed on the glass substrate 200, and a projecting shape had not been formed.

The composition of the lower layer 202 was investigated using an auger electron spectroscopy analyzer, whereupon it was found that the lower layer 202 had silicon oxide as the principal component thereof.

The reason for the above was inferred to be that, because only one metal compound was contained in the application liquid (4), phase separation of the silicon compound in the application liquid (4) did not occur during the drying treatment.

Because a projecting shape was not formed on the glass substrate 200, the angle of slope where the projecting parts and the recessed parts join was approximately 0°.

The transmittance of the glass substrate 200 having the internal scattering layer 206 formed thereon was measured using a spectrophotometer, and it was found that there was no absorption in the visible region from 400 to 800 nm.

Next, as in Example 1, a reflecting film 204 made of metallic silver (Ag) was deposited by vapor deposition to a thickness of 100 nm onto the surface of the internal scattering layer 206 formed on the glass substrate 200, thus obtaining a light-scattering/reflecting substrate.

It was verified by visual observation that reflected light from the light-scattering/reflecting substrate was not colored. Moreover, the reflectance of the light-scattering/reflecting substrate was 95%.

The reflected light scattering angle distribution was measured using the same method as in Example 1. It was found that the scattering angle range for the light-scattering/reflecting substrate obtained in Comparative Example 1 was approximately 0°, i.e. no light-scattering properties were shown.

Moreover, the adhesion at the interface between the internal scattering layer 206 and the reflecting film 204, and the adhesion at the interface between the internal scattering layer 206 and the glass substrate 200, were evaluated using the same method as in Example 1.

Slight peeling was found to occur at the interface between the internal scattering layer 206 and the reflecting film 204. This is because, although the internal scattering layer 206 contained an inorganic component, the proportion thereof was less than 50 mass %, which is lower than the proportion of inorganic components in the internal scattering layers 206 obtained in Examples 1 to 3, resulting in the adhesion of the internal scattering layer 206 to the reflecting film 204, which is made of an inorganic material, being poor.

COMPARATIVE EXAMPLE 2

1.52 g of the titanium compound stock solution (1) used in Example 1, and 3.00 g of hexylene glycol and 5.48 g of ethanol as solvents were mixed together, and the mixture was agitated, thus preparing an application liquid (5).

The application liquid (5) was spin coated at a rotational speed of 1000 rpm onto one surface of a 100 mm×100 mm×0.5 mm thick soda lime silicate glass substrate 200.

The glass substrate 200 on which the application liquid (5) had been applied was then subjected to drying treatment at 250° C. for 3 minutes, thus causing the application liquid (5) to undergo a gelation reaction, and hence obtaining a solidified internal scattering layer 206 on the glass substrate 200.

Of the components making up this internal scattering layer 206, the proportion of inorganic components was 100 mass %.

As in Example 1, a cross-section of the internal scattering layer 206 obtained was observed using an SEM from the cross-sectional direction of the internal scattering layer 206.

As in Comparative Example 1, it was found that only a lower layer 202 solidified into a flat shape had been formed on the glass substrate 200, and a projecting shape had not been formed.

The reason for the above was inferred to be that, because only one metal compound was contained in the application liquid (5), phase separation of the titanium compound in the application liquid (5) did not occur during the drying treatment.

Because a projecting shape was not formed on the glass substrate 200, the angle of slope where the projecting parts and the recessed parts join was approximately 0°.

The transmittance of the glass substrate 200 having the internal scattering layer 206 formed thereon was measured using a spectrophotometer, and it was found that there was no absorption in the visible region from 400 to 800 nm.

Next, as in Example 1, a reflecting film 204 made of metallic silver (Ag) was deposited by vapor deposition to a thickness of 100 nm onto the surface of the internal scattering layer 206 formed on the glass substrate 200, thus obtaining a light-scattering/reflecting substrate.

It was verified by visual observation that reflected light from the light-scattering/reflecting substrate was not colored. Moreover, the reflectance of the light-scattering/reflecting substrate was 95%.

The reflected light scattering angle distribution was measured using the same method as in Example 1. It was found that the scattering angle range for the light-scattering/reflecting substrate obtained in Comparative Example 2 was approximately 0°, i.e. no light-scattering properties were shown.

Moreover, the adhesion at the interface between the internal scattering layer 206 and the reflecting film 204, and the adhesion at the interface between the internal scattering layer 206 and the glass substrate 200, were evaluated using the same method as in Example 1.

No peeling was found at either the interface between the internal scattering layer 206 and the reflecting film 204, or at the interface between the internal scattering layer 206 and the glass substrate 200.

COMPARATIVE EXAMPLE 3

A film of a photosensitive resin (made by Tokyo Ohka Kogyo Co., Ltd.: product name OFPR-800) was spin coated to a thickness of 1.2 μm onto one surface of a 100 mm×100 mm×0.5 mm thick soda lime silicate glass substrate 200.

The glass substrate 200 on which the photosensitive resin had been applied was then prebaked at 100° C. for 30 seconds, and then UV exposure was carried out using a photomask.

The photomask used had a pattern in which circular transmitting parts of diameter 6 μm were arranged at random.

Next, development was carried out using a developer (made by Tokyo Ohka Kogyo Co., Ltd.: product name NMD-3), thus forming minute cylindrical projecting parts on the glass substrate 200, and then heating was carried out at 200° for 60 minutes, thus rounding off the angular portions of the projecting parts.

The photosensitive resin was then further spin coated to a thickness of 0.3 μm onto the glass substrate 200 on which the rounded minute projecting parts had been formed, and then heating was carried out at 200° for 60 minutes, thus further rounding off the angular portions of the projecting parts, and hence completing the formation of an internal scattering layer 206 on the glass substrate 200.

As in Example 1, a cross-section of the internal scattering layer 206 obtained was observed using an SEM.

It was found that an internal scattering layer 206 having a smooth projecting shape had been formed on the glass substrate 200. The angle of slope where the projecting parts and the recessed parts join in the projecting shape formed was measured. The measured angle of slope was in a range of 0 to 8°.

The transmittance of the glass substrate 200 having the internal scattering layer 206 formed thereon was measured using a spectrophotometer, and it was found that there was no absorption in the visible region from 400 to 800 nm.

Next, a reflecting film 204 having a 3-layer structure as in Example 2 was deposited by sputtering onto the surface of the internal scattering layer 206 formed on the glass substrate 200, thus obtaining a light-scattering/reflecting substrate.

The color of reflected natural light was observed visually, whereupon although a white reflected color was shown overall, iridescent coloration was seen within a local angular range.

Moreover, the reflectance of the light-scattering/reflecting substrate was 60%.

The reflected light scattering angle distribution was measured using the same method as in Example 1.

The scattering angle range for the light-scattering/reflecting substrate obtained in Comparative Example 3 was ±20°, indicating light-scattering properties sufficient for practical use.

Moreover, the adhesion at the interface between the internal scattering layer 206 and the reflecting film 204, and the adhesion at the interface between the internal scattering layer 206 and the glass substrate 200, were evaluated using the same method as in Example 1.

It was found that peeling occurred at the interface between the internal scattering layer 206 and the reflecting film 204 over 70% of the evaluated area. The adhesion was thus extremely low, and hence practical industrial use would not be possible.

It was inferred that the poor adhesion was due to the internal scattering layer 206 having a structure with an organic material as the principal skeleton thereof, as described earlier.

The results for Examples 1 to 3 and Comparative Examples 1 to 3 described above are collected together in Table 1 below.

TABLE 1

| | Angle of Slope | Reflected Light Scattering Angle Range | Adhesion | Reflectance |
|---|---|---|---|---|
| Example | | | | |
| 1 | 0~8° | ±15° | 100/100 | 95% |
| 2 | 0~8° | ±15° | 100/100 | 60% |
| 3 | 0~10° | ±° | 100/100 | 90% |
| Comparative Example | | | | |
| 1 | Approx. 0° | Approx. 0° | 90/100 | 95% |
| 2 | Approx. 0° | Approx. 0° | 100/100 | 95% |
| 3 | 0~8° | ±20° | 30/100 | 60% |

As shown by the various properties for Examples 1 to 3 in Table 1, the light-scattering/reflecting substrate of the present invention has light-scattering properties sufficient for practical use. Moreover, better adhesion between the internal scattering layer 206, and the reflecting film 204 and the glass substrate 200 was shown than for the light-scattering/reflecting substrate of Comparative Example 3, which is an example of prior art in which the light-scattering/reflecting substrate has an internal scattering layer 206 made of an organic photosensitive resin.

A description will now be given of specific examples of the second and third embodiments of the present invention.

EXAMPLES 4, 5A AND 5B

In Example 4, which relates to the second embodiment, 50 g of ethyl cellosolve (2-ethoxyethanol, made by Kanto Kagaku) as the solvent A, 30 g of glycerol as the solvent B, and 20 g of a sol solution described below as the film component C were mixed together, thus preparing a sol-form application liquid 2.

The above sol solution was prepared by mixing together 29.75 g of phenyltrimethoxysilane (LS-2750 made by Shin-Etsu Chemical Co., Ltd.), 12.42 g of γ-methacryloxypropyltrimethoxysilane (KBM503 made by Shin-Etsu Chemical Co., Ltd.) and 27.04 g of ethyl cellosolve, and agitating for 24 hours at 20° (room temperature), thus bringing about hydrolysis and condensation polymerization with removal of water. 10.8 g of 1 mol/l hydrochloric acid was added to the sol solution as a catalyst to promote the hydrolysis. This sol solution will have a solid content of 15 mass % assuming that conversion to inorganic matter (silica, $SiO_2$) is complete.

Using a 0.55 mm-thick glass substrate (transmitted color tone value: 0.02, (a, b)=(−0.1, 0.1)) manufactured by the float process as the glass substrate 200, the sol-form application liquid 2 was spin coated for 15 seconds at a rotational speed of 1000 rpm onto one surface of the glass substrate 200, thus forming a mixed layer 201.

Next, the mixed layer 201 thus formed was air-dried for 3 minutes, thus bringing about phase separation of the solvent A and the film component C into an upper layer 203 and the solvent B into a lower layer 202.

Heating was then carried out by a far-infrared rays furnace at 300° C. for 7 minutes, thus gelating the film component C in the sol-form application liquid 2, and then natural radiational cooling was allowed to occur until the temperature had dropped to room temperature, thus completing the formation of an internal scattering layer 206 on the glass substrate 200.

A 5000× magnification cross-sectional photograph was taken of the internal scattering layer 206 using a scanning electron microscope (SEM), and the angle of slope of the projecting parts of the internal scattering layer 206 was measured, whereupon the maximum angle of slope was found to be 2°.

Moreover, the surface roughness was measured by carrying out a 500 μm scan of the surface of the internal scattering layer 206 with a stylus at a speed of 50 μm/s using a stylus type roughness meter (Alpha-Step 500 Surface Profiler made by Tencor Instruments), whereupon Rmax was found to be 8000 nm and Ra 757.3 nm. Moreover, upon observing with an optical microscope, projecting parts of diameter about 100 to 500 μm were seen on the surface of the internal scattering layer 206.

Figure 11A:
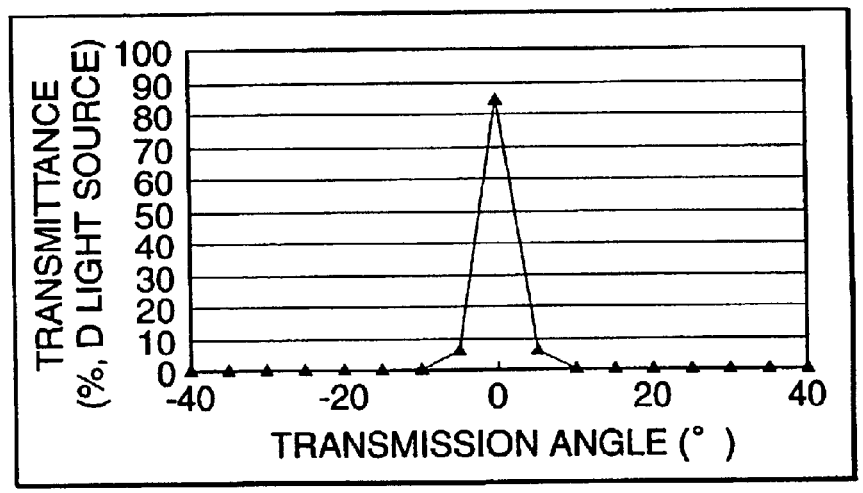
FIGS. 11A to 11C are graphs showing scattered transmitted light angle distributions for Examples 4, 5A and 5B according to the second embodiment of the present invention; specifically.

The scattered transmitted light angle distribution of the internal scattering layer 206 obtained was measured by illuminating the light-scattering/reflecting substrate with a standard light source D65 using an instantaneous multi-measurement system (MCPD-1000 made by Otsuka Electronics Co., Ltd.), whereupon the scattered transmitted light angle range was found to be ±10° (FIG. 11A).

Furthermore, the haze ratio of the internal scattering layer 206 was measured to be 2.6%.

Moreover, it is also possible to form a titania foundation layer or silica foundation layer on the glass substrate 200 in advance, and then form the internal scattering layer 206 using the method of Example 4; these cases will be referred to here as Examples 5A and 5B respectively.

In the case of forming a titania foundation layer (Example 5A), 28.4 g of the titanium alkoxide tetraisopropoxytitanium (made by Tokyo Kasei Kogyo Co., Ltd.) is first mixed with 20.0 g of acetylacetone to chelate and hence stabilize the titanium alkoxide, thus preparing a titania raw material (film component Y). 8 g of ethyl cellosolve as the solvent X is then mixed with 2 g of the titania raw material, thus preparing a sol-form application liquid 2'. The sol-form application liquid 2' is then spin coated for 15 seconds at a rotational speed of 1000 rpm onto the surface of the glass substrate 200 onto which the mixed layer 201 is to be formed, and then drying is carried out at 100° C. for 10 minutes, thus forming the foundation layer.

Figure 11B:
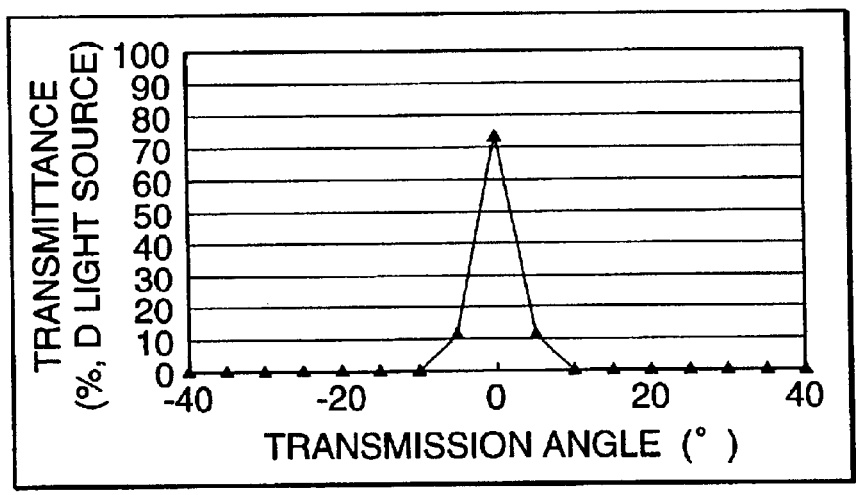
Figure 11C:
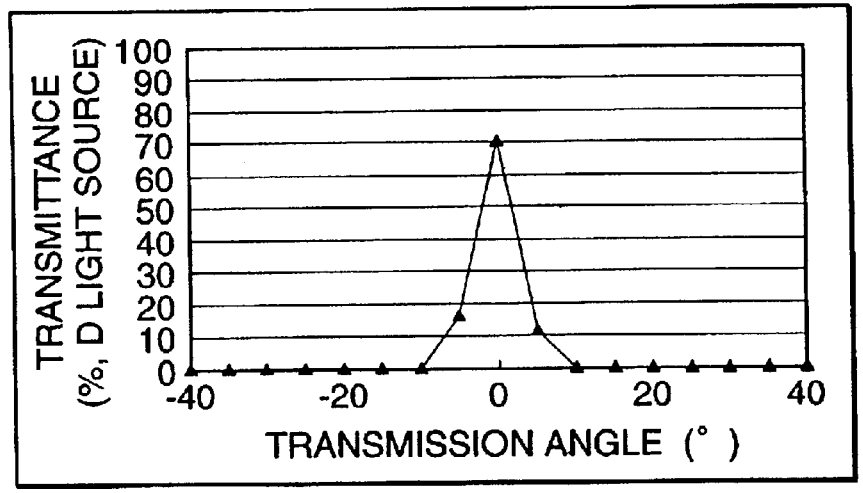

The internal scattering layer 206 is then formed on top of the foundation layer. For this Example 5A, when the angle of slope of the projecting parts of the internal scattering layer 206 and the scattered transmitted light angle distribution were measured, the maximum angle of slope was found to be 5°, and the scattered transmitted light angle range ±10° (FIG. 11B).

Furthermore, the haze ratio of the internal scattering layer 206 was measured to be 5.6%.

On the other hand, in the case of forming a silica foundation layer (Example 5B), 50 g of ethyl silicate 40 (made by Colcoat) and 41 g of ethyl cellosolve are first mixed together with agitation to hydrolyze the ethyl silicate 40, thus preparing a silica raw material (film component Y). At this time, 9 g of 1 mol/l hydrochloric acid is added to the film component Y as a catalyst to promote the hydrolysis. 8 g of ethyl cellosolve as the solvent X is then mixed with 2 g of the silica raw material, thus preparing a sol-form application liquid 2'. The sol-form application liquid 2' is then spin coated for 15 seconds at a rotational speed of 1000 rpm onto the surface of the glass substrate 200 onto which the mixed layer 201 is to be formed, and then drying is carried out at 100° C. for 10 minutes, thus forming the foundation layer.

The internal scattering layer 206 is then formed on top of the foundation layer. For this Example 5B, when the angle of slope of the projecting parts of the internal scattering layer 206 and the scattered transmitted light angle distribution were measured, the maximum angle of slope was found to be 5°, and the scattered transmitted light angle range ±10° (FIG. 1C).

Furthermore, the haze ratio of the internal scattering layer 206 was measured to be 6.8%.

From the above results, it was found that the internal scattering layers 206 obtained in Examples 4, 5A and 5B all showed optical properties sufficient for practical use.

Next, for each of the Examples 4, 5A and 5B, a reflecting film 204 having a 3-layer structure, in which a silicon oxide film (film 205) of thickness 10 nm, a metallic aluminum film of thickness 85 nm and a silicon oxide film (film 205) of thickness 20 nm were built up in this order from the internal scattering layer 206 side by sputtering, was deposited onto the surface of the internal scattering layer 206, thus obtaining a light-scattering/reflecting substrate.

For this light-scattering/reflecting substrate, the adhesion at the interface between the internal scattering layer 206 and the reflecting film 204 formed thereupon, and the adhesion at the interface between the internal scattering layer 206 and the glass substrate 200, were evaluated using a cross-cut tape peeling evaluation method (JIS K5400 3.5). The evaluation results are shown in Table 2 below as the number of portions for which peeling did not occur out of 100 portions formed by segmenting with cross cuts into an array of 1 mm×1 mm squares.

For all of Examples 4, 5A and 5B, no peeling was found at either the interface between the internal scattering layer 206 and the reflecting film 204, or at the interface between the internal scattering layer 206 and the glass substrate 200.

Figure 12A:
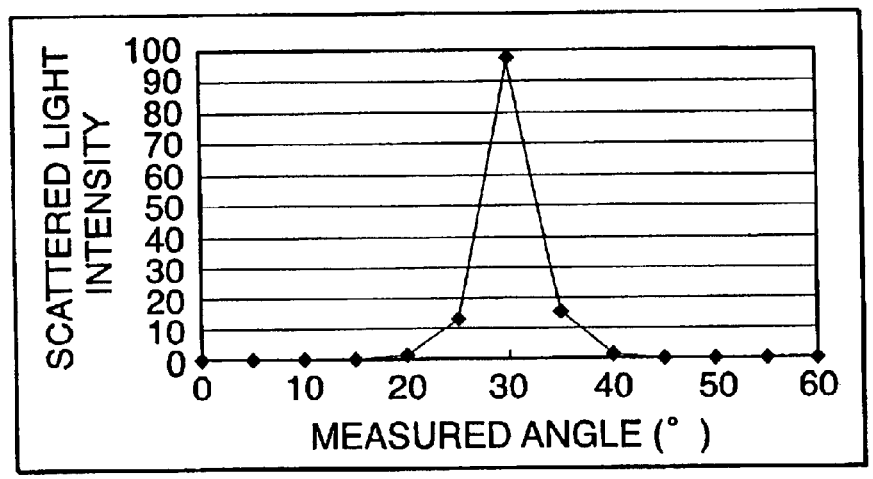
FIGS. 12A to 12C are graphs showing reflected light scattering angle distributions for Examples 4, 5A and 5B according to the second embodiment of the present invention; specifically.
Figure 12B:
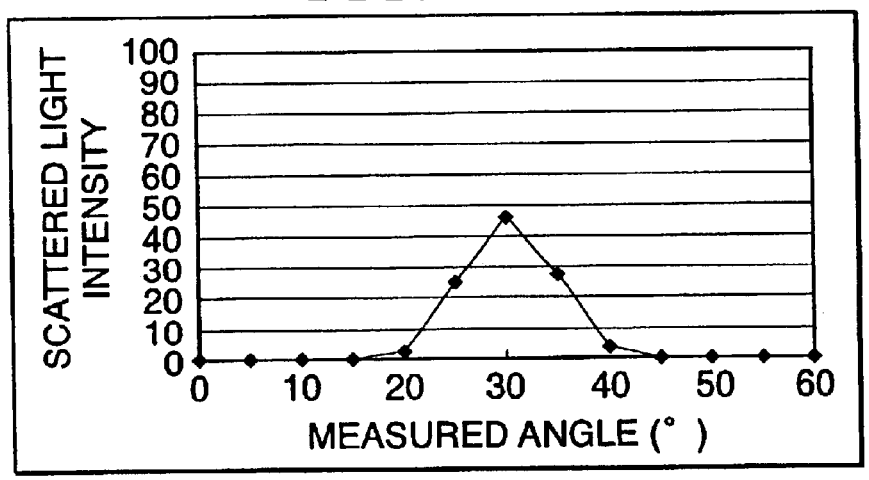
Figure 12C:
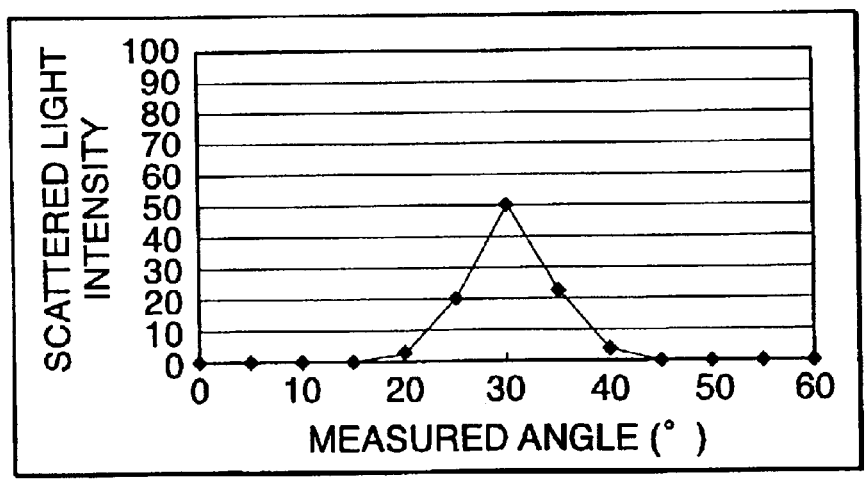

Moreover, the reflected light scattering angle distribution for each of the light-scattering/reflecting substrates obtained in Examples 4, 5A and 5B was measured using a variable angle glossimeter (made by Suga Test Instruments Co., Ltd: Model UGV-6P). The measurements were carried out by carrying out calibration such that the specular glossiness of a primary glossy standard plate (black) at an angle of incidence of −45° and a reflection angle of 45° was 87.2%, and then disposing a ¹⁄₁₀ light-reducing filter (ND filter) on the light receiver side, and sending in light from −30° onto the light-scattering/reflecting substrate and measuring the intensity of scattered light at angles of 0 to 60°. The measurement results were that the range of the scattering angle of reflected light relative to the angle of specular reflection of 30° was ±10° in the case that no foundation layer was formed (FIG. 12A), ±20° in the case that a titania foundation layer was formed (FIG. 12B), and ±15° in the case that a silica foundation layer was formed (FIG. 12C).

EXAMPLE 6

In this Example, which relates to the third embodiment, 47.42 g of ethyl cellosolve as the solvent A, 20.0 g of ethylene glycol as the solvent B, 25.0 g of a silica raw material described below as the film component C, and 7.58 g of a titania raw material described below as the film component D were mixed together, thus preparing a sol-form application liquid 3.

The above silica raw material was prepared by mixing together 27.76 g of phenyltrimethoxysilane, 17.38 g of γ-methacryloxypropyltrimethoxysilane and 27.51 g of ethyl cellosolve, and agitating for 24 hours at 20° (room temperature), thus bringing about hydrolysis and condensation polymerization with removal of water. 11.34 g of 1 mol/l hydrochloric acid was added to the silica raw material as a catalyst to promote the hydrolysis.

The above titania raw material was prepared by mixing 28.4 g of tetraisopropoxytitanium with 20.0 g of acetylacetone, thus chelating and hence stabilizing the tetraisopropoxytitanium.

Regarding the composition of the prepared sol-form application liquid, the solid content will be 5.0 mass % assuming that the silica raw material and the titania raw material are completely converted to inorganic matter ($SiO_2$ and $TiO_2$). The content of the solvent B ethylene glycol in the solution was 20 mass %, and representing the $SiO_2$ content as a mole ratio, the γ-methacryloxypropyltrimethoxysilane to phenyltrimethoxysilane ratio was 1:2, and the silica raw material to titania raw material ratio was 4:1.

Using a 0.55 mm-thick glass substrate (transmitted color tone value: 0.02, (a, b)=(−0.1, 0.1)) manufactured by the float process as the glass substrate 200, the sol-form application liquid 3 was applied by flexographic printing onto one surface of the glass substrate 200, thus forming a mixed layer 401.

Next, the mixed layer 401 thus formed was air-dried for 2 minutes, thus bringing about phase separation of the solvent A and the film component C into an upper layer 403 and the solvent B and the film component D into a lower layer 402.

Heating was then carried out by a far-infrared rays furnace at 300° C. for 7 minutes, thus gelating the film components C and D and a copolymer thereof in the sol-form application liquid 3, and then natural radiational cooling was allowed to occur until the temperature had dropped to room temperature, thus completing the formation of an internal scattering layer 404 on the glass substrate 200.

The angle of slope of the projecting parts on the internal scattering layer 404 and the surface roughness were measured using the same methods as in Example 4, whereupon it was found that the maximum angle of slope of the projecting parts obtained in Example 6 was 10°, Rmax was 300 nm, Ra was 81.0 nm, and the diameter of the projecting parts seen on the surface of the internal scattering layer 404 was about 5 to 10 μm.

Moreover, the haze ratio of the internal scattering layer 404 was measured to be 36.0%, and the transmitted color tone value of the internal scattering layer 404 was measured to be 0.29 ((a, b)=(−0.2, 0.5)).

Figure 13A:
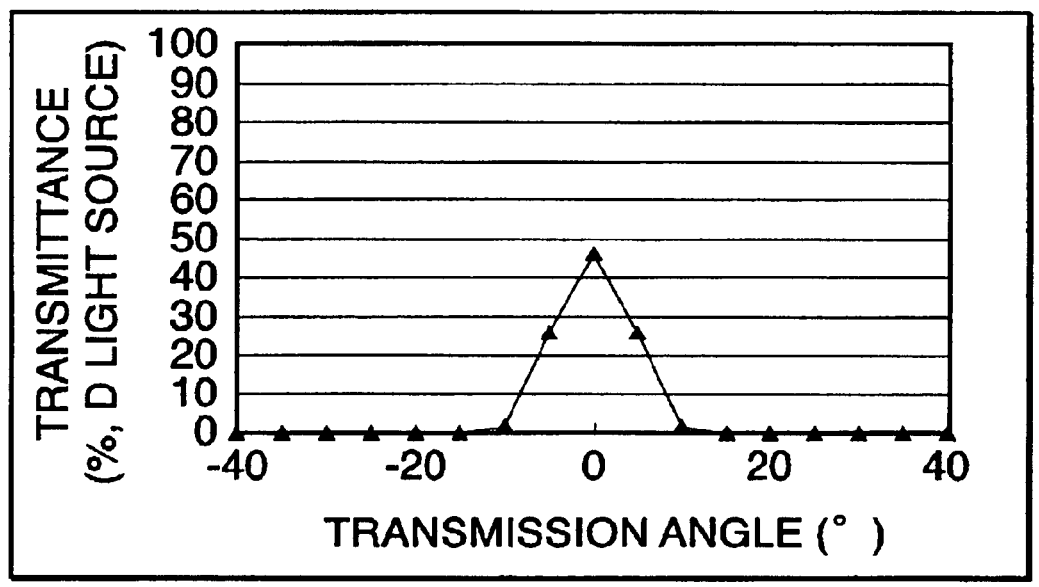
FIGS. 13A and 13B are graphs showing optical properties for Example 6 according to the third embodiment of the present invention; specifically.
Figure 13B:
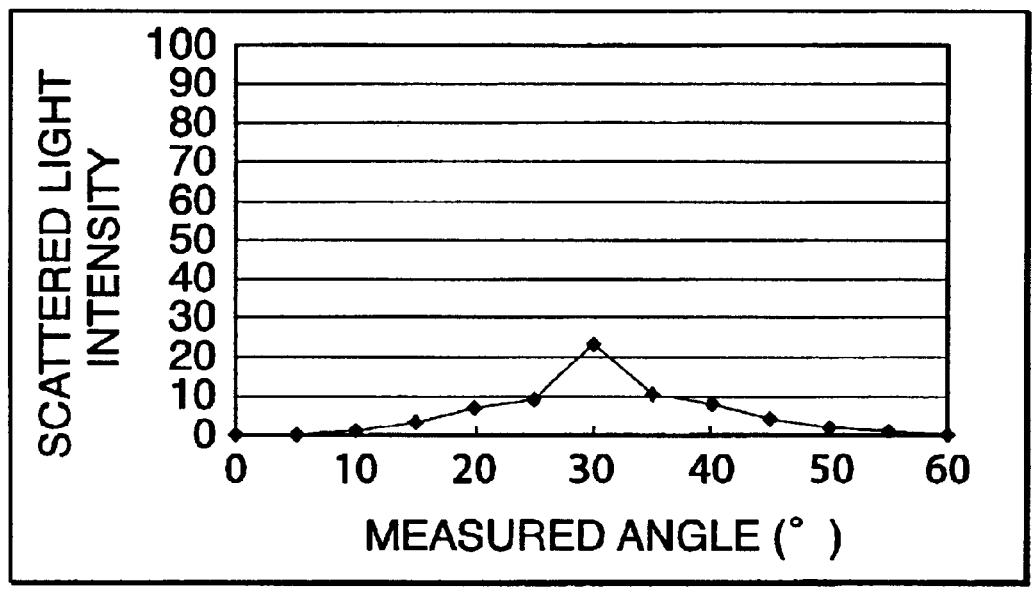

Furthermore, the scattered transmitted light angle distribution and the reflected light scattering angle distribution were measured using the same methods as in Example 4, whereupon the scattered transmitted light angle range for the internal scattering layer 404 obtained in Example 6 was found to be ±10° (FIG. 13A), and the reflected light scattering angle range ∵30° (FIG. 13B).

From the above results, it was found that the internal scattering layer 404 obtained in Example 6 shows optical properties sufficient for practical use.

Next, a reflecting film 204 having a 3-layer structure as in Examples 4, 5A and 5B was deposited onto the surface of the internal scattering layer 404, thus obtaining a light-scattering/reflecting substrate.

For the light-scattering/reflecting substrate obtained, the adhesion at the interface between the internal scattering layer 404 and the reflecting film 204, and the adhesion at the interface between the internal scattering layer 404 and the glass substrate 200, were evaluated using the same method as in Example 4.

No peeling was found at either the interface between the internal scattering layer 404 and the reflecting film 204, or at the interface between the internal scattering layer 404 and the glass substrate 200.

EXAMPLE 7

In this Example, which relates to the third embodiment, 30.5 g of ethyl cellosolve as the solvent A, 10.0 g of glycerol as the solvent B, 8.0 g of a first silica raw material described below as the film component C, and 1.5 g of a second silica raw material described below as the film component D were mixed together, thus preparing a sol-form application liquid 3.

The above first silica raw material was prepared by mixing together 19.84 g of phenyltrimethoxysilane, 24.84 g of γ-methacryloxypropyltrimethoxysilane and 24.52 g of ethyl cellosolve, and agitating for 24 hours at 20° (room temperature), thus bringing about hydrolysis and condensation polymerization with removal of water. 10.80 g of 1 mol/l hydrochloric acid was added to the first silica raw material as a catalyst to promote the hydrolysis.

The above second silica raw material was prepared by mixing together 50 g of ethyl silicate 40 and 41 g of ethyl cellosolve and agitating, thus hydrolyzing the ethyl silicate 40. 9 g of 1 mol/l hydrochloric acid was added to the second silica raw material as a catalyst to promote the hydrolysis.

Regarding the composition of the prepared sol-form application liquid, the solid content will be 3.0 mass % assuming that the silica raw materials are completely converted to inorganic matter ($SiO_2$). The content of the solvent B glycerol in the solution was 20 mass %, and representing the $SiO_2$ content as a mole ratio, the γ-methacryloxypropyltrimethoxysilane to phenyltrimethoxysilane ratio was 1:1, and the first silica raw material to second silica raw material ratio was 4:1.

Using a 0.55 mm-thick glass substrate (transmitted color tone value: 0.02, (a, b)=(−0.1, 0.1)) manufactured by the float process as the glass substrate 200, the sol-form application liquid 3 was applied by flexographic printing onto one surface of the glass substrate 200, thus forming a mixed layer 401.

Next, the mixed layer 401 thus formed was air-dried for 2 minutes, thus bringing about phase separation of the solvent A and the film component C into an upper layer 403 and the solvent B and the film component D into a lower layer 402.

Heating was then carried out by a far-infrared rays furnace at 300° C. for 7 minutes, thus gelating the film components C and D and a copolymer thereof in the sol-form application liquid 3, and then natural radiational cooling was allowed to occur until the temperature had dropped to room temperature, thus completing the formation of an internal scattering layer 404 on the glass substrate 200.

The angle of slope of the projecting parts on the internal scattering layer 404 and the surface roughness were measured using the same methods as in Example 4, whereupon it was found that the maximum angle of slope of the projecting parts obtained in Example 7 was 8, Rmax was 250 nm, Ra was 63.0 nm, and the diameter of the projecting parts seen on the surface of the internal scattering layer 404 was about 3 to 10 μm.

Moreover, the haze ratio of the internal scattering layer 404 was measured to be 23.4%, and the transmitted color tone value of the internal scattering layer 404 was measured to be 0.17 ((a, b)=(−0.1, 0.4)).

Figure 14A:
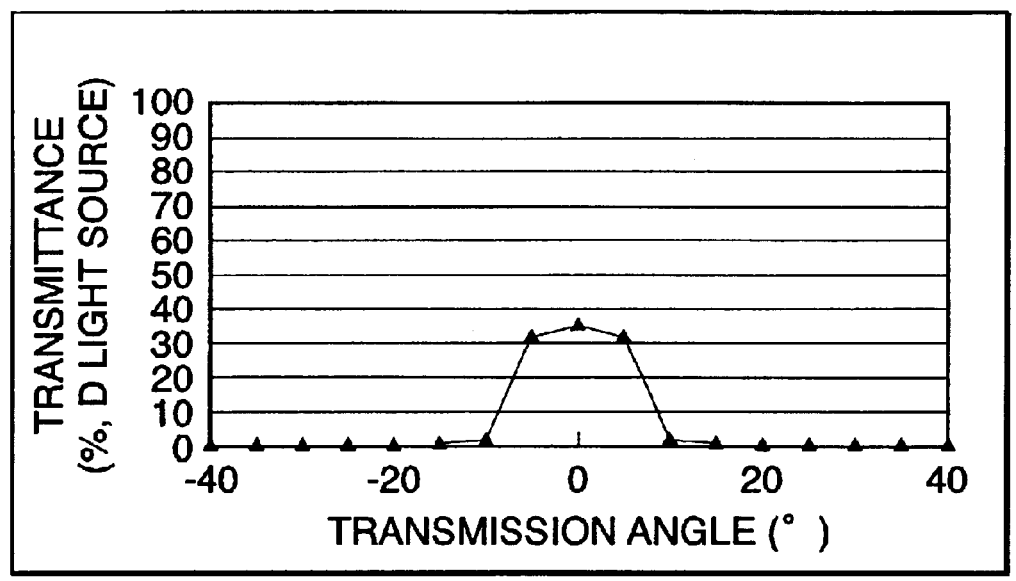
FIGS. 14A and 14B are graphs showing optical properties for Example 7 according to the third embodiment of the present invention; specifically.
Figure 14B:
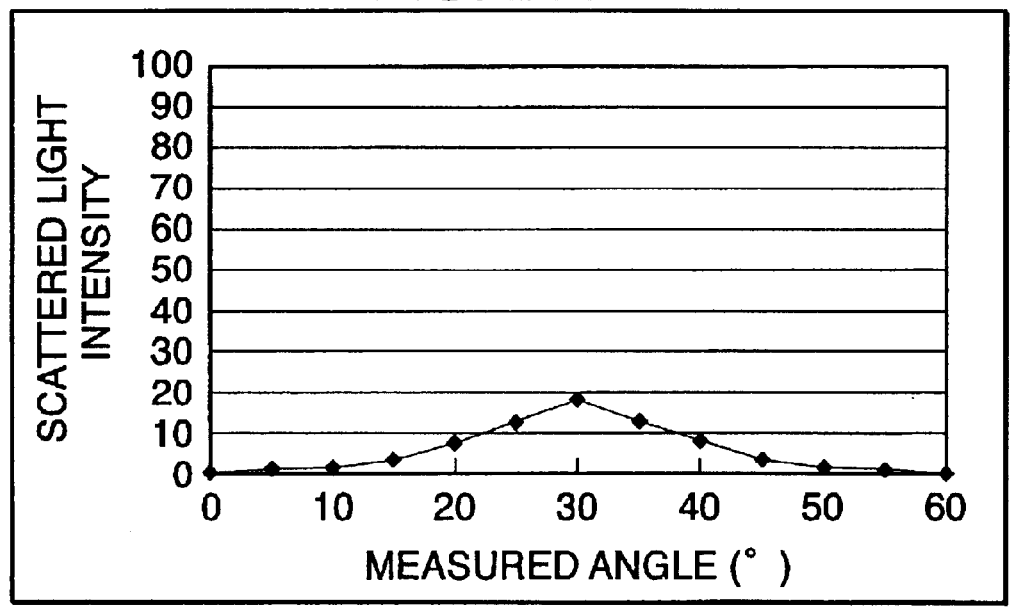

Furthermore, the scattered transmitted light angle distribution and the reflected light scattering angle distribution were measured using the same methods as in Example 4, whereupon the scattered transmitted light angle range for the internal scattering layer 404 obtained in Example 7 was found to be ±10° (FIG. 14A), and the reflected light scattering angle range ±25° (FIG. 14B).

From the above results, it was found that the internal scattering layer 404 obtained in Example 7 shows optical properties sufficient for practical use.

Next, a reflecting film 204 having a 3-layer structure as in Examples 4, 5A and 5B was deposited onto the surface of the internal scattering layer 404, thus obtaining a light-scattering/reflecting substrate.

For the light-scattering/reflecting substrate obtained, the adhesion at the interface between the internal scattering layer 404 and the reflecting film 204, and the adhesion at the interface between the internal scattering layer 404 and the glass substrate 200, were evaluated using the same method as in Example 4.

No peeling was found at either the interface between the internal scattering layer 404 and the reflecting film 204, or at the interface between the internal scattering layer 404 and the glass substrate 200.

EXAMPLE 8

In this Example, which relates to the third embodiment, 50.6 g of ethyl cellosolve as the solvent A, 30.0 g of glycerol as the solvent B, 17.8 g of a third silica raw material described below as the film component C, and 1.7 g of the second silica raw material as the film component D were mixed together, thus preparing a sol-form application liquid 3.

The above third silica raw material was prepared by mixing together 29.75 g of phenyltrimethoxysilane, 12.42 g of γ-methacryloxypropyltrimethoxysilane and 27.04 g of ethyl cellosolve, and agitating for 24 hours at 20° (room temperature), thus bringing about hydrolysis and condensation polymerization with removal of water. 10.80 g of 1 mol/l hydrochloric acid was added to the third silica raw material as a catalyst to promote the hydrolysis.

Regarding the composition of the prepared sol-form application liquid, the solid content will be 3.0 mass % assuming that the silica raw materials are completely converted to inorganic matter ($SiO_2$). The content of the solvent B glycerol in the solution was 30 mass %, and representing the $SiO_2$ content as a mole ratio, the γ-methacryloxypropyltrimethoxysilane to phenyltrimethoxysilane ratio was 4:1, and the third silica raw material to second silica raw material ratio was 8:1.

Using a 0.55 mm-thick glass substrate (transmitted color tone value: 0.02, (a, b)=(−0.1, 0.1)) manufactured by the float process as the glass substrate 200, the sol-form application liquid 3 was spin coated for 15 seconds at a rotational speed of 3000 rpm onto one surface of the glass substrate 200, thus forming a mixed layer 401.

Next, the mixed layer 401 thus formed was air-dried for 5 minutes, thus bringing about phase separation of the solvent A and the film component C into an upper layer 403 and the solvent B and the film component D into a lower layer 402.

Heating was then carried out by a far-infrared rays furnace at 300° C. for 7 minutes, thus gelating the film components C and D and a copolymer thereof in the sol-form application liquid 3, and then natural radiational cooling was allowed to occur until the temperature had dropped to room temperature, thus completing the formation of an internal scattering layer 404 on the glass substrate 200.

The angle of slope of the projecting parts on the internal scattering layer 404 and the surface roughness were measured using the same method as in Example 4, whereupon it was found that the maximum angle of slope of the projecting parts obtained in Example 8 was 12°, Rmax was 500 nm, Ra was 81.4 nm, and the diameter of the projecting parts seen on the surface of the internal scattering layer 404 was about 3 to 10 μm.

Moreover, the haze ratio of the internal scattering layer 404 was measured to be 48.0%, and the transmitted color tone value of the internal scattering layer 404 was measured to be 0.10 ((a, b)=(−0.1, 0.3)).

Figure 15A:
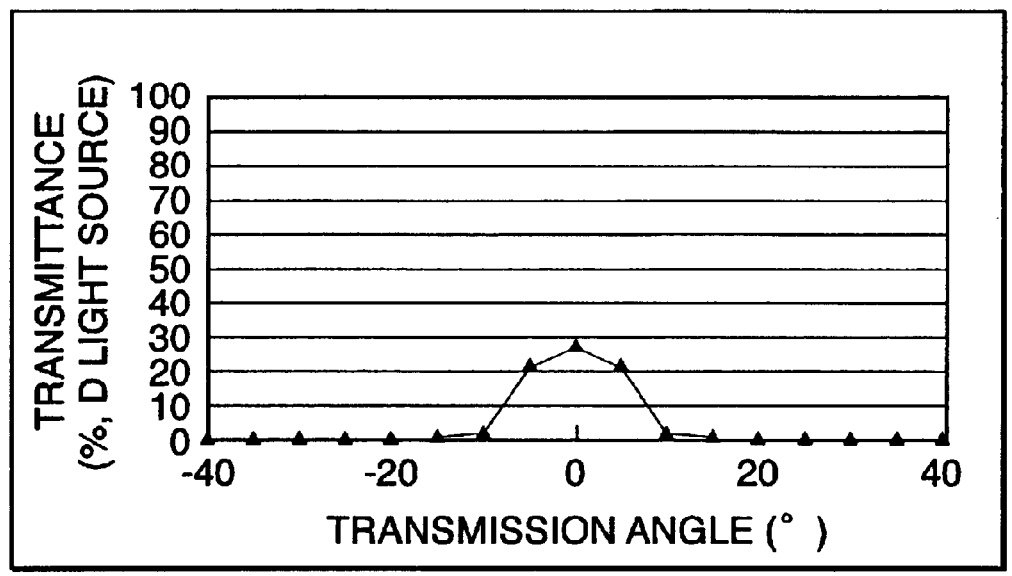
FIGS. 15A and 15B are graphs showing optical properties for Example 8 according to the third embodiment of the present invention; specifically.
Figure 15B:
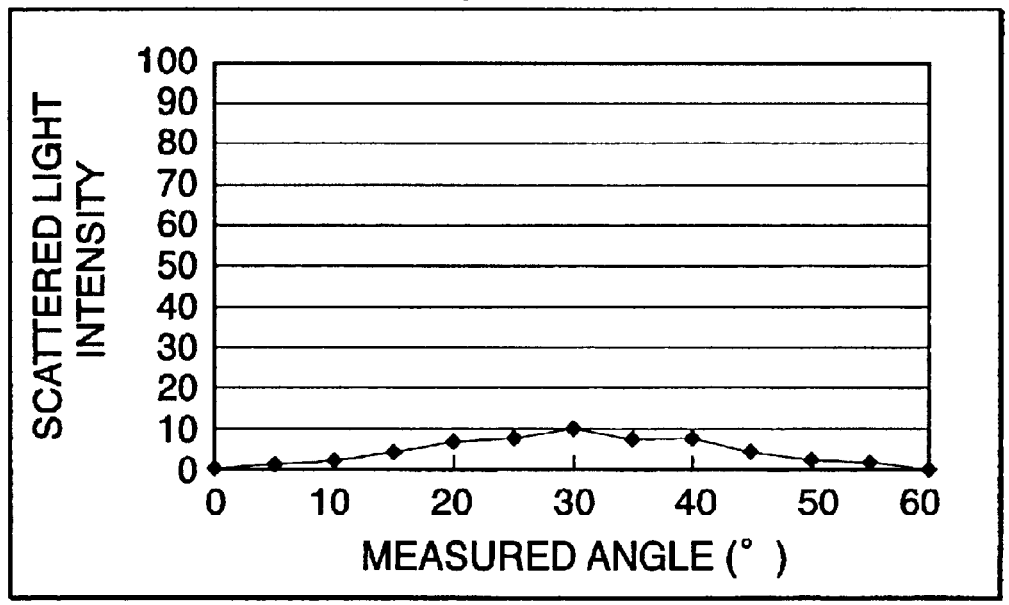
Figure 16:
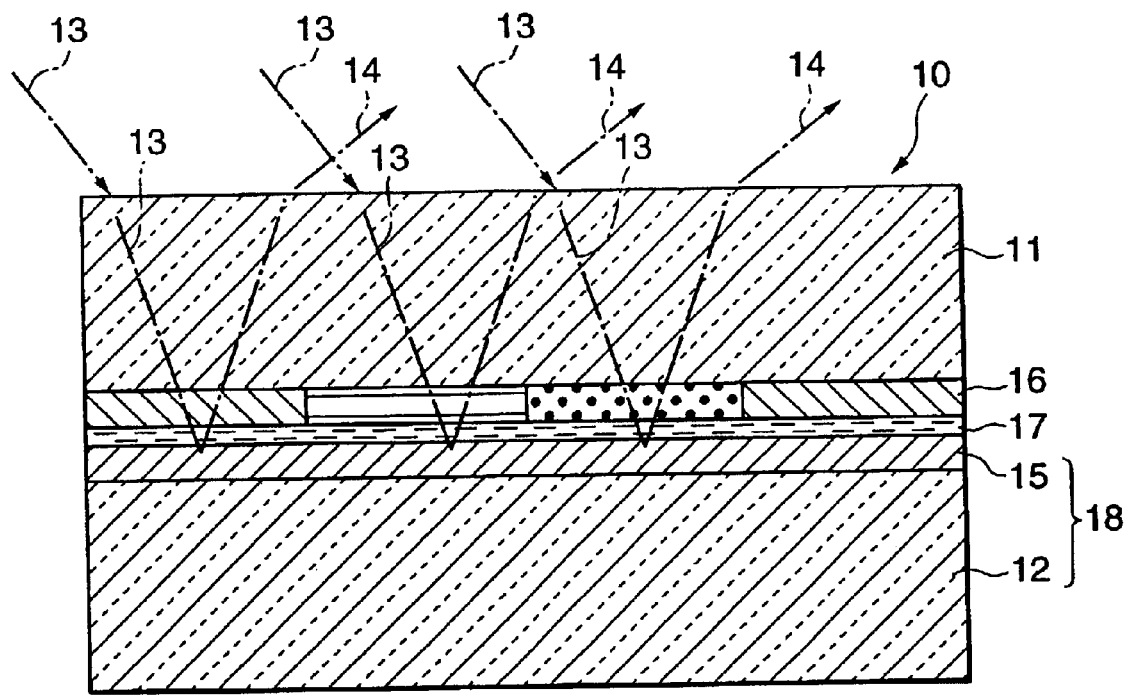
FIG. 16 is a schematic sectional view showing the constitution of a conventional internal scattering/reflecting plate form reflection type LCD.
Figure 17:
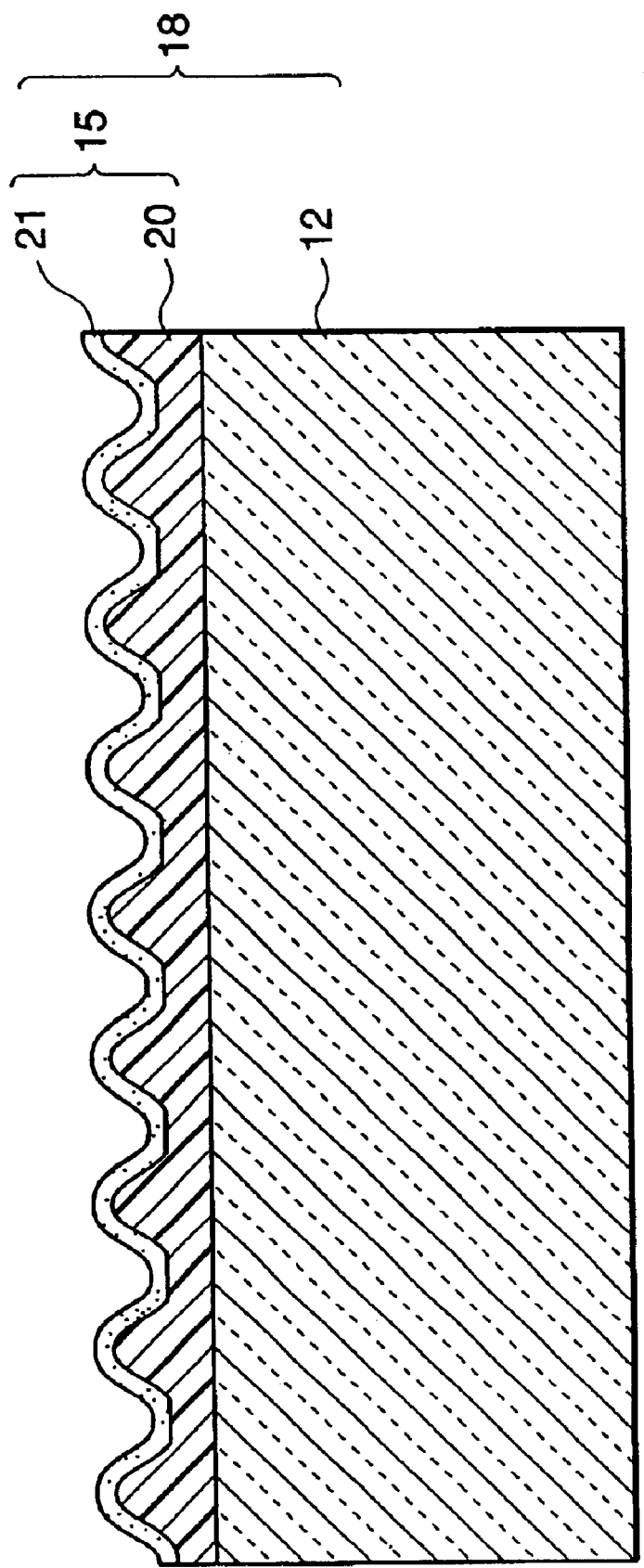
FIG. 17 is a schematic sectional view showing the constitution of a light-scattering/reflecting substrate 18 appearing in FIG. 16.
Figure 18:
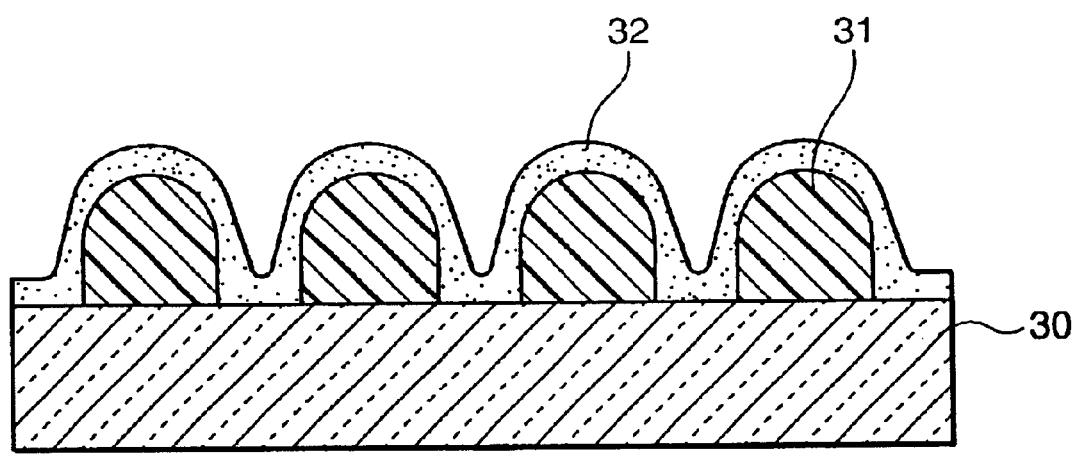
FIG. 18 is a sectional view of a light-scattering/reflecting substrate according to first prior art.
Figure 19:
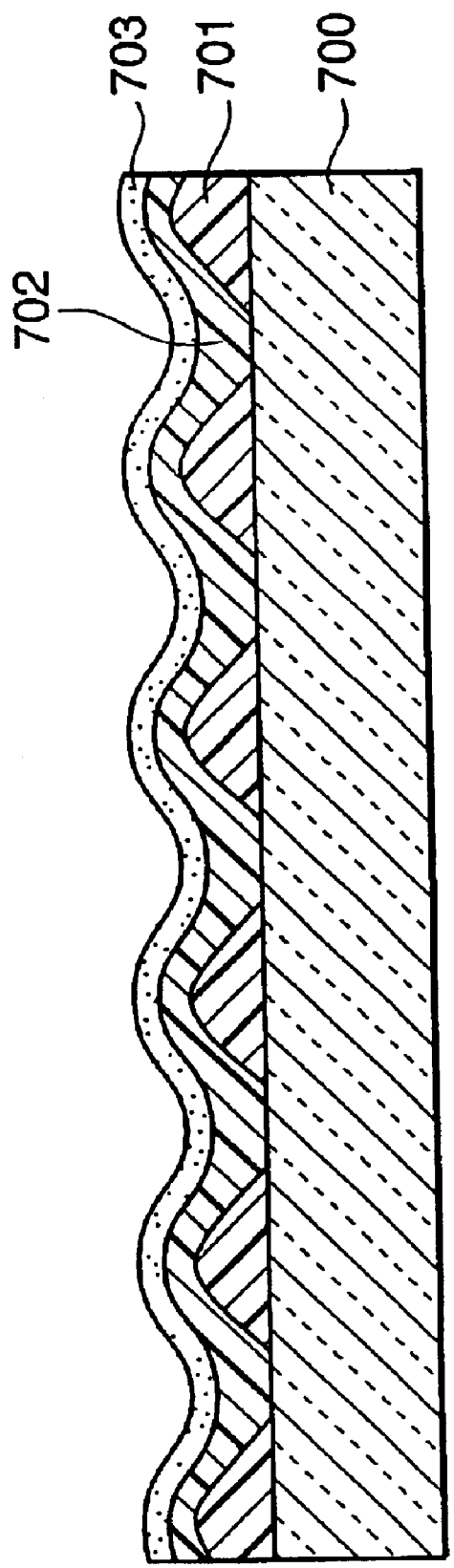
FIG. 19 is a sectional view of a light-scattering/reflecting substrate according to second prior art.
Figure 20:
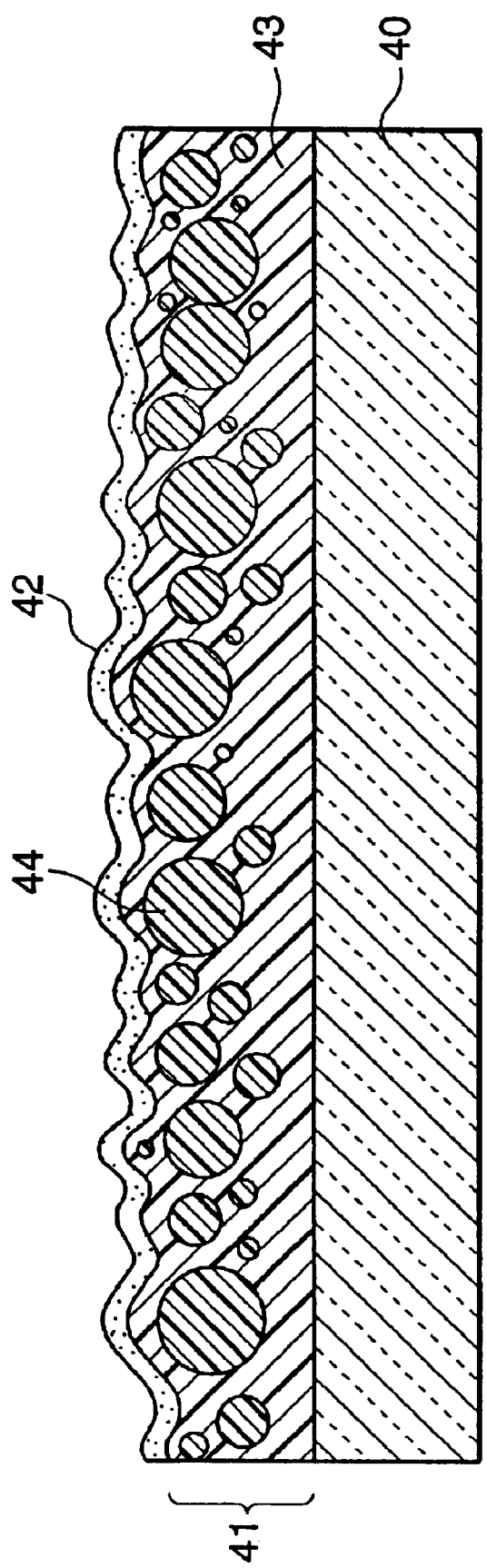
FIG. 20 is a sectional view of a light-scattering/reflecting substrate according to third prior art.

Furthermore, the scattered transmitted light angle distribution and the reflected light scattering angle distribution were measured using the same methods as in Example 4, whereupon the scattered transmitted light angle range for the internal scattering layer 404 obtained in Example 8 was found to be ±15° (FIG. 15A), and the reflected light scattering angle range ±30° (FIG. 15B)

From the above results, it was found that the internal scattering layer 404 obtained in Example 8 shows optical properties sufficient for practical use.

Next, a reflecting film 204 having a 3-layer structure as in Examples 4, 5A and 5B was deposited onto the surface of the internal scattering layer 404, thus obtaining a light-scattering/reflecting substrate.

For the light-scattering/reflecting substrate obtained, the adhesion at the interface between the internal scattering layer 404 and the reflecting film 204, and the adhesion at the interface between the internal scattering layer 404 and the glass substrate 200, were evaluated using the same method as in Example 4.

No peeling was found at either the interface between the internal scattering layer 404 and the reflecting film 204, or at the interface between the internal scattering layer 404 and the glass substrate 200.

EXAMPLE 9

In this Example, which relates to the third embodiment, a mixture of 18.71 g of ethyl cellosolve and 5.00 g of hexylene glycol as the solvent A, 10.0 g of glycerol as the solvent B, 12.5 g of a silica raw material described below as the film component C, and 3.79 g of a titania raw material described below as the film component D were mixed together, thus preparing a sol-form application liquid 3.

The above silica raw material was prepared by mixing together 29.75 g of phenyltrimethoxysilane, 12.42 g of γ-methacryloxypropyltrimethoxysilane and 27.04 g of ethyl cellosolve, and agitating for 24 hours at 20° (room temperature), thus bringing about hydrolysis and condensation polymerization with removal of water. 10.80 g of 1 mol/l hydrochloric acid was added to the silica raw material as a catalyst to promote the hydrolysis.

The above titania raw material was prepared by mixing 28.4 g of tetraisopropoxytitanium with 20.0 g of acetylacetone, thus chelating and hence stabilizing the tetraisopropoxytitanium.

Regarding the composition of the prepared sol-form application liquid 3, the solid content will be 5.0 mass % assuming that the silica raw material and the titania raw material are completely converted to inorganic matter ($SiO_2$ and $TiO_2$). The content of the solvent B glycerol in the solution was 20 mass %, and representing the $SiO_2$ content as a mole ratio, the γ-methacryloxypropyltrimethoxysilane to phenyltrimethoxysilane ratio was 1:3, and the silica raw material to titania raw material ratio was 3:1.

Using a 0.55 mm-thick glass substrate (transmitted color tone value: 0.02, (a, b)=(−0.1, 0.1)) manufactured by the float process as the glass substrate 200, the sol-form application liquid 3 was applied by flexographic printing onto one surface of the glass substrate 200, thus forming a mixed layer 401.

Next, the mixed layer 401 thus formed was air-dried for 2 minutes, and leveling was carried out. At this point in time, the mixed layer 401 was a transparent liquid film not exhibiting light scattering, and phase separation had still not occurred.

Heating was then carried out by a far-infrared rays furnace at 300° C. for 7 minutes. In the initial stage of this heating step, evaporation of the solvent A was promoted, and accompanying this phase separation of the solvent A and the film component C into an upper layer 403 and the solvent B and the film component D into a lower layer 402 occurred.

Furthermore, in this heating step, the film components C and D and a copolymer thereof in the sol-form application liquid 3 were subsequently gelated. Natural radiational cooling was then allowed to occur until the temperature had dropped to room temperature, thus completing the formation of an internal scattering layer 404 on the glass substrate 200.

The angle of slope of the projecting parts on the internal scattering layer 404 and the surface roughness were measured using the same methods as in Example 4, whereupon it was found that the maximum angle of slope of the projecting parts obtained in Example 9 was 10°, Rmax was 400 nm, Ra was 102.0 nm, and the diameter of the projecting parts seen on the surface of the internal scattering layer 404 was about 5 to 10 μm.

Moreover, the haze ratio of the internal scattering layer 404 was measured to be 20.9%, and the transmitted color tone value of the internal scattering layer 404 was measured to be 0.20 ((a, b)=(−0.2, 0.4)).

Furthermore, the scattered transmitted light angle distribution and the reflected light scattering angle distribution were measured using the same methods as in Example 4, whereupon the scattered transmitted light angle range for the internal scattering layer 404 obtained in Example 9 was found to be ±10°, and the reflected light scattering angle range ±20°.

From the above results, it was found that the internal scattering layer 404 obtained in Example 9 shows optical properties sufficient for practical use.

Next, a reflecting film 204 having a 3-layer structure as in Examples 4, 5A and 5B was deposited onto the surface of the internal scattering layer 404, thus obtaining a light-scattering/reflecting substrate.

For the light-scattering/reflecting substrate obtained, the adhesion at the interface between the internal scattering layer 404 and the reflecting film 204, and the adhesion at the interface between the internal scattering layer 404 and the glass substrate 200, were evaluated using the same method as in Example 4.

No peeling was found at either the interface between the internal scattering layer 404 and the reflecting film 204, or at the interface between the internal scattering layer 404 and the glass substrate 200.

COMPARATIVE EXAMPLE 4

86.1 g of the solvent A (ethyl cellosolve) used in Example 8, 10.0 g of the solvent B (glycerol) used in Example 8, 3.56 g of the film component C (the third silica raw material) used in Example 8 and 0.34 g of the film component D (the second silica raw material) used in Example 8 were mixed together, thus preparing a sol-form application liquid 3.

Regarding the composition of the prepared sol-form application liquid, the solid content will be 0.6 mass % assuming that the silica raw materials are completely converted to inorganic matter ($SiO_2$). The content of the solvent B glycerol in the solution was 10 mass %, and representing the $SiO_2$ content as a mole ratio, the γ-methacryloxypropyltrimethoxysilane to phenyltrimethoxysilane ratio was 4:1, and the third silica raw material to second silica raw material ratio was 8:1.

Using the prepared sol-form application liquid, an internal scattering layer 404 was then formed onto a glass substrate 200 as in Example 4.

The angle of slope of the projecting parts on the internal scattering layer 404 and the surface roughness were measured using the same methods as in Example 4, whereupon it was found that the maximum angle of slope of the projecting parts obtained in Comparative Example 4 was 12°, Rmax was 38 nm, and Ra was 12.0 nm. Moreover, when the surface of the internal scattering layer 404 was observed with an optical microscope, the surface appeared to be flat, and projecting parts could not be seen.

Moreover, the haze ratio of the internal scattering layer 404 was measured to be 0.80%.

Furthermore, the scattered transmitted light angle distribution and the reflected light scattering angle distribution were measured using the same methods as in Example 4. It was found that the scattered transmitted light angle range for the internal scattering layer 404 obtained in Comparative Example 4 was extremely narrow at about ±1°, i.e. that light transmitted through the internal scattering layer 404 was hardly scattered at all. Moreover, it was found that the reflected light scattering angle range was also extremely narrow at less than ±5°, i.e. that reflection was almost specular. From the above results, it was found that the internal scattering layer 404 obtained in Comparative Example 4 exhibited optical properties not sufficient for practical use.

COMPARATIVE EXAMPLE 5

31.5 g of the solvent A (ethyl cellosolve) used in Example 7, 40.0 g of the solvent B (glycerol) used in Example 7, 24.0 g of the film component C (the first silica raw material) used in Example 7 and 4.5 g of the film component D (the second silica raw material) used in Example 7 were mixed together, thus preparing a sol-form application liquid 3.

Using the prepared sol-form application liquid, an internal scattering layer 404 was then formed on a glass substrate 200 as in Example 7.

The angle of slope of the projecting parts on the internal scattering layer 404 and the surface roughness were measured using the same methods as in Example 4, whereupon it was found that the maximum angle of slope of the projecting parts obtained in Comparative Example 5 was 3°, Rmax was 3500 nm, and Ra was 1210.0 nm. Upon observing with an optical microscope, projecting parts of diameter about 100 μm were seen scattered sparsely over the surface of the internal scattering layer 404.

Moreover, the scattered transmitted light angle distribution and the reflected light scattering angle distribution were measured using the same methods as in Example 4. It was found that the scattered transmitted light angle range for the internal scattering layer 404 obtained in Comparative Example 5 was extremely narrow at about ±1°, i.e. that light transmitted through the internal scattering layer 404 was hardly scattered at all. Moreover, it was found that the reflected light scattering angle range was also extremely narrow at less than ±5°, i.e. that reflection was almost specular. This is because if the diameter of the projecting parts becomes as large as 100 μm or more as in this Comparative Example 5, then the aspect ratio (height/diameter) of the projecting parts becomes small.

Furthermore, the transmitted color tone value of the internal scattering layer 404 was measured to be 17.73 ((a, b)=(−0.3, 4.2)), and the internal scattering layer 404 was colored yellow. It was thus found that the internal scattering layer 404 obtained in Comparative Example 5 exhibited optical properties not sufficient for practical use.

COMPARATIVE EXAMPLE 6

The sol-form application liquid 3 used in Comparative Example 5 was spin coated for 15 seconds at a rotational speed of 1000 rpm onto one surface of the glass substrate 200, thus forming a mixed layer 401. Heating was then carried out by a far-infrared rays furnace at 300° C. for 7 minutes, thus gelating the film component C and D and a copolymer thereof in the sol-form application liquid 3, and then natural radiational cooling was allowed to occur until the temperature had dropped to room temperature, thus forming an internal scattering layer 404 on the glass substrate 200.

The surface roughness of the internal scattering layer 404 was measured using the same method as in Example 4, whereupon it was found that Rmax obtained in Comparative Example 6 was 10500 nm, and Ra was 5800.0 nm. Upon observing with an optical microscope, projecting parts of diameter about 200 μm were seen scattered sparsely over the surface of the internal scattering layer 404, and cracks were seen in places on the projecting parts.

It is undesirable for Rmax to be as high as above (10500 nm), since the reflecting film 204 coated onto the internal scattering layer 404 must be flattened using an overcoat, and if Rmax is more than 10 μm then the overcoat must be made thick.

Moreover, the transmitted color tone value of the internal scattering layer 404 was measured to be 64.25 ((a, b)=(−0.5, 0.8)), and the internal scattering layer 404 was colored yellow. It was thus found that the internal scattering layer 404 obtained in Comparative Example 6 exhibited optical properties not sufficient for practical use.

Next, a reflecting film 204 having a 3-layer structure as in Examples 4, 5A and 5B was deposited onto the surface of the internal scattering layer 404, thus obtaining a light-scattering/reflecting substrate.

For the light-scattering/reflecting substrate obtained, the adhesion at the interface between the internal scattering layer 404 and the reflecting film 204, and the adhesion at the interface between the internal scattering layer 404 and the glass substrate 200, were evaluated using the same method as in Example 4. The results were that peeling occurred in 5 places, and when the portions where peeling had occurred were observed, it was found that cohesive failure of the internal scattering layer 404 had occurred.

COMPARATIVE EXAMPLE 7

A sol-form application liquid 3 was prepared as in Example 6 but using propylene glycol (1,2-propanediol, surface tension 23 dyn/cm) instead of ethylene glycol as the solvent B, and then an internal scattering layer 404 was formed on a glass substrate 200 as in Example 6.

The surface roughness of the internal scattering layer 404 was measured using the same method as in Example 4, whereupon it was found that Rmax obtained in Comparative Example 7 was 5.2 nm, and Ra was 2.2 nm. Moreover, when the surface of the internal scattering layer 404 was observed with an optical microscope, the surface appeared to be flat, and projecting parts could not be seen. The surface shape was thus approximately the same as that of the glass substrate 200 before the internal scattering layer 404 was formed, and indeed it was verified from a cross-sectional photograph taken with an SEM that a flat film had been formed as the internal scattering layer 404. The thickness of this flat film was 150 nm.

Furthermore, the scattered transmitted light angle distribution and the reflected light scattering angle distribution were measured using the same methods as in Example 4. It was found that the scattered transmitted light angle range for the internal scattering layer 404 obtained in Comparative Example 7 was extremely narrow at about ±1°, i.e. that light transmitted through the internal scattering layer 404 was hardly scattered at all. Moreover, it was found that the reflected light scattering angle range was also extremely narrow at less than ±5°, i.e. that reflection was almost specular.

From the above results, it was found that the internal scattering layer 404 obtained in Comparative Example 7 exhibited optical properties not sufficient for practical use.

The results for Examples 4 to 9 and Comparative Examples 4 to 7 described above are collected together below in Tables 2 and 3 respectively.

TABLE 2

|  | Example 4 No Foundation Layer | Example 5A With Titania Foundation Layer | Example 5B With Silica Foundation Layer | Example 6 | Example 7 | Example 8 | Example 9 |
|---|---|---|---|---|---|---|---|
| Haze Ratio | 2.6% | 5.6% | 6.8% | 36.0% | 23.4% | 48.0% | 20.9% |
| Maximum Angle of Slope | 2° | 5° | 5° | 10° | 8° | 12° | 10° |
| Average Surface Roughness Ra | 757.3 nm | — | — | 81.0 nm | 63.0 nm | 81.4 nm | 102.0 nm |
| Maximum Surface Roughness Rmax | 8,000 nm | — | — | 300 nm | 250 nm | 500 nm | 400 nm |
| Diameter of Projecting Parts | 100~500 μm | — | — | 5~10 μm | 3~10 μm | 3~10 μm | 5~10 μm |
| Transmitted Color Tone $|a^2 + b^2|$ | — | — | — | 0.29 | 0.17 | 0.10 | 0.20 |
| (a,b) | — | — | — | (−0.2, 0.5) | (−0.1, 0.4) | (−0.1, 0.3) | (−0.2, 0.4) |
| Scattered Transmitted Light Angle Distribution | ±10° | ±10° | ±10° | ±10° | ±10° | ±15° | ±10° |
| Reflected Light Scattering Angle Distribution | ±10° | ±10° | ±15° | ±30° | ±25° | ±30° | ±20° |
| Optical Properties | ○ | ○ | ○ | ○ | ○ | ○ | ○ |

TABLE 2-continued

|  | Example 4 No Foundation Layer | Example 5A With Titania Foundation Layer | Example 5B With Silica Foundation Layer | Example 6 | Example 7 | Example 8 | Example 9 |
|---|---|---|---|---|---|---|---|
| Presence of Cracks | X | X | X | X | X | X | X |
| No. of Portions where Peeling Occurred (Cross-Cut Tape Peeling Evaluation Method) | 0 | 0 | 0 | 0 | 0 | 0 | 0 |
| Adhesion to Reflecting Film | ○ | ○ | ○ | ○ | ○ | ○ | ○ |

TABLE 3

|  | Comparative Example | | | |
|---|---|---|---|---|
|  | 4 | 5 | 6 | 7 |
| Haze Ratio | 0.8% | — | — | — |
| Maximum Angle of Slope | 12° | 3° | — | — |
| Average Surface Roughness Ra | 12.0 nm | 1,210.0 nm | 5,800.0 nm | 2.2 nm |
| Maximum Surface Roughness Rmax | 38 nm | 3,500 nm | 10,500 nm | 5.2 nm |
| Diameter of Projecting Parts | Observation Not Possible | Approx. 100 μm | Approx. 200 μm | Observation Not Possible |
| Transmitted Color Tone $|a^2 + b^2|$ | — | 17.73 | 64.25 | — |
| (a,b) | — | (−0.3, 4.2) | (−0.5, 8.0) | — |
| Scattered Transmitted Light Angle Distribution | Approx. ±1° | Approx. ±1° | — | Approx. ±1° |
| Reflected Light Scattering Angle Distribution | less than ±5° | less than ±5° | — | less than ±5° |
| Optical Properties | X | X | X | X |
| Presence of Cracks | — | — | ○ | — |
| No. of Portions where Peeling Occurred (Cross-Cut Tape Peeling Evaluation Method) | — | — | 5 | — |
| Adhesion to Reflecting Film | — | — | X | — |

As shown by the various properties for Examples 4 to 9 in Tables 2 and 3, the internal scattering layer 206 (404) which is the projecting film according to the embodiments of the present invention exhibits a scattered transmitted light angle distribution and a reflected light scattering angle distribution sufficient for practical use, whereas this is not the case for Comparative Examples 4 to 7. Moreover, a transmitted color tone sufficient for practical use is exhibited, whereas this is not the case for Comparative Examples 5 and 6. Furthermore, the adhesion of the internal scattering layer 206 (404) to the reflecting film 204 and the glass substrate 200 is good, whereas this is not the case for Comparative Example 6.

Industrial Applicability

As described in detail above, according to the projecting film of the present invention, the projecting film has a structure with an inorganic material as the principal skeleton thereof. As a result, adhesion to a reflecting film made of an inorganic material such as a metal or a dielectric substance can be improved, and in addition there is no discharge as a gas of components adsorbed on the surface of the projecting film or unreacted components inside the projecting film. Peeling off of the reflecting film and alteration of the optical properties of the reflecting film can thus be prevented.

The projecting film preferably contains not less than 50 mass % of a component comprised of the inorganic material. As a result, adhesion of the projecting film to a reflecting film made of an inorganic material such as a metal or a dielectric substance can be yet further improved.

Side chains in the projecting film are preferably modified with an organic material. As a result, adhesion to a reflecting film made of an inorganic material such as a metal or a dielectric substance can be improved, and alteration of the optical properties of the reflecting film can be prevented.

The average surface roughness Ra of the projecting film is preferably in a range of 30 to 1000 nm, more preferably 45 to 300 nm, yet more preferably 60 to 200 nm. As a result, a projecting shape suitable for scattering reflected light can be exhibited.

The maximum surface roughness Rmax of the projecting film is preferably not more than 10 μm. As a result, a projecting shape suitable for scattering light can be exhibited. Moreover, in the case that the projecting film is used on a light-scattering/reflecting substrate of a liquid crystal display apparatus, the reflecting film coated onto the projecting film must be flattened using an overcoat, and if the surface roughness Rmax is large, then this overcoat must be made thick, which is undesirable; it is thus preferable for the surface roughness Rmax of the projecting film to be low, preferably not more than 3 μm, more preferably not more than 1.5 μm.

The projecting shape of the projecting film is preferably mountain-like. As a result, the projecting film can be made to exhibit a projecting shape yet more suitable for scattering reflected light.

The diameter of the projecting parts of the projecting film is preferably larger than the wavelength of visible light. As a result, the projecting film can be used as an internal scattering layer that scatters visible light.

The haze ratio of the projecting film is preferably not less than 1%, preferably not less than 5%, more preferably not less than 10%. As a result, the projecting film can be made to exhibit a projecting shape suitable for scattering light.

The transmitted color tone value of the projecting film as represented by $|a^2+b^2|$, the square of the vector sum of Hunter color coordinates (a,b), is preferably not more than 10, more preferably not more than 5. As a result, transmitted light is not colored, and hence a projecting film ideal for use in transmission mode can be formed.

The angle distribution of scattered transmitted light when visible light is perpendicularly incident on the projecting film is preferably within a range of ±20° in terms of solid angle. As a result, the projecting film exhibits a projecting shape suitable for scattering transmitted light.

The scattering angle distribution of reflected light when visible light is perpendicularly incident on the projecting film is preferably within a range of ±40° in terms of solid angle from the angle of specular reflection. As a result, the projecting film exhibits a projecting shape suitable for scattering reflected light.

The projecting film is preferably comprised of a first phase that is formed on top of the substrate, and a second phase that is formed on top of the first phase and exhibits the rugged shape. As a result, a projecting shape suitable for scattering reflected light can be exhibited.

The first phase is preferably comprised of an inorganic material. As a result, a projecting film having good adhesion to the substrate can be formed reliably.

The first phase is preferably a foundation layer formed on the substrate in advance. As a result, a projecting film having good adhesion to the substrate can be formed yet more reliably.

Alternatively, the second phase is formed simultaneously with the first phase. As a result, a projecting film having good adhesion to the substrate can be formed reliably through few manufacturing steps.

The interface between the first phase and the second phase preferably exhibits a rugged shape. As a result, the adhesion between the two phases can be improved reliably through an anchor effect.

The gelation reaction rate is preferably slower for second metal compound(s) in the second phase than for first metal compound(s) in the first phase. As a result, phase separation can be made to occur such that the second phase is formed on top of the first phase.

The second metal compound(s) preferably has/have a lower wettability than the first metal compound(s). As a result, the second metal compound(s) can penetrate into the top of the first phase in droplet shapes, and can solidify while still in droplet shapes, and hence the shape of the second phase can be made to be a projecting shape suitable for scattering light.

The projecting film is preferably formed by a sol-gel method using a sol-form application liquid in which are mixed at least the first metal compound(s) and the second metal compound(s) and at least one solvent. As a result, a large number of manufacturing steps are not required, and hence the manufacturing cost of a light-scattering/reflecting substrate can be reduced. Moreover, by suitably selecting the types and mixing proportions of the first metal compound(s) and the second metal compound(s), the type of the solvent(s), and the thickness of application of the sol-form application liquid, the shape of the projecting film can easily be controlled, and in addition the projecting film can easily be made to have a structure in which the principal skeleton thereof is an inorganic material and some of the side chains thereof are modified with an organic material.

The sol-form application liquid preferably contains an organically modified metal compound. As a result, the projecting film can be made to contain an organic component, and hence film stress generated inside the projecting film can be relaxed. Occurrence of cracks in the projecting film can thus be prevented even when the thickness of the projecting film exceeds 1 μm.

At least one of the solvent(s) in the sol-form application liquid preferably has a surface tension of not less than 30 dyn/cm. As a result, phase separation of the first metal compound(s) and the second metal compound(s) can be carried out reliably.

The sol-form application liquid preferably contains not less than 5 mass % of the solvent(s) having a surface tension of not less than 30 dyn/cm. As a result, phase separation of the first metal compound(s) and the second metal compound(s) can be carried out yet more reliably.

Each of the first metal compound(s) and the second metal compound(s) is preferably a metal compound capable of undergoing hydrolysis or condensation polymerization. As a result, solidification of the applied sol-form application liquid due to the gelation reaction can be promoted.

Each of the first metal compound(s) and the second metal compound(s) is preferably an alkoxide of a metal selected from the group consisting of silicon, aluminum, titanium, zirconium and tantalum. As a result, the metal compounds are readily obtainable, stable at normal temperatures and pressures, and non-toxic, and hence the manufacturing process of the light-scattering/reflecting substrate can be simplified, and thus the manufacturing cost thereof can be reduced. In addition, the projecting film formed will not absorb light in the visible region, and hence a light-scattering/reflecting substrate having such a projecting film as an internal scattering layer is suitable for use in a semi-transmitting type LCD or a projection type display. Moreover, when the applied sol-form application liquid solidifies due to the gelation reaction, alkoxides of these metals will generate alcohols which are solvents having a relatively fast evaporation rate, and hence these alcohols will evaporate faster than the solvent(s) having a high surface tension mixed into the sol-form application liquid, resulting in it being possible to carry out phase separation of the first metal compound(s) and the second metal compound(s) in the projecting film reliably.

At least one metal compound out of the first metal compound(s) and the second metal compound(s) is preferably a silicon alkoxide. As a result, the rate of hydrolysis or condensation polymerization is slower than the other metal alkoxide(s), and hence phase separation of the first metal compound(s) and the second metal compound(s) can be made to occur reliably.

According to a method of manufacturing a projecting film of the present invention, in a projecting film formation step, a projecting film having a structure with an inorganic material as the principal skeleton thereof is formed by a sol-gel method. As a result, without requiring a large number of manufacturing steps, adhesion of the projecting film to a reflecting film made of an inorganic material such as a metal or a dielectric substance can be improved, and in addition there is no discharge as a gas of components adsorbed on the surface of the projecting film or unreacted components inside the projecting film. The cost of manufacturing a light-scattering/reflecting substrate can thus be reduced, and in addition peeling off of the reflecting film and alteration of the optical properties of the reflecting film can be prevented.

The projecting film preferably contains not less than 50 mass % of a component comprised of the inorganic material. As a result, adhesion of the projecting film to a reflecting film made of an inorganic material such as a metal or a dielectric substance can be yet further improved.

The projecting film formation step preferably comprises applying a sol-form application liquid in which are mixed at least one first metal compound, at least one second metal compound and at least one solvent onto the substrate, and solidifying the applied sol-form application liquid by a gelation reaction. As a result, by suitably selecting the types and mixing proportions of the metal compounds, the type of the solvent(s), and the thickness of application of the sol-form application liquid, the shape of the projecting film can easily be controlled, and in addition the projecting film can easily be made to have a structure in which the principal skeleton thereof is an inorganic material and some of the side chains thereof are modified with an organic material.

Preferably, in the projecting film formation step, the applied sol-form application liquid is solidified by a gelation reaction, and phase separation is carried out into a first phase that is formed on top of the substrate and a second phase that is formed on top of the first phase and has a projecting shape. As a result, the projecting film can be made to exhibit a rugged shape suitable for scattering reflected light.

The gelation reaction rate is preferably slower for the second metal compound(s) than for the first metal compound(s). As a result, the applied sol-form application liquid can be solidified by the gelation reaction and phase separation can be made to occur such that the second phase having the second metal compound(s) as the principal component thereof is formed on top of the first phase having the first metal compound(s) as the principal component thereof.

The second metal compound(s) preferably has/have a lower wettability than the first metal compound(s). As a result, the second metal compound(s) can penetrate into the top of the first phase in droplet shapes, and can solidify while still in droplet shapes, and hence the shape of the second phase can be made to be a rugged shape suitable for scattering light.

The sol-form application liquid preferably contains an organically modified metal compound. As a result, the projecting film can be made to contain an organic component, and hence film stress generated inside the projecting film can be relaxed. Occurrence of cracks in the projecting film can thus be prevented even when the thickness of the projecting film exceeds 1 µm.

At least one of the solvent(s) in the sol-form application liquid preferably has a surface tension of not less than 30 dyn/cm. As a result, phase separation of the metal compounds can be carried out reliably.

The sol-form application liquid preferably contains not less than 5 mass % of the solvent(s) having a surface tension of not less than 30 dyn/cm. As a result, phase separation of the metal compounds can be carried out yet more reliably.

Each of the first metal compound(s) and the second metal compound(s) is preferably a metal compound capable of undergoing hydrolysis or condensation polymerization. As a result, solidification of the applied sol-form application liquid due to the gelation reaction can be promoted.

Each of the first metal compound(s) and the second metal compound(s) is preferably an alkoxide of a metal selected from the group consisting of silicon, aluminum, titanium, zirconium and tantalum. Such metal alkoxides are readily obtainable, stable at normal temperatures and pressures, and non-toxic, and hence the manufacturing process of the light-scattering/reflecting substrate can be simplified, and thus the manufacturing cost thereof can be reduced. In addition, the projecting film formed will not absorb light in the visible region, and hence a light-scattering/reflecting substrate having such a projecting film as an internal scattering layer is suitable for use in a semi-transmitting type LCD or a projection type display. Moreover, when the applied sol-form application liquid solidifies due to the gelation reaction, alkoxides of these metals will generate alcohols which are solvents having a relatively fast evaporation rate, and hence these alcohols will evaporate faster than the solvent(s) having a high surface tension mixed into the sol-form application liquid, resulting in it being possible to carry out phase separation of the metal compounds in the projecting film reliably.

At least one metal compound out of the first metal compound(s) and the second metal compound(s) is preferably a silicon alkoxide, which has a slower rate of hydrolysis or condensation polymerization than other metal alkoxides. As a result, phase separation of the metal compounds can be made to occur reliably.

According to a method of manufacturing a projecting film of the present invention, a sol-form application liquid comprised of a first film component and a mixed liquid of a first solvent and a second solvent is applied onto a substrate, thus forming a mixed layer. As a result, by controlling the weight of the first film component per unit area in the sol-form application liquid, the surface roughness of the projecting film manufactured can be controlled freely. Moreover, the first solvent is subsequently removed selectively from the mixed layer, and phase separation is carried out of the first solvent and the first film component into an upper layer and the second solvent into a lower layer. As a result, the phase separation can be carried out efficiently. Furthermore, the second solvent is subsequently removed from the mixed layer, and the first film component is gelated. As a result of all of the above, the projecting film can be manufactured without requiring a large number of manufacturing steps.

A solvent in which the second solvent and the first film component dissolve uniformly is preferably used as the first solvent. As a result, the weight of the first film component per unit area in the sol-form application liquid can be controlled reliably.

The first solvent preferably has a lower boiling point than the second solvent. As a result, the first solvent can be selectively removed.

The first solvent preferably has a faster evaporation rate than the second solvent. As a result, the first solvent can be selectively removed.

The second solvent is preferably a poor solvent of the first film component. As a result, the phase separation can be carried out efficiently.

The first solvent preferably has a lower surface tension than the second solvent. As a result, the second solvent and the first film component can be dissolved uniformly in the first solvent.

The first film component is preferably comprised of an alkoxide of a metal selected from the group consisting of silicon, aluminum, titanium, zirconium and tantalum. As a result, the first film component is readily obtainable, stable at normal temperatures and pressures, and non-toxic, and hence the manufacturing process of the light-scattering/reflecting substrate can be simplified, and thus the manufacturing cost thereof can be reduced. In addition, there will be no absorption of light in the visible region, and hence transmitted light will not be colored, and thus a projecting film suitable for use in transmission mode can be formed.

The first solvent is preferably either a single solvent selected from the group consisting of alcohols including methanol, ethanol, propanol and butanol, ketones including acetone and acetylacetone, esters including methyl acetate, ethyl acetate and propyl acetate, cellosolves including ethyl cellosolve and butyl cellosolve, and glycols including hexylene glycol and 1,2-propanediol, or a mixed solvent thereof. As a result, the surface roughness of the projecting film manufactured can be controlled freely, and the phase separation can be carried out efficiently.

The second solvent is preferably either a single solvent having a large surface tension (for example 30 dyn/cm or more) selected from the group consisting of straight-chain glycols having a hydroxyl group at each end thereof represented by the general formula HO—$(CH_2)_n$—OH, and polyhydric alcohols represented by the general formula HO—$(CH_2)_n(CHOH)_m$—OH ($n \geq$, $m \geq 1$), or a mixed solvent thereof. As a result, the phase separation can be carried out efficiently. Moreover, if n is greater than 10 then the melting point will become too high and thus it will be difficult to produce the application liquid, and hence it is preferable to use a glycol as above in which n is in a range of 2 to 10 as the second solvent.

A foundation layer is preferably formed on the substrate in advance. As a result, a projecting film having good adhesion to the substrate can be formed reliably.

The foundation layer is preferably formed by mixing together a third solvent and a second film component to make an other sol-form application liquid, applying the other sol-form application liquid onto the substrate to form an other mixed layer, and removing the third solvent from the other mixed layer and gelating the second film component. As a result, manufacturing can be carried out without requiring a large number of manufacturing steps.

The third solvent is preferably a solvent in which the second film component dissolves. As a result, the foundation layer can be applied uniformly onto the substrate.

The second film component preferably has a larger polarity than the first film component. As a result, a projecting film having good adhesion to the substrate can be formed reliably.

The second film component is preferably an inorganic material. As a result, a foundation layer having a polarity reliably larger than the projecting film having the first film component as the principal component thereof can be formed, and hence the adhesion of the projecting film to the substrate can be improved.

According to a method of manufacturing a projecting film of the present invention, a sol-form application liquid comprised of a first film component, a second film component and a mixed liquid of a first solvent and a second solvent is applied onto a substrate, thus forming a mixed layer. As a result, by controlling the weight of the first film component per unit area in the sol-form application liquid, the surface roughness of the projecting film manufactured can be controlled freely. Moreover, the first solvent is subsequently removed selectively from the mixed layer, and phase separation is carried out of the first solvent and the first film component into an upper layer and the second solvent and the second film component into a lower layer. As a result, the phase separation can be carried out efficiently. Furthermore, the second solvent is subsequently removed from the mixed layer, and the first film component and the second film component are gelated. As a result of all of the above, the projecting film can be manufactured without requiring a large number of manufacturing steps.

A solvent in which the second solvent, the first film component and the second film component dissolve uniformly is preferably used as the first solvent. As a result, the weight of the first film component per unit area in the sol-form application liquid can be controlled reliably.

The first solvent preferably has a lower boiling point than the second solvent. As a result, the first solvent can be selectively removed.

The first solvent preferably has a faster evaporation rate than the second solvent. As a result, the first solvent can be selectively removed.

The second solvent is preferably a poor solvent of the first film component. As a result, the phase separation can be carried out efficiently.

The first solvent preferably has a lower surface tension than the second solvent. As a result, the second solvent, the first film component and the second film component can be dissolved uniformly in the first solvent.

The second film component preferably has a larger polarity than the first film component. As a result, in the case that the substrate is made of a glass having a large polarity, the adhesion between the substrate and the projecting film can be improved reliably. Furthermore, the lower the polarity of the first film component, the more the first film component will agglomerate and become dotted about upon gelation, resulting in the interface between the two layers formed by the phase separation exhibiting a rugged shape, and hence in the area of adhesion at this interface increasing, and thus in it being possible to improve the adhesion between the two layers.

The first film component is preferably comprised of an alkoxide of a metal selected from the group consisting of silicon, aluminum, titanium, zirconium and tantalum. As a result, the first film component is readily obtainable, stable at normal temperatures and pressures, and non-toxic, and hence the manufacturing process of the light-scattering/reflecting substrate can be simplified, and thus the manufacturing cost thereof can be reduced. In addition, there will be no absorption of light in the visible region, and hence the projecting film is suitable for use as a film that scatters reflected light. Moreover, when the applied sol-form application liquid solidifies due to the gelation reaction, alkoxides of these metals will generate alcohols which are solvents having a relatively fast evaporation rate, and hence these alcohols will evaporate faster than the solvent(s) having a high surface tension (for example 30 dyn/cm or more) mixed into the sol-form application liquid, resulting in it being possible to carry out the phase separation reliably.

The second film component is preferably an inorganic material. As a result, the polarity of the second film component can reliably be made larger than that of the first film component, and hence the phase separation can be promoted. Moreover, as a result of the phase separation, the gelated second film component is formed between the substrate and an upper layer having the gelated first film component as the principal component thereof, and hence the adhesion of the projecting film to the substrate can be improved.

The first solvent is preferably either a single solvent selected from the group consisting of alcohols including methanol, ethanol, propanol and butanol, ketones including acetone and acetylacetone, esters including methyl acetate, ethyl acetate and propyl acetate, and cellosolves including butyl cellosolve, or a mixed solvent thereof. As a result, the second solvent and the first film component can be uniformly dissolved in the first solvent, and hence the surface roughness of the projecting film manufactured can be freely controlled.

The second solvent is preferably either a single solvent having a large surface tension (for example 30 dyn/cm or more) selected from the group consisting of straight-chain glycols having a hydroxyl group at each end thereof represented by the general formula HO—$(CH_2)_n$—OH, and polyhydric alcohols represented by the general formula HO—$(CH_2)_n(CHOH)_m$—OH ($n \geq 2$, $m \geq 1$), or a mixed solvent thereof. As a result, the phase separation can be carried out efficiently. Moreover, if n is greater than 10 then the melting point will become too high and thus it will be difficult to produce the application liquid, and hence it is preferable to use a glycol as above in which n is in a range of 2 to 10 as the second solvent.

What is claimed is:

1. A projecting film that is formed on a substrate and exhibits a projecting shape, the projecting film having an inorganic compound with an organic functional group, wherein a diameter of projecting parts is in a range of 5 to 500 μm.

2. A projecting film as claimed in claim 1, containing not less than 50 mass % of a component comprising said inorganic compound.

3. A projecting film as claimed in claim 1, having an average surface roughness Ra in a range of 30 to 1000 nm.

4. A projecting film as claimed in claim 1, having a maximum surface roughness Rmax of not more than 10 μm.

5. A projecting film as claimed in claim 1, wherein said projecting shape is mountain-like.

6. A projecting film as claimed in claim 1, having a haze ratio of not less than 1%.

7. A projecting film as claimed in claim 1, having a transmitted color tone value as represented by $|a^2+b^2|$, the square of the vector sum of Hunter color coordinates (a,b), of not more than 10.

8. A projecting film as claimed in any one of claim 1, wherein scattered transmitted light in response to visible light being perpendicularly incident on the projecting film has an angle distribution within a range of ±20° in terms of solid angle.

9. A projecting film as claimed in claim 1, wherein reflected light in response to visible light being perpendicularly incident on the projecting film has a scattering angle distribution within a range of ±40° in terms of solid angle from the angle of specular reflection.

10. A projecting film as claimed in any one of claim 1, used as an internal scattering layer disposed in a reflection type or semi-transmission type liquid crystal display apparatus.

11. A projecting film as claimed in claim 1, used as an anti-glare film.

12. A projecting film as claimed in claim 1, formed onto a surface of one of an original-placing window of a copying machine and a side window of an automobile.

13. A projecting film as claimed in claim 1, used in an electroluminescence light-emitting apparatus used in a liquid crystal display apparatus.

14. A projecting film as claimed in claim 1, comprising a first phase that is formed on top of said substrate, and a second phase that is formed on top of said first phase and exhibits said projecting shape.

15. A projecting film as claimed in claim 14, wherein said first phase comprises an inorganic material.

16. A projecting film as claimed in claim 14, wherein said first phase is a foundation layer formed on said substrate in advance.

17. A projecting film as claimed in claim 14, wherein said second phase is formed simultaneously with said first phase.

18. A projecting film as claimed in claim wherein an interface between said first phase and said second phase exhibits a rugged shape.

19. A projecting film as claimed in claim 17, wherein said first phase contains a component in which at least one first metal compound has been solidified by a gelation reaction, and said second phase contains a component in which at least one second metal compound having a gelation reaction rate slower than said at least one first metal compound has been solidified by a gelation reaction.

20. A projecting film as claimed in claim 19, wherein said at least one second metal compound has a lower wettability than said at least one first metal compound.

21. A projecting film as claimed in claim 17, wherein the projecting film is formed by a sol-gel method using a sol-form application liquid in which are mixed at least said at least one first metal compound and said at least one second metal compound.

22. A projecting film as claimed in claim 21, wherein said sol-form application liquid contains an organically modified metal compound.

23. A projecting film as claimed in claim 21, wherein said sol-form application liquid has mixed therein at least one solvent, and at least one solvent out of said at least one solvent has a surface tension of not less than 30 dyn/cm.

24. A projecting film as claimed in claim 23, wherein said sol-form application liquid contains not less than 5 mass % of said at least one solvent having a surface tension of not less than 30 dyn/cm.

25. A projecting film as claimed in claim 19, wherein each of said at least one first metal compound and said at least one second metal compound is a metal compound capable of undergoing one of hydrolysis and condensation polymerization.

26. A projecting film as claimed in claim 25, wherein each of said at least one first metal compound and said at least one second metal compound is an alkoxide of a metal selected from the group consisting of silicon, aluminum, titanium, zirconium and tantalum.

27. A projecting film as claimed in claim 25, wherein at least one metal compound out of said at least one first metal compound and said at least one second metal compound is a silicon alkoxide.

28. A method of manufacturing a projecting film, comprising:
a projecting film formation step of forming a projecting film having a structure with an inorganic material as a principal skeleton thereof on a substrate by a sol-gel method;
wherein said projecting film formation step comprises applying a sol-form application liquid in which are mixed at least one first metal compound and at least one second metal compound onto said substrate, and solidifying said applied sol-form application liquid by a gelation reaction; and
wherein said sol-form application liquid has mixed therein at least one solvent, and at least one solvent out of said at least one solvent has a surface tension of not less than 30 dyn/cm.

29. A method as claimed in claim 28, wherein said projecting film contains not less than 50 mass % of a component comprising said inorganic material.

30. A method as claimed in claim 28, wherein in said projecting film formation step, said applied sol-form application liquid is solidified by a gelation reaction, and phase separation is carried out into a first phase that is formed on top of said substrate and a second phase that is formed on top of said first phase and has a projecting shape.

31. A method as claimed in claim 30, wherein said at least one second metal compound has a slower gelation reaction rate than said at least one first metal compound.

32. A method as claimed in claim 31, wherein said at least one second metal compound has a lower wettability than said at least one first metal compound.

33. A method wherein as claimed in claim 28, wherein said sol-form application liquid contains an organically modified metal compound.

34. A method as claimed in claim 28, wherein said sol-form application liquid contains not less than 5 mass % of said at least one solvent having a surface tension of not less than 30 dyn/cm.

35. A method as claimed in claim 28, wherein each of said at least one first metal compound and said at least one second metal compound is a metal compound capable of undergoing one of hydrolysis and condensation polymerization.

36. A method as claimed in claim 35, wherein each of said at least one first metal compound and said at least one second metal compound is an alkoxide of a metal selected from the group consisting of silicon, aluminum, titanium, zirconium and tantalum.

37. A method as claimed in claim 35, wherein at least one metal compound out of said at least one first metal compound and said at least one second metal compound is a silicon alkoxide.

38. A method of manufacturing a projecting film, comprising:
- a mixed layer formation step of applying a sol-form application liquid comprising a first film component and a mixed liquid of a first solvent and a second solvent onto a substrate to form a mixed layer;
- a phase separation step of selectively removing said first solvent from said mixed layer, and carrying out phase separation of said first solvent and said first film component into an upper layer and said second solvent into a lower layer; and
- a gelation step of removing said second solvent from said mixed layer, and gelating said first film component.

39. A method as claimed in claim 38, wherein said first solvent is a solvent in which said second solvent and said first film component dissolve uniformly.

40. A method as claimed in claim 39, wherein said first solvent has a lower boiling point than said second solvent.

41. A method as claimed in claim 39, wherein said first solvent has a faster evaporation rate than said second solvent.

42. A method as claimed in claim 40, wherein said second solvent is a poor solvent of said first film component.

43. A method as claimed in claim 40, wherein said first solvent has a lower surface tension than said second solvent.

44. A method as claimed in claim 38, wherein said first film component is a sol solution in which an alkoxide of a metal selected from the group consisting of silicon, aluminum, titanium, zirconium and tantalum has been subjected to one of hydrolysis and condensation polymerization.

45. A method as claimed in claim 38, wherein said first solvent comprises at least one solvent selected from the group consisting of alcohols including methanol, ethanol, propanol and butanol, ketones including acetone and acetylacetone, esters including methyl acetate, ethyl acetate and propyl acetate, cellosolves including ethyl cellosolve and butyl cellosolve, and glycols including hexylene glycol and 1,2-propanediol.

46. A method as claimed in claims 38, wherein said second solvent comprises at least one solvent selected from the group consisting of straight-chain glycols having a hydroxyl group at each end thereof represented by the general formula $HO-(CH_2)_n-OH$ wherein n is an integer from 2 to 10 inclusive, and polyhydric alcohols represented by the general formula $HO-(CH_2)_n(CHOH)_m-OH$ ($n \geq 2$, $m \geq 1$).

47. A method as claimed in claim 38, wherein a foundation layer is formed on said substrate in advance.

48. A method as claimed in claim 47, wherein said foundation layer is formed by mixing together a third solvent and a second film component to make an other sol-form application liquid, applying the other sol-form application liquid onto said substrate to form an other mixed layer, and removing said third solvent from said other mixed layer and gelating said second film component.

49. A method as claimed in claim 48, wherein said third solvent is a solvent in which said second film component dissolves.

50. A method as claimed in claim 48, wherein said second film component has a larger polarity than said first film component.

51. A method as claimed in claim 48, wherein said second film component is an inorganic material.

52. A method of manufacturing a projecting film, comprising:
- a mixed layer formation step of applying a sol-form application liquid comprising a first film component, a second film component and a mixed liquid of a first solvent and a second solvent onto a substrate to form a mixed layer;
- a phase separation step of selectively removing said first solvent from said mixed layer, and carrying out phase separation of said first solvent and said first film component into an upper layer and said second solvent and said second film component into a lower layer, and
- a gelation step of removing said second solvent from said mixed layer, and gelating said first film component and said second film component.

53. A method as claimed in claim 52, wherein said first solvent is a solvent in which said second solvent, said first film component and said second film component dissolve uniformly.

54. A method as claimed in claim 53, wherein said first solvent has a lower boiling point than said second solvent.

55. A method as claimed in claim 53, wherein said first solvent has a faster evaporation rate than said second solvent.

56. A method as claimed in claim 54, wherein said second solvent is a poor solvent of said first film component.

57. A method as claimed in claim 54, wherein said first solvent has a lower surface tension than said second solvent.

58. A method as claimed in claim 54, wherein said second film component has a larger polarity than said first film component.

59. A method as claimed in claim 52, wherein said first film component is a sol solution in which an alkoxide of a metal selected from the group consisting of silicon, aluminum, titanium, zirconium and tantalum has been subjected to one of hydrolysis and condensation polymerization.

60. A method as claimed in claim 52, wherein said second film component is an inorganic material.

61. A method as claimed in claim 52, wherein said first solvent comprises at least one solvent selected from the group consisting of alcohols including methanol, ethanol, propanol and butanol, ketones including acetone and acetylacetone, esters including methyl acetate, ethyl acetate and propyl acetate, and cellosolves including butyl cellosolve.

62. A method as claimed in claim 52, wherein said second solvent comprises at least one solvent selected from the group consisting of straight-chain glycols having a hydroxyl group at each end thereof represented by the general formula $HO-(CH_2)_n-OH$ wherein n is an integer from 2 to 10 inclusive, and polyhydric alcohols represented by the general formula $HO-(CH_2)_n(CHOH)_m-OH$ ($n \geq 2$, $m \geq 1$).

63. A projecting film as claimed in claim 1, wherein the diameter of the projecting parts is in the range of 5 to 100 μm.

* * * * *